US011829279B2

(12) United States Patent
Grymel et al.

(10) Patent No.: US 11,829,279 B2
(45) Date of Patent: Nov. 28, 2023

(54) SYSTEMS, APPARATUS, AND METHODS TO DEBUG ACCELERATOR HARDWARE

(71) Applicant: Intel Corporation, Santa Clara, CA (US)

(72) Inventors: Martin-Thomas Grymel, Leixlip (IE); David Bernard, Kilcullen (IE); Martin Power, Dublin (IE); Niall Hanrahan, Galway (IE); Kevin Brady, Newry (IE)

(73) Assignee: Intel Corporation, Santa Clara, CA (US)

( * ) Notice: Subject to any disclaimer, the term of this patent is extended or adjusted under 35 U.S.C. 154(b) by 108 days.

(21) Appl. No.: 17/483,521

(22) Filed: Sep. 23, 2021

(65) Prior Publication Data

US 2022/0012164 A1    Jan. 13, 2022

(51) Int. Cl.
| | |
|---|---|
| *G06F 11/00* | (2006.01) |
| *G06F 11/36* | (2006.01) |
| *G06N 3/04* | (2023.01) |
| *G06F 11/277* | (2006.01) |
| *G06F 11/30* | (2006.01) |

(52) U.S. Cl.
CPC ........ *G06F 11/3652* (2013.01); *G06F 11/277* (2013.01); *G06F 11/3075* (2013.01); *G06F 11/3656* (2013.01); *G06N 3/04* (2013.01)

(58) Field of Classification Search
CPC ...... G06F 11/277; G06F 11/263; G06F 11/27; G06F 11/273; G06F 11/3656; G06F 11/3648

See application file for complete search history.

(56) References Cited

U.S. PATENT DOCUMENTS

| | | | |
|---|---|---|---|
| 11,232,016 B1 * | 1/2022 | Huynh | G06N 3/045 |
| 11,467,946 B1 * | 10/2022 | Jacob | G06N 3/10 |
| 2019/0114533 A1 | 4/2019 | Ng et al. | |
| 2019/0391796 A1 | 12/2019 | Brady et al. | |
| 2020/0151088 A1 * | 5/2020 | Gu | G06F 15/7807 |
| 2020/0175131 A1 | 6/2020 | Schardt et al. | |

(Continued)

OTHER PUBLICATIONS

International Searching Authority, "Written Opinion of The International Searching Authority," issued in connection with International Application No. PCT/US2022/041227, dated Dec. 16, 2022, 4 pages.

(Continued)

*Primary Examiner* — Philip Guyton
(74) *Attorney, Agent, or Firm* — Akona IP PC

(57) ABSTRACT

Methods, apparatus, systems, and articles of manufacture are disclosed to debug a hardware accelerator such as a neural network accelerator for executing Artificial Intelligence computational workloads. An example apparatus includes a core with a core input and a core output to execute executable code based on a machine-learning model to generate a data output based on a data input, and debug circuitry coupled to the core. The debug circuitry is configured to detect a breakpoint associated with the machine-learning model, compile executable code based on at least one of the machine-learning model or the breakpoint. In response to the triggering of the breakpoint, the debug circuitry is to stop the execution of the executable code and output data such as the data input, data output and the breakpoint for debugging the hardware accelerator.

27 Claims, 20 Drawing Sheets

(56) References Cited

U.S. PATENT DOCUMENTS

| | | | |
|---|---|---|---|
| 2020/0210301 A1 | 7/2020 | Nandan et al. | |
| 2020/0225960 A1* | 7/2020 | Alexander | G06F 9/3851 |
| 2020/0301819 A1* | 9/2020 | Kavilipati | G06N 3/045 |
| 2020/0327420 A1* | 10/2020 | Aralikatte | G06N 3/045 |
| 2020/0410389 A1 | 12/2020 | Jain et al. | |
| 2021/0117810 A1* | 4/2021 | Liu | G06F 7/57 |
| 2022/0197713 A1* | 6/2022 | Sivaramakrishnan | G06F 9/5027 |

OTHER PUBLICATIONS

International Searching Authority, "International Search Report," issued in connection with International Application No. PCT/US2022/041227, dated Dec. 16, 2022, 4 pages.

Alex Krizhevsky, et al., ImageNet Classification with Deep Convolutional Neural Networks, Communications of The ACM, Jun. 2017, vol. 60, No. 6, 7 pages.

Matthew D. Zeiler, et al., Visualizing and Understanding Convolutional Networks, D. Fleet et al. (Eds.): ECCV 2014, Part I, LNCS 8689, 2014, 16 pages.

Karen Simonyan, et al., Very Deep Convolutional Networks for Large-Scale Image Recognition, Apr. 10, 2015, 14 pages.

Christian Szegedy, et al., Going Deeper with Convolutions, 2015, 9 pages.

Kaiming He, et al., Deep Residual Learning for Image Recognition, 2015, 9 pages.

Ross Girshick, et al., Rich feature hierarchies for accurate object detection and semantic segmentation, 2014, 8 pages.

Kaiming He, et al., Spatial Pyramid Pooling in Deep Convolutional Networks for Visual Recognition, IEEE Transactions On Pattern Analysis and Machine Intelligence, vol. 37, No. 9, Sep. 2015, 13 pages.

Ross Girshick, Fast R-CNN, 2015, 9 pages.

Shaoqing Ren, et al., Faster R-CNN: Towards Real-Time Object Detection with Region Proposal Networks, IEEE Transactions On Pattern Analysis and Machine Intelligence, vol. 39, No. 6, Jun. 2017, 13 pages.

Joseph Redmon, et al., You Only Look Once: Unified, Real-Time Object Detection, 2016, 10 pages.

Wei Liu, et al., SSD: Single Shot MultiBox Detector, arXiv:1512.02325v5 [cs.CV] Dec. 29, 2016, 17 pages.

Changsheng Li, et al., Learning Ordinal Discriminative Features for Age Estimation, 2012, 8 pages.

Gil Levi, et al., Age and Gender Classification using Convolutional Neural Networks, 2015, 9 pages.

ResNet-50 Network Specification: https://dgschwend.github.io/netscope/#/preset/resnet-50, last accessed Aug. 4, 2022, 62 pages.

* cited by examiner

SYSTEMS, APPARATUS, AND METHODS TO DEBUG ACCELERATOR HARDWARE

FIELD OF THE DISCLOSURE

This disclosure relates generally to hardware accelerators and, more particularly, to systems, apparatus, and methods to debug hardware accelerators.

BACKGROUND

In recent years, a demand for computationally-intensive processing capabilities, such as Artificial Intelligence/Machine-Learning and image processing capabilities, has moved beyond high-power dedicated desktop hardware and has become an expectation for personal and/or otherwise mobile devices. Hardware accelerators may be included in such devices to implement these capabilities. Debugging such hardware accelerators is a time-consuming and complex task.

DETAILED DESCRIPTION

Figure 1:
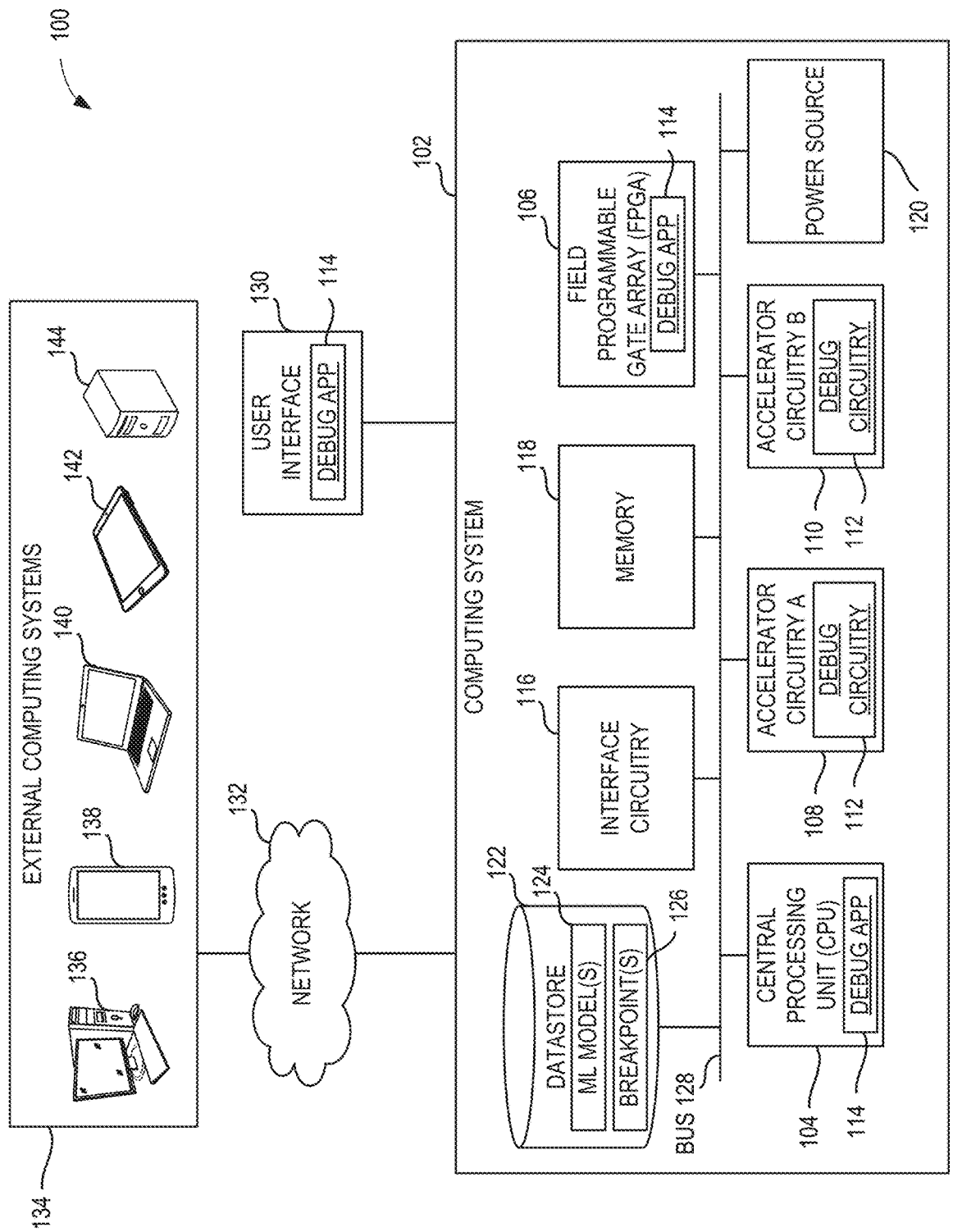
FIG. 1 is an illustration of an example computing system including example accelerator circuitry with example debug circuitry to achieve improved debugging of the accelerator circuitry.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Typical computing systems, including personal computers and/or mobile devices, implement computationally-intensive tasks, such as advanced image processing or computer vision algorithms to automate tasks that human vison can perform. For example, computer vision tasks may include acquiring, processing, analyzing, and/or understanding digital images. Some such tasks facilitate, in part, extraction of dimensional data from the digital images to produce numerical and/or symbolic information. Computer vision algorithms can use the numerical and/or symbolic information to make decisions and/or otherwise perform operations associated with three-dimensional (3-D) pose estimation, event detection, object recognition, video tracking, etc., among others. To support augmented reality (AR), virtual reality (VR), robotics, and/or other applications, it is then accordingly important to perform such tasks quickly (e.g., substantially in real time or near real time) and efficiently with such tasks being executed by example hardware accelerators as disclosed herein.

Computationally-intensive tasks, such as advanced image processing or computer vision algorithms, may be implemented utilizing an Artificial Intelligence/Machine-Learning (AI/ML) model such as a neural network (e.g., a convolutional neural network (CNN, or ConvNet)). A neural network, such as a CNN, is a deep, artificial neural network (ANN) typically used to classify images, cluster the images by similarity (e.g., a photo search), and/or perform object recognition within the images using convolution. Thus, a neural network can be used to identify faces, individuals, street signs, animals, etc., included in an input image by passing an output of one or more filters corresponding to an image feature (e.g., a horizontal line, a two-dimensional (2-D) shape, etc.) over the input image to identify matches of the image feature within the input image. An example hardware accelerator as disclosed herein may achieve such identifications by processing substantial quantities of inputs (e.g., AI/ML inputs) to generate outputs (e.g., AI/ML outputs), which may be used to achieve the identifications.

Hardware accelerators customized, tailored, and/or otherwise optimized to implement neural networks are referred to as neural network accelerators. Other types of AI/ML accelerators are possible to improve performance of a specific type of AI/ML model. Such neural network accelerators, and/or, more generally, hardware accelerators, are becoming increasingly complex to debug in an effort to improve and/or otherwise optimize an efficiency and performance at which an AI/ML model may be implemented. Debugging a hardware accelerator is an increasingly time-consuming and complex task as AI/ML datasets increase at scale. Debugging is utilized in examples where an output of a hardware accelerator is not as expected, or where a particular configuration (e.g., a configuration image) of the hardware accelerator and/or input may result in a system hang or pipeline halting of the hardware accelerator.

Debugging may also be utilized to improve performance of a hardware accelerator. For example, improving a number of frames per second executed by a neural network accelerator may require a substantial amount of compiler adjustments and modifications to identify pipeline or processing bottlenecks. Examples disclosed herein change the typical hardware debugging paradigm. For example, debugging hardware is typically designed for conventional microprocessor architectures that execute relatively long programs with each debugging instruction only working on a few small operands. However, with the advent of hardware accelerators, such as Graphics Processor Units (GPUs) and neural network accelerators, the ratio between debugging instructions and operands is inverted. For example, hardware accelerators do not have dedicated hardware support for debugging purposes. In some such examples, software applications to debug hardware accelerators (e.g., software debuggers) may be designed to execute relatively small programs, but the operands on which each debugging instruction operates (e.g., tensors in the example of a CNN) are substantial large in number.

Without dedicated hardware debugging capabilities, the time needed to debug a hardware accelerator may increase exponentially. For example, a single pass through a ResNet-50 neural network with an input image of size 224×224×3 (e.g., 150,000 inputs) produces over 10,500,000 activations traversing the 50 layers of the network to produce a single output. However, newer neural network architectures may have an even higher degree of complexity and thereby produce more than 10,500,000 activations over more than 50 layers of the architecture. In some such examples, attempting to find an error in a 10,500,000 sized set of numbers spread across 50 layers is an increasingly difficult and time-consuming effort, especially if the network execution is to be broken down into multiple smaller workloads. Further debugging difficulty arises in examples where workloads (e.g., hardware accelerator workloads, AI/ML workloads, etc.) are scheduled for execution by multiple cores (e.g., hardware accelerator cores) to run or execute in parallel. In some such examples, the potential for errors due to core interaction and workload synchronization is substantially high when multiple cores work in parallel.

As a result, identifying bugs, errors, etc., associated with an execution of an AI/ML model may require personnel to deduce tediously configuration or other issues of the hardware accelerator through the inspection of the generated output. Advantageously, examples disclosed herein include systems, apparatus, methods, and articles of manufacture to debug hardware accelerators by utilizing improved data-centric maneuverability through hardware accelerator runs to localize bugs and/or isolate performance bottlenecks.

Examples disclosed herein include systems, apparatus, methods, and articles of manufacture to debug hardware accelerators for improved performance and reduced erroneous output generation. In some disclosed examples, the hardware accelerator includes example debug circuitry (or debugger circuitry) that may be instantiated to halt an output of the hardware accelerator at specified breakpoints and single-step through one or more subsequent output transactions. In some disclosed examples, an example debug application (or debugger application) may program and/or instantiate the debug circuitry, and/or, more generally, the hardware accelerator, to halt execution of an AI/ML model on a per-workload basis, a per-core basis, in response to a detection of a particular generated datum, and/or in response to a determination that an output transaction is associated with a certain address and/or address range. In some disclosed examples, the debug circuitry may output a read-out of an output transaction (e.g., every output transaction if instantiated as such) to identify data that is generated at a specified point of time during execution of an AI/ML model.

In some examples, if address spaces erroneously overlap in a hardware accelerator workload configuration, output data may be overwritten. With many different output streams from a single workload and different workloads from different cores being run in parallel, the potential for inadvertent overwrites increases. In some such examples, a software debugger may be used to analyze generated outputs and root-cause issues, but such efforts are difficult and consume a substantial amount of time. Advantageously, the example debug circuitry disclosed herein reduces the difficulty and time consumption of such efforts.

In some examples, due to a wrong configuration, an accelerator output may be sent to a completely different address space outside of the actual provisioned accelerator memory. A software debugger may be deficient in locating the output if an address at which the output is sent is unknown. For example, the software debugger may analyze the memory contents, but if the memory content is not as expected or has not yet been written, the software debugger may not be able to determine if memory transactions were issued or the memory transactions were issued to a wrong address outside the observable address space. Advantageously, the example debug circuitry disclosed herein overcomes such deficiencies.

In some examples, a machine-learning model is to be modified through a change in the compiler software to improve better understanding of an issue and to pinpoint the root-cause of the issue. However, having to implement custom modifications in software for debugging purposes is extremely time-consuming especially if the issue arises only due to parallel core execution. Advantageously, the example debug circuitry disclosed herein overcomes such deficiencies.

In some examples, having to isolate a particular erroneous datum that is being generated during a network run with millions of output points to analyze can be a tedious task if no hardware support is present that could automatically detect a specific piece of data, halt execution, and signal to a user for further instruction. In some such examples, there may not be a capability in the hardware accelerator to detect writes to certain addresses or address ranges and thereby results in deficiencies when isolating writes that are unexpected. Advantageously, the example debug circuitry disclosed herein overcomes such deficiencies.

FIG. 1 is an illustration of an example computing environment 100 including an example computing system 102, which includes an example central processing unit (CPU) 104, an example field programmable gate array (FPGA) 106, first example accelerator circuitry 108 (identified by ACCELERATOR CIRCUITRY A), and second example accelerator circuitry 110 (identified by ACCELERATOR CIRCUITRY B). In the illustrated example, the first accelerator circuitry 108 and the second accelerator circuitry 110 include example debug circuitry 112. In the illustrated example, the CPU 104 and the FPGA 106 include and/or otherwise instantiate an example debug application 114 (identified by DEBUG APP). In this example, the computing system 102 includes example interface circuitry 116, example memory 118, an example power source 120, and an example datastore 122.

In the illustrated example, the datastore 122 includes example machine-learning (ML) model(s) 124 and example breakpoint(s) 126. For example, the ML model(s) 124 may include one or more ML models, and one(s) of the ML models may be of different types from each other. The breakpoint(s) 126 may include one or more breakpoints that, when triggered, activated, and/or otherwise invoked by the debug circuitry 112, and/or, more generally, the first accelerator circuitry 108 and/or the second accelerator circuitry 110, may halt an execution of an executable, which may be implemented by an executable binary, executable code (e.g., executable machine readable code), an executable file (e.g., an executable binary file), an executable program, executable instructions (e.g., executable machine readable instructions), etc., that correspond to one of the ML model(s) 124. In some examples, the breakpoint(s) 126 may include a breakpoint on a start of a workload, a breakpoint on a specific data item in process of being written or to be written, a breakpoint on a specific address or address range to which is written, a breakpoint on a specific data item being read into the accelerator circuitry 108, 110 from the memory 118, a breakpoint on a specific address or address range being read from the memory 118, a breakpoint on a generation of a specific internal data item to the accelerator circuitry 108, 110, etc.

In the illustrated example of FIG. 1, the CPU 104, the FPGA 106, the first accelerator circuitry 108, the second accelerator circuitry 110, the debug circuitry 112, the debug application 114, the interface circuitry 116, the memory 118, the power source 120, and the datastore 122 are in communication with one(s) of each other via an example bus 128. For example, the bus 128 may be implemented with at least one of an Inter-Integrated Circuit (I2C) bus, a Serial Peripheral Interface (SPI) bus, a Peripheral Component Interconnect (PCI) bus, or a Peripheral Component Interconnect express (PCIe) bus. Additionally or alternatively, the bus 128 may be implemented with any other type of computing or electrical bus. Further depicted in the computing environment 100 is an example user interface 130, an example network 132, and example external computing systems 134.

In some examples, the computing system 102 is a system on a chip (SoC) representative of one or more integrated circuits (ICs) (e.g., compact ICs) that incorporate components of a computer or other electronic system in a compact format. For example, the computing system 102 may be implemented with a combination of one or more types of processor circuitry, hardware logic, and/or hardware peripherals and/or interfaces. Additionally or alternatively, the computing system 102 may include input/output (I/O) port(s) and/or secondary storage. For example, the computing system 102 may include the CPU 104, the FPGA 106, the first accelerator circuitry 108, the second accelerator circuitry 110, the debug circuitry 112, the interface circuitry 116, the memory 118, the power source 120, the datastore 122, the bus 128, the I/O port(s), and/or the secondary storage all on the same substrate (e.g., silicon substrate, semiconductor-based substrate, etc.). In some examples, the computing system 102 includes digital, analog, mixed-signal, radio frequency (RF), or other signal processing functions.

The FPGA 106 of the example of FIG. 1 is a field programmable logic device (FPLD). For example, once configured, the FPGA 106 may instantiate the debug application 114. Alternatively, one or more of the FPGA 106, the first accelerator circuitry 108, and/or the second accelerator circuitry 110 may be a different type of hardware such as a digital signal processor (DSP), an application specific integrated circuit (ASIC), and/or a programmable logic device (PLD).

In the illustrated example of FIG. 1, the first accelerator circuitry 108 is an artificial intelligence (AI) accelerator. For example, the first accelerator circuitry 108 may implement a hardware accelerator configured to accelerate AI tasks or workloads, such as neural networks (e.g., convolution neural networks (CNNs), deep neural networks (DNNs), artificial neural networks (ANNs), etc.), machine vision, machine learning, etc. In some examples, the first accelerator circuitry 108 may implement a sparse accelerator (e.g., a sparse hardware accelerator). In some examples, the first accelerator circuitry 108 may implement a vision processing unit (VPU) to effectuate machine or computer vision computing tasks, and/or train and/or execute a neural network. In some examples, the first accelerator circuitry 108 may train and/or execute a CNN, a DNN, an ANN, a recurrent neural network (RNN), etc., and/or a combination thereof.

In the illustrated example of FIG. 1, the second accelerator circuitry 110 is a graphics processor unit (GPU). For example, the second accelerator circuitry 110 may be a GPU that generates computer graphics, executes general-purpose computing, executes vector workloads, etc. In some examples, the second accelerator circuitry 110 is another instance of the first accelerator circuitry 108. For example, the second accelerator circuitry 110 may be an AI accelerator. In some such examples, the computing system 102 (or portion(s) thereof such as the CPU 104) may provide portion(s) of AI/ML workloads to be executed in parallel by the first accelerator circuitry 108 and the second accelerator circuitry 110.

In the illustrated example of FIG. 1, the interface circuitry 116 is hardware that may implement one or more interfaces (e.g., computing interfaces, network interfaces, etc.). For example, the interface circuitry 116 may be hardware, software, and/or firmware that implements a communication device (e.g., a network interface card (NIC), a smart NIC, a gateway, a switch, etc.) such as a transmitter, a receiver, a transceiver, a modem, a residential gateway, a wireless access point, and/or a network interface to facilitate an exchange of data with external machines (e.g., computing devices of any kind) via the network 132. In some examples, the interface circuitry 116 effectuates the communication by a Bluetooth® connection, an Ethernet connection, a digital subscriber line (DSL) connection, a wireless fidelity (Wi-Fi) connection, a telephone line connection, a coaxial cable system, a satellite system, a line-of-site wireless system, a cellular telephone system, an optical connection (e.g., a fiber-optic connection), etc. For example, the interface circuitry 116 may be implemented by any type of interface standard, such as a Bluetooth® interface, an Ethernet interface, a Wi-Fi interface, a universal serial bus (USB), a near field communication (NFC) interface, a PCI interface, and/or a PCIe interface.

The memory 118 of the illustrated example may be implemented by at least one volatile memory (e.g., a Synchronous Dynamic Random Access Memory (SDRAM), a Dynamic Random Access Memory (DRAM), a RAMBUS Dynamic Random Access Memory (RDRAM), etc.) and/or at least one non-volatile memory (e.g., flash memory).

The computing system 102 includes the power source 120 to deliver power to hardware of the computing system 102. In some examples, the power source 120 may implement a power delivery network. For example, the power source 120 may implement an alternating current-to-direct current (AC/DC) power supply, a direct current-to-direct current (DC/DC) power supply, etc. In some examples, the power source 120 may be coupled to a power grid infrastructure such as an AC main (e.g., a 110 volt (V) AC grid main, a 220V AC grid main, etc.). Additionally or alternatively, the power source 120 may be implemented by one or more batteries. For example, the power source 120 may be a limited energy device, such as a lithium-ion battery or any other chargeable battery or power source. In some such examples, the power source 120 may be chargeable using a power adapter or converter (e.g., an AC/DC power converter), a wall outlet (e.g., a 110V AC wall outlet, a 220V AC wall outlet, etc.), a portable energy storage device (e.g., a portable power bank, a portable power cell, etc.), etc.

The computing system 102 of the illustrated example of FIG. 1 includes the datastore 122 to record data (e.g., the ML model(s) 124, the breakpoint(s) 126, etc.). The datastore 122 of this example may be implemented by a volatile memory and/or a non-volatile memory (e.g., flash memory). The datastore 122 may additionally or alternatively be implemented by one or more double data rate (DDR) memories, such as DDR, DDR2, DDR3, DDR4, mobile DDR (mDDR), etc. The datastore 122 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the datastore 122 is illustrated as a single datastore, the datastore 122 may be implemented by any number and/or type(s) of datastores. Furthermore, the data stored in the datastore 122 may be in any data format such as, for example, binary data, comma delimited data, tab delimited data, structured query language (SQL) structures, an executable (e.g., an executable binary, a configuration image, etc.), etc.

In the illustrated example of FIG. 1, the computing system 102 is in communication with the user interface 130. For example, the user interface 130 may be implemented by a graphical user interface (GUI), an application user interface, etc., which may be presented to a user on a display device in circuit with and/or otherwise in communication with the computing system 102. In this example, the user interface 130 may implement the debug application 114. For example, a user (e.g., a developer, an IT administrator, a customer, etc.) may control the computing system 102, configures, trains, executes, and/or debugs the ML model(s) 124, generates and/or modifies the breakpoint(s) 126, etc., with the debug application 114 by interacting with the user interface 130. Alternatively, the computing system 102 may include and/or otherwise implement the user interface 130.

In the illustrated example of FIG. 1, the network 132 is the Internet. However, the network 132 of this example may be implemented using any suitable wired and/or wireless network(s) including, for example, one or more data buses, one or more Local Area Networks (LANs), one or more wireless LANs, one or more cellular networks, one or more private networks, one or more public networks, one or more edge networks, etc. In some examples, the network 132 enables the computing system 102 to be in communication with one(s) of the external computing systems 134.

In the illustrated example of FIG. 1, the external computing systems 134 include and/or otherwise implement one or more computing devices on which the ML model(s) 124 is/are to be executed. In this example, the external computing systems 134 include an example desktop computer 136, an example mobile device (e.g., a smartphone, an Internet-enabled smartphone, etc.) 138, an example laptop computer 140, an example tablet (e.g., a tablet computer, an Internet-enabled tablet computer, etc.) 142, and an example server (e.g., an edge server, a rack-mounted server, a virtualized server, etc.) 144. In some examples, fewer or more than the external computing systems 134 depicted in FIG. 1 may be used. Additionally or alternatively, the external computing systems 134 may include, correspond to, and/or otherwise be representative of, any other type and/or quantity of computing devices. For example, one(s) of the external computing systems 134 may be virtualized computing systems.

In some examples, one or more of the external computing systems 134 execute one(s) of the ML model(s) 124 to process a computing workload (e.g., an AI/ML workload). For example, the mobile device 138 can be implemented as a cell or mobile phone having processor circuitry (e.g., a CPU, a GPU, a VPU, an AI or neural network specific processor, etc.) on a single SoC to process an AI/ML workload using one(s) of the ML model(s) 124. In some examples, the desktop computer 136, the mobile device 138, the laptop computer 140, the tablet computer 142, and/or the server 144 may be implemented as computing device(s) having processor circuitry (e.g., a CPU, a GPU, a VPU, an AI or neural network specific processor, etc.) on one or more SoCs to process AI/ML workload(s) using one(s) of the ML model(s) 124. In some examples, the server 144 may implement one or more servers (e.g., physical servers, virtualized servers, etc., and/or a combination thereof) that may implement a data facility, a cloud service (e.g., a public or private cloud provider, a cloud-based repository, etc.), etc., to process AI/ML workload(s) using one(s) of the ML model(s) 124.

In the illustrated example of FIG. 1, the debug application 114 obtains the ML model(s) 124 and compiles and/or otherwise generates an output, such as an executable binary, that may be executed on the first accelerator circuitry 108 and/or the second accelerator circuitry 110 to perform accelerator operations, such as AI/ML workloads. For example, the debug application 114 may implement a compiler (e.g., an accelerator compiler, an AI/ML compiler, a neural network compiler, etc.). In some such examples, the debug application 114 may compile a configuration image based on the ML model(s) 124 and/or the breakpoint(s) 126 for implementation on one(s) of the accelerator circuitry 108, 110. For example, the configuration image may be implemented by an executable binary including AI/ML configuration data (e.g., register configurations, activation data, activation sparsity data, weight data, weight sparsity data, hyperparameters, etc.), an AI/ML operation (e.g., a convolution, a neural network layer, etc.) to be executed.

In the illustrated example of FIG. 1, the debug application 114 may instruct, direct, and/or otherwise invoke one(s) of the accelerator circuitry 108, 110 to execute one(s) of the ML model(s) 124, and the debug application 114 may configure the debug circuitry 112 to debug the execution(s) of the ML model(s) 124. AI, including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the machine-learning model(s) 124 may be trained with data to recognize patterns and/or associations and follow such patterns and/or associations when processing input data such that other input(s) result in output(s) consistent with the recognized patterns and/or associations.

Many different types of machine-learning models and/or machine-learning architectures exist. In some examples, the debug application 114 generates the machine-learning model(s) 124 as neural network model(s). The debug application 114 may instruct the interface circuitry 116 to transmit the machine-learning model(s) 124 to one(s) of the external computing systems 134. Using a neural network model enables the accelerator circuitry 108, 110 to execute an AI/ML workload. In general, machine-learning models/architectures that are suitable to use in the example approaches disclosed herein include recurrent neural networks. However, other types of machine learning models could additionally or alternatively be used such as supervised learning ANN models, clustering models, classification models, etc., and/or a combination thereof. Example supervised learning ANN models may include two-layer (2-layer) radial basis neural networks (RBN), learning vector quantization (LVQ) classification neural networks, etc. Example clustering models may include k-means clustering, hierarchical clustering, mean shift clustering, density-based clustering, etc. Example classification models may include logistic regression, support-vector machine or network, Naive Bayes, etc. In some examples, the debug application 114 may compile and/or otherwise generate one(s) of the machine-learning model(s) 124 as lightweight machine-learning models.

In general, implementing an ML/AI system involves two phases, a learning/training phase and an inference phase. In the learning/training phase, a training algorithm is used to train the machine-learning model(s) 124 to operate in accordance with patterns and/or associations based on, for example, training data. In general, the machine-learning model(s) 124 include(s) internal parameters (e.g., configuration data) that guide how input data is transformed into output data, such as through a series of nodes and connections within the machine-learning model(s) 124 to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, the debug application 114 may invoke supervised training to use inputs and corresponding expected (e.g., labeled) outputs to select parameters (e.g., by iterating over combinations of select parameters) for the machine-learning model(s) 124 that reduce model error. As used herein, "labeling" refers to an expected output of the machine learning model (e.g., a classification, an expected output value, etc.). Alternatively, the debug application 114 may invoke unsupervised training (e.g., used in deep learning, a subset of machine learning, etc.) that involves inferring patterns from inputs to select parameters for the machine-learning model(s) 124 (e.g., without the benefit of expected (e.g., labeled) outputs).

In some examples, the debug application 114 trains the machine-learning model(s) 124 using unsupervised clustering of operating observables. However, the debug application 114 may additionally or alternatively use any other training algorithm such as stochastic gradient descent, Simulated Annealing, Particle Swarm Optimization, Evolution Algorithms, Genetic Algorithms, Nonlinear Conjugate Gradient, etc.

In some examples, the debug application 114 may train the machine-learning model(s) 124 until the level of error is no longer reducing. In some examples, the debug application 114 may train the machine-learning model(s) 124 locally on the computing system 102 and/or remotely at an external computing system (e.g., one(s) of the external computing systems 134) communicatively coupled to the computing system 102. In some examples, the debug application 114 trains the machine-learning model(s) 124 using hyperparameters that control how the learning is performed (e.g., a learning rate, a number of layers to be used in the machine learning model, etc.). In some examples, the debug application 114 may use hyperparameters that control model performance and training speed such as the learning rate and regularization parameter(s). The debug application 114 may select such hyperparameters by, for example, trial and error to reach an optimal model performance. In some examples, the debug application 114 utilizes Bayesian hyperparameter optimization to determine an optimal and/or otherwise improved or more efficient network architecture to avoid model overfitting and improve the overall applicability of the machine-learning model(s) 124. Alternatively, the debug application 114 may use any other type of optimization. In some examples, the debug application 114 may perform re-training. The debug application 114 may execute such re-training in response to override(s) by a user of the computing system 102, a receipt of new training data, in response to a debugging of the accelerator circuitry 108, 110, etc.

In some examples, the debug application 114 facilitates the training of the machine-learning model(s) 124 using training data. In some examples, the debug application 114 utilizes training data that originates from locally generated data. In some examples, the debug application 114 utilizes training data that originates from externally generated data. In some examples where supervised training is used, the debug application 114 may label the training data. Labeling is applied to the training data by a user manually or by an automated data pre-processing system. In some examples, the debug application 114 may pre-process the training data using, for example, an interface (e.g., the interface circuitry 116). In some examples, the debug application 114 subdivides the training data into a first portion of data for training the machine-learning model(s) 124, and a second portion of data for validating the machine-learning model(s) 124.

Once training is complete, the debug application 114 may deploy the machine-learning model(s) 124 for use as an executable construct that processes an input and provides an output based on the network of nodes and connections defined in the machine-learning model(s) 124. The debug application 114 may store the machine-learning model(s) 124 in the datastore 122. In some examples, the debug application 114 may invoke the interface circuitry 116 to transmit the machine-learning model(s) 124 to one(s) of the external computing systems 134. In some such examples, in response to transmitting the machine-learning model(s) 124 to the one(s) of the external computing systems 134, the one(s) of the external computing systems 134 may execute the machine-learning model(s) 124 to execute AI/ML workloads with at least one of improved efficiency or performance. Advantageously, in response to the debugging of ML model(s) 124, the debug application 114 may publish and/or otherwise push more accurate ML model(s) 124 than previous implementations.

Once trained, the deployed one(s) of the machine-learning model(s) 124 may be operated in an inference phase to process data. In the inference phase, data to be analyzed (e.g., live data) is input to the machine-learning model(s) 124, and the machine-learning model(s) 124 execute(s) to create an output. This inference phase can be thought of as the AI "thinking" to generate the output based on what it learned from the training (e.g., by executing the machine-learning model(s) 124 to apply the learned patterns and/or associations to the live data). In some examples, input data undergoes pre-processing before being used as an input to the machine-learning model(s) 124. Moreover, in some examples, the output data may undergo post-processing after it is generated by the machine-learning model(s) 124 to transform the output into a useful result (e.g., a display of data, a detection and/or identification of an object, an instruction to be executed by a machine, etc.).

In some examples, output of the deployed one(s) of the machine-learning model(s) 124 may be captured and provided as feedback. By analyzing the feedback, an accuracy of the deployed one(s) of the machine-learning model(s) 124 can be determined. If the feedback indicates that the accuracy of the deployed model is less than a threshold or other criterion, training of an updated model can be triggered using the feedback and an updated training data set, hyperparameters, etc., to generate an updated, deployed model.

In some examples, the debug application 114 may configure the debug circuitry 112 to debug and/or troubleshoot undesired accelerator performance or ML model execution. For example, the debug circuitry 112 may receive input(s) (e.g., ML input(s)) to be processed by the accelerator circuitry 108, 110. In some such examples, in response to the breakpoint(s) 126 not being triggered based on the input(s) (e.g., value(s) of the input(s), address(es) of the input(s), etc.), the accelerator circuitry 108, 110 may pass the input(s) to a core of the accelerator circuitry 108, 110 and the debug circuitry 112 may thereby operate in a bypass operation mode. In some examples, in response to one(s) of the breakpoint(s) 126 being triggered based on the input(s), the debug circuitry 112 may execute a debug operation, which may include reading out an accelerator transaction, reading out the triggered breakpoint(s), modifying the breakpoint(s), modifying the input(s), etc., and/or a combination thereof. Advantageously, the debug circuitry 112 may decrease debugging time associated with the accelerator circuitry 108, 110 and/or the ML model(s) 124 by halting execution of an accelerator pipeline in response to a breakpoint being triggered based on input(s) to the ML model(s) 124.

In some examples, the debug circuitry 112 may receive output(s) (e.g., ML output(s)) generated by the accelerator circuitry 108, 110 in response to an execution of the ML model(s) 124. In some such examples, in response to the breakpoint(s) 126 not being triggered based on the output(s) (e.g., value(s) of the output(s), address(es) of the output(s), etc.), the accelerator circuitry 108, 110 may pass the output(s) to the memory 118 and may thereby operate in a bypass operation mode. In some examples, in response to one(s) of the breakpoint(s) 126 being triggered based on the output(s), the debug circuitry 112 may execute a debug operation, which may include reading out an accelerator transaction, reading out the triggered breakpoint(s), modifying the breakpoint(s), modifying the input(s), etc., and/or a combination thereof. Advantageously, the debug circuitry 112 may decrease debugging time associated with the accelerator circuitry 108, 110 and/or the ML model(s) 124 by halting execution of an accelerator pipeline in response to a breakpoint being triggered based on output(s) to the ML model(s) 124.

Figure 2:
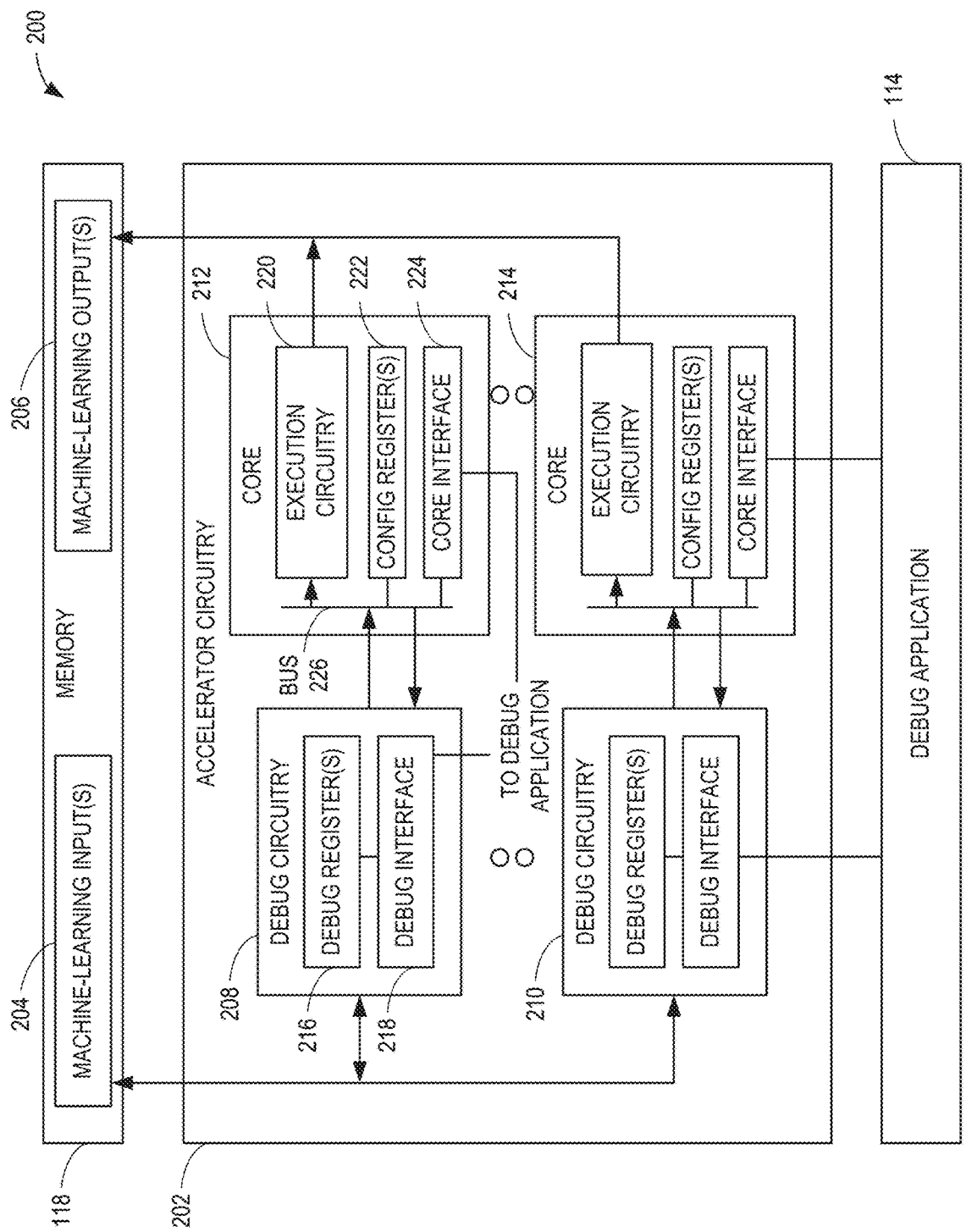
FIG. 2 is a block diagram of an example implementation of the accelerator circuitry and the debug circuitry of FIG. 1.

FIG. 2 is a block diagram of a first example accelerator circuitry debug system 200 including the debug application 114 of FIG. 1, the memory 118 of FIG. 1, and third example accelerator circuitry 202. In some examples, the third accelerator circuitry 202 of FIG. 2 may be an example implementation of the first accelerator circuitry 108 and/or the second accelerator circuitry 110 of FIG. 1.

In the illustrated example of FIG. 2, the memory 118 includes example machine-learning input(s) 204 and example machine-learning output(s) 206. For example, the machine-learning input(s) 204 may be data to be processed by the ML model(s) 124 of FIG. 1, which may be instantiated by the third accelerator circuitry 202, to generate the machine-learning output(s) 206. In some such examples, the machine-learning input(s) 204 may be numerical data, categorical data, time-series data, text data, portion(s) of digital images and/or video, sensor data, etc., and/or any other type of data (e.g., data associated with autonomous motion, robotic control, Internet-of-Things (IoT) data, etc.) that may be processed and/or analyzed by a machine-learning model. In some examples, the machine-learning output(s) 206 may be numerical data, categorical data, time-series data, text data, etc., and/or a combination thereof. For example, the third accelerator circuitry 202 may output numerical data from multiply-accumulator (MAC) circuitry of the third accelerator circuitry 202.

The third accelerator circuitry 202 includes example debug circuitry 208, 210 and example cores (e.g., core circuitry) 212, 214. For example, the third accelerator circuitry 202 includes two or more instances of the debug circuitry 208, 210 and two or more instances of the cores 212, 214. Alternatively, the third accelerator circuitry 202 may include fewer instances of the debug circuitry 208, 210 and/or the cores 212, 214. In some examples, the debug circuitry 208, 210 may be an example implementation of the debug circuitry 112 of FIG. 1.

The debug circuitry 208, 210 of the illustrated example includes example debug register(s) 216. In some examples, the debug register(s) 216 may include one or more registers that may be implemented with vector register(s), single instruction multiple data (SIMD) register(s), general purpose register(s), flag register(s), segment register(s), machine specific register(s), instruction pointer register(s), control register(s), debug register(s), memory management register(s), machine check register(s), etc. The debug register(s) 216 may store data values corresponding to configuration parameters, settings, etc., of the debug circuitry 208, 210. For example, the debug register(s) 216 may store value(s) representative of a breakpoint to be triggered by the debug circuitry 208, 210 and/or the cores 212, 214. In some examples, the debug register(s) 216 may store value(s) corresponding to one(s) of the machine-learning input(s) 204, address(es) and/or an address range associated with the one(s) of the machine-learning input(s) 204, one(s) of the machine-learning output(s) 206, address(es) and/or an address range associated with the one(s) of the machine-learning output(s) 206, etc., and/or a combination thereof.

The debug circuitry 208, 210 of the illustrated example includes an example debug interface 218. In some examples, the debug interface 218 may be implemented with an I2C bus, a SPI bus, a PCI bus, a PCIe bus, and/or any other type of electrical, hardware, or computing bus. In some examples, the debug application 114 may transmit data to and/or store or write data in the debug register(s) 216 of the debug circuitry 208, 210, and/or, more generally, the debug circuitry 208, 210, by the debug interface 218. In some examples, the debug application 114 may receive data from the debug register(s) 216, and/or, more generally, the debug circuitry 208, 210, by the debug interface 218.

The cores 212, 214 of the illustrated example include example execution circuitry 220. In some examples, the execution circuitry 220 may be implemented with circuitry that may generate the machine-learning output(s) 206 based on the machine-learning input(s) 204. For example, the execution circuitry 220 may implement one(s) of the machine-learning model(s) 124 of FIG. 1. In some such examples, the execution circuitry 220 may be implemented with MAC circuitry, data path unit (DPU) circuitry, arithmetic logic circuitry (e.g., one or more arithmetic logic units (ALUs)), etc., and/or a combination thereof. For example, the debug application 114 may compile an executable binary based on the machine-learning model(s) 124 and provide the executable binary to the cores 212, 214 by the core interface 224. In some such examples, the execution circuitry 220 may be configured based on the executable binary to implement the machine-learning model(s) 124. In some examples, the debug application 114 may compile the executable binary by including one or more breakpoints in the executable binary. In some such examples, the cores 212, 214 may store value(s) of the one or more breakpoints, and/or, more generally, the one or more breakpoints, in the configuration register(s) 222 to be invoked by the execution circuitry 220.

The cores 212, 214 of the illustrated example include example configuration register(s) 222 (identified by CONFIG REGISTER(S)). In some examples, the configuration register(s) 222 may include one or more registers that may be implemented with vector register(s), SIMD register(s), general purpose register(s), flag register(s), segment register(s), machine specific register(s), instruction pointer register(s), control register(s), debug register(s), memory management register(s), machine check register(s), etc. The configuration register(s) 222 may store data values corresponding to configuration parameters, settings, etc., of the execution circuitry 220, and/or, more generally, the cores 212, 214. For example, the configuration register(s) 222 may store values(s) from the executable binary to configure the execution circuitry 220, and/or, more generally, the cores 212, 214, to implement the machine-learning model(s) 124. In some examples, the configuration register(s) 222 may store value(s) representative of a breakpoint to be triggered by the debug circuitry 208, 210 and/or the cores 212, 214. In some examples, the configuration register(s) 222 may store value(s) corresponding to one(s) of the machine-learning input(s) 204, address(es) and/or an address range associated with the one(s) of the machine-learning input(s) 204, one(s) of the machine-learning output(s) 206, address(es) and/or an address range associated with the one(s) of the machine-learning output(s) 206, etc., and/or a combination thereof.

The cores 212, 214 of the illustrated example include an example core interface 224. In some examples, the core interface 224 may be implemented with an I2C bus, a SPI bus, a PCI bus, a PCIe bus, and/or any other type of electrical, hardware, or computing bus. In some examples, the debug application 114 may transmit data to and/or store or write data in the configuration register(s) 222 of the cores 212, 214, and/or, more generally, the cores 212, 214, by the core interface 224. In some examples, the debug application 114 may receive data from the configuration register(s) 222, and/or, more generally, the cores 212, 214, by the core interface 224.

In the illustrated example of FIG. 2, the third accelerator circuitry 202 is implemented with the debug circuitry 208, 210 instantiated to trigger and/or otherwise invoke breakpoint(s) based on the machine-learning input(s) 204. In the illustrated example, input(s) (e.g., input terminal(s), input connection(s), etc.) of the debug circuitry 208, 210 is/are coupled to output(s) of the memory 118. Output(s) (e.g., output terminal(s), output connection(s), etc.) of the debug circuitry 208, 210 is/are coupled to input(s) of the core(s) 212, 214. For example, the output(s) of the debug circuitry 208, 210 is/are coupled to an example bus 226, the execution circuitry 220, the configuration register(s) 222, and/or the core interface 224 of the cores 212, 214. In some examples, the bus 226 may be implemented with an I2C bus, a SPI bus, a PCI bus, a PCIe bus, and/or any other type of electrical, hardware, or computing bus. Output(s) of the cores 212, 214 is/are coupled to input(s) of the memory 118. In some examples, the debug interface 218 and the core interface 224 are instantiated to be in communication with the debug application 114.

In example operation, the execution circuitry 220 may execute an executable binary to implement one of the ML model(s) 124 of FIG. 1. In response to an execution of the executable binary, the execution circuitry 220 may execute a read operation to obtain one(s) of the machine-learning input(s) 204. In example operation, the execution circuitry 220 may generate a request to read the one(s) of the machine-learning input(s) 204 at one or more addresses of the memory 118. The debug circuitry 208, 210 may obtain the request and the one or more addresses.

In some examples, the debug circuitry 208, 210 may provide the request to the memory 118 in response to a breakpoint not being triggered. For example, the debug circuitry 208, 210 may determine that the one or more addresses do not match an address associated with the breakpoint. The debug circuitry 208, 210 may receive the requested one(s) of the machine-learning input(s) 204 from the memory 118. In example operation, the debug circuitry 208, 210 may provide the requested one(s) of the machine-learning input(s) 204 to the cores 212, 214 in response to a breakpoint not being triggered. The execution circuitry 220 may generate the machine-learning output(s) 206 based on the machine-learning input(s) 204. The execution circuitry 220 may write the machine-learning output(s) 206 to the memory 118.

In some examples, the debug circuitry 208, 210 may trigger a breakpoint in response to a determination that (i) the one or more addresses matches the address (or a range of addresses) associated with the breakpoint and/or (ii) the requested one(s) of the machine-learning input(s) 204 matches value(s) associated with the breakpoint. For example, the debug circuitry 208, 210 may trigger a breakpoint in response to a second determination that an address (or a range of addresses) at which the value of the machine-learning input(s) 204 is stored matches a value of the breakpoint. In some examples, the debug circuitry 208, 210 may compare first value(s) of the machine-learning input(s) 204 to second value(s) of the debug register(s) 216. In some examples, the debug circuitry 208, 210 may trigger a breakpoint (e.g., a debug breakpoint) in response to the first value(s) matching the second value(s). For example, the debug circuitry 208, 210 may trigger a breakpoint in response to a first determination that a value of the machine-learning input(s) 204 matches a value of the breakpoint. In example operation, the debug circuitry 208, 210 may halt an execution of the executable binary by the cores 212, 214 in response to the breakpoint being triggered.

In some examples, the debug application 114 may execute and/or cause execution of a debug operation in response to one or more breakpoints being triggered. For example, the debug application 114 may query at least one of the cores 212, 214 or the debug circuitry 208, 210 for the invoked breakpoint(s). In some examples, the debug application 114 may retrieve and/or otherwise access at least one of the machine-learning input(s) 204, the machine-learning output(s) 206, or associated memory address(es) of the machine-learning input(s) 204 and/or the machine-learning output(s) 206 (e.g., an address or address range at which the machine-learning input(s) 204 are read from the memory 118 or an address or address range at which the machine-learning output(s) 206 are to be written to the memory 118). In some examples, the debug circuitry 208, 210, and/or, more generally, the third accelerator circuitry 202, may output the at least one of the machine-learning input(s) 204, the machine-learning output(s) 206, or the associated memory address(es) of the machine-learning input(s) 204 and/or the machine-learning output(s) 206 by the debug interface 218. In some examples, the debug application 114 may determine a progress of completion of workload(s) (e.g., machine-learning workload(s)) executed by the cores 212, 214 by querying the cores 212, 214 to obtain data indicative at which portion of an execution of the executable binary the one or more breakpoints are triggered.

In some examples, the debug application 114 may execute and/or cause execution of a debug operation in response to one or more breakpoints being triggered, and the debug operation may include an adjustment and/or modification of a data value. For example, the debug application 114 may change value(s) of the machine-learning input(s) 204 stored in the memory 118, the debug circuitry 208, 210, and/or the cores 212, 214.

In some examples, the debug application 114 may execute and/or cause execution of a debug operation in response to one or more breakpoints being triggered, and the debug operation may include an incremental operation of the executable binary. For example, the debug application 114 may instruct the debug circuitry 208, 210, and/or, more generally, the third accelerator circuitry 202, to execute an incremental operation (e.g., an incremental accelerator operation, a single-step operation of the accelerator circuitry 108, 110, etc.) of the executable. In some such examples, the incremental operation may include one or more read operations, one or more write operations, and/or one or more computation operations. For example, the debug application 114 may instruct the debug circuitry 208, 210 to obtain a first input of the machine-learning input(s) 204 and/or read out the first input to the debug application 114 by the debug interface 218. In some such examples, the debug application 114 may instruct the debug circuitry 208, 210 to determine whether the first input triggers one or more breakpoints. In some such examples, the debug application 114 may instruct the debug circuitry 208, 210 to provide the first input to the execution circuitry 220 of the cores 212, 214 to generate a first output of the machine-learning output(s) 206. In some examples, the debug application 114 may instruct the cores 212, 214 to read out the first output to the debug application 114 by the core interface 224. Advantageously, the debug application 114 may debug the third accelerator circuitry 202 in an incremental manner to identify erroneous hardware accelerator operations with improved accuracy and granularity compared to prior implementations.

Advantageously, the debug circuitry 208, 210 can be implemented to speed up software and compiler development for a hardware accelerator, such as the third accelerator circuitry 202. For example, as the complexity of machine-learning models, such as neural networks, is constantly increasing, the effort to pinpoint any issues (e.g., bugs, performance bottlenecks, etc.) in the execution of those machine-learning models in the hardware accelerator is growing. With the debug circuitry 208, 210, and/or, more generally, the debug circuitry 112 of FIG. 1, the task to isolate any issues can be greatly simplified. Advantageously, the debug circuitry 208, 210 may render dedicated external debugging equipment to perform debug operations on the hardware accelerator unnecessary. For example, a compiler engineer may command full use of the debug circuitry 208, 210 by establishing a communication channel (e.g., a SPI communication channel, an I2C communication channel, a communication channel that utilizes Application Programming Interface(s) (API(s)), etc.) into the hardware accelerator.

In some examples, a software model exists that allows a pre-computation of an expected hardware output for a given input for the machine-learning model(s) 124. In some such examples, for each workload identified by an executable binary, the memory transactions can be obtained from the debug circuitry 208, 210 and matched against the expected output from the software model. In some such examples, the debug application 114 may identify an issue based on a detected mismatch.

Figure 3:
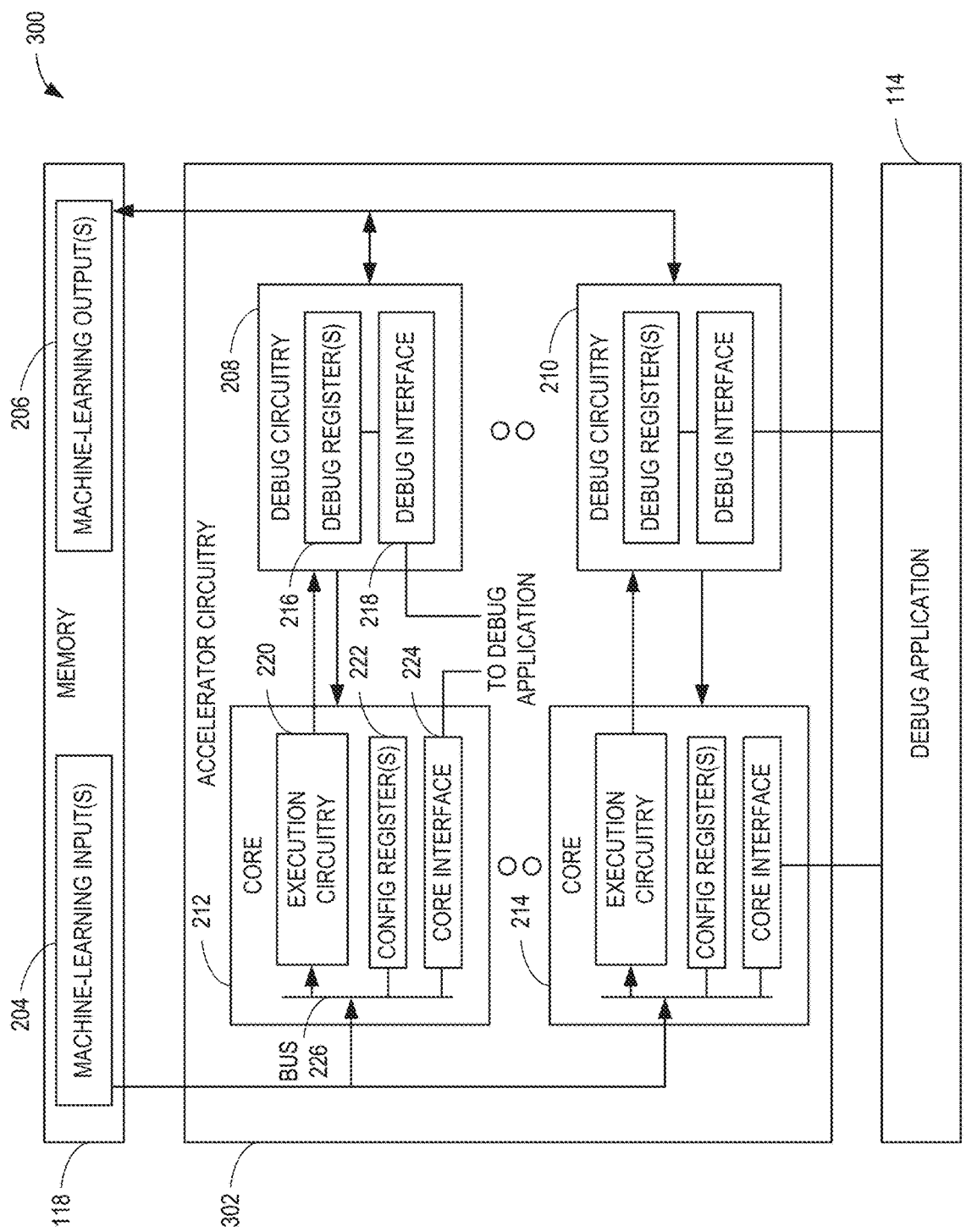
FIG. 3 is a block diagram of another example implementation of the accelerator circuitry and the debug circuitry of FIG. 1.

FIG. 3 is a block diagram of a second example accelerator circuitry debug system 300 including the debug application 114 of FIG. 1, the memory 118 of FIG. 1, and fourth example accelerator circuitry 302. In some examples, the fourth accelerator circuitry 302 of FIG. 3 may be an example implementation of the first accelerator circuitry 108 and/or the second accelerator circuitry 110 of FIG. 1.

The fourth accelerator circuitry 302 includes the debug circuitry 208, 210 of FIG. 2, which include the debug register(s) 216 and the debug interface 218 of FIG. 2. The fourth accelerator circuitry 302 includes the cores 212, 214 of FIG. 2, which include the execution circuitry 220, the configuration register(s) 222, the core interface 224, and the bus 226 of FIG. 2.

In the illustrated example of FIG. 3, the fourth accelerator circuitry 302 is implemented with the debug circuitry 208, 210 instantiated to trigger and/or otherwise invoke breakpoint(s) based on the output(s) from the cores 212, 214, and/or, more generally, the machine-learning output(s) 206. In the illustrated example, input(s) of the cores 212, 214 is/are coupled to output(s) of the memory 118. For example, input(s) of the execution circuitry 220, the configuration register(s) 222, the core interface 224, and/or the bus 226 may be coupled to the output(s) of the memory 118. Output(s) of the cores 212, 214 is/are coupled to input(s) of the debug circuitry 208, 210. For example, the output(s) of the cores 212, 214 is/are coupled to the debug register(s) 216 and/or the debug interface 218 of the debug circuitry 208, 210. Output(s) of the debug circuitry 208, 210 is/are coupled to input(s) of the memory 118. In some examples, the debug interface 218 and the core interface 224 are instantiated to be in communication with the debug application 114.

In example operation, the bus 226, and/or, more generally, the cores 212, 214, may obtain the machine-learning input(s) 204 from the memory 118. The execution circuitry 220 may generate the machine-learning output(s) 206 based on the machine-learning input(s) 204. The execution circuitry 220 may provide, deliver, and/or otherwise output the machine-learning output(s) 206 to the debug circuitry 208, 210.

In example operation, the debug circuitry 208, 210 may output and/or otherwise write the machine-learning output(s) 206 to the memory 118 in response to determining that the machine-learning output(s) 206, or data associated thereof (e.g., a memory address, a range of memory addresses, etc.), do not trigger a breakpoint. In example operation, the debug circuitry 208, 210 may halt an execution of the workload in progress by the cores 212, 214 by not executing read operations from the cores 212, 214 in response to determining that one or more breakpoints are triggered based on the machine-learning output(s) 206, or data associated thereof. In example operation, the debug application 114 may execute one or more debug operations in response to a determination that the one or more breakpoints are triggered.

Figure 4:
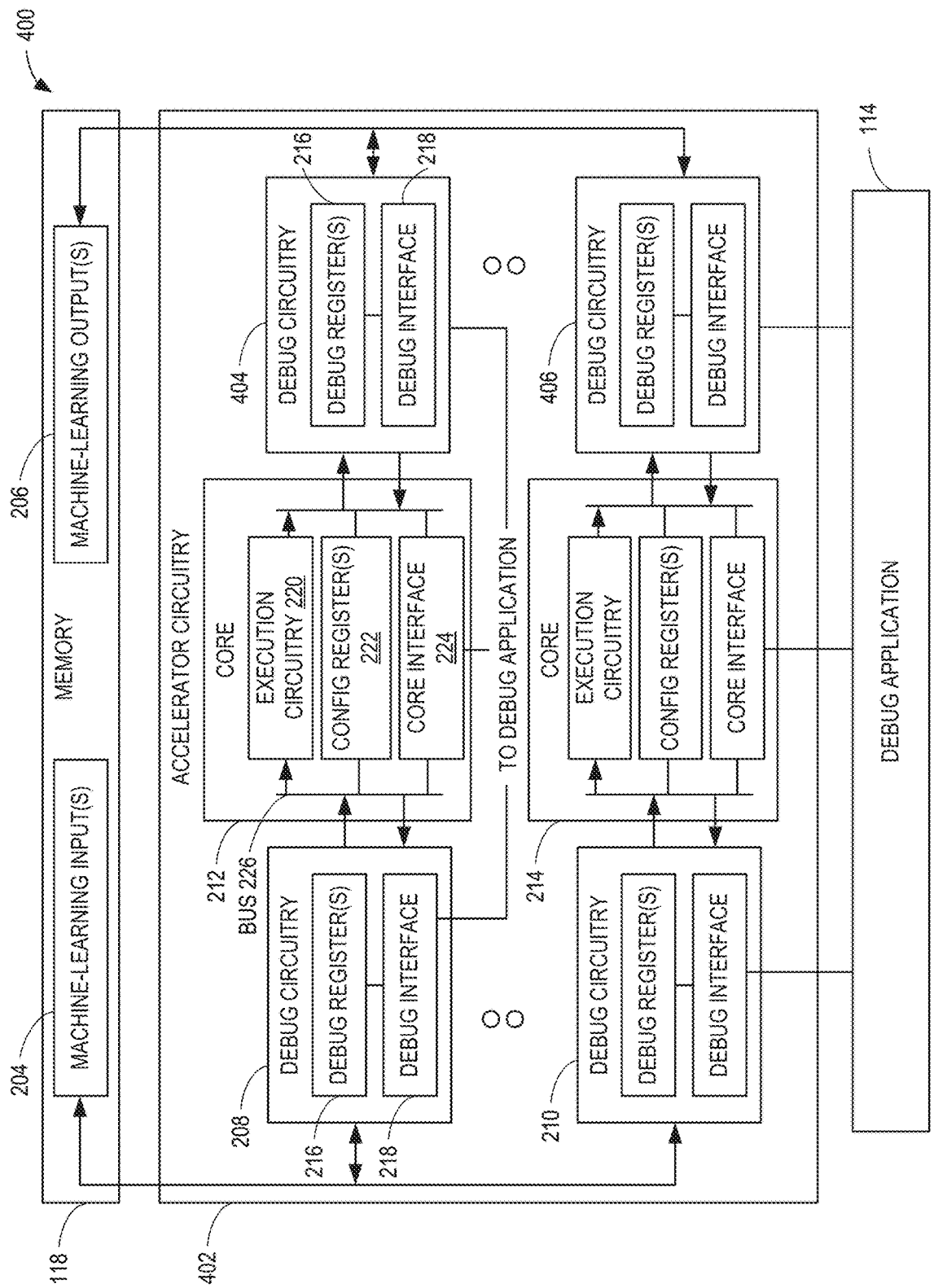
FIG. 4 is a block diagram of yet another example implementation of the accelerator circuitry and the debug circuitry of FIG. 1.

FIG. 4 is a block diagram of a third example accelerator circuitry debug system 400 including the debug application 114 of FIG. 1, the memory 118 of FIG. 1, and fifth example accelerator circuitry 402. In some examples, the fifth accelerator circuitry 402 of FIG. 4 may be an example implementation of the first accelerator circuitry 108 and/or the second accelerator circuitry 110 of FIG. 1.

The fifth accelerator circuitry 402 includes the debug circuitry 208, 210 of FIG. 2, which include the debug register(s) 216 and the debug interface 218 of FIG. 2. The fifth accelerator circuitry 402 includes the cores 212, 214 of FIG. 2, which include the execution circuitry 220, the configuration register(s) 222, the core interface 224, and the bus 226 of FIG. 2.

The fifth accelerator circuitry 402 of the illustrated example includes additional example instances 404, 406 of the debug circuitry 208, 210 coupled to output(s) of the cores 212, 214 of FIG. 2. In some examples, the debug circuitry 404, 406 may be an example implementation of the debug circuitry 112 of FIG. 1. The fifth accelerator circuitry 402 is implemented with the debug circuitry 208, 210, 404, 406 instantiated to trigger and/or otherwise invoke breakpoint(s) based on at least one of (i) the input(s) to the cores 212, 214, and/or, more generally, the machine-learning input(s) 204, or (ii) output(s) from the cores 212, 214, and/or, more generally, the machine-learning output(s) 206.

In the illustrated example, input(s) of the debug circuitry 208, 210 is/are coupled to output(s) of the memory 118. For example, input(s) of the debug register(s) 216 and/or the debug interface 218 is/are coupled to output(s) of the memory 118. Output(s) of the debug circuitry 208, 210 is/are coupled to input(s) of the cores 212, 214. For example, output(s) of the debug circuitry 208, 210 is/are coupled to input(s) of the execution circuitry 220, the configuration register(s) 222, the core interface 224, and/or the bus 226. Output(s) of the cores 212, 214 is/are coupled to input(s) of the debug circuitry 404, 406. For example, the output(s) of the cores 212, 214 is/are coupled to the debug register(s) 216 and/or the debug interface 218 of the debug circuitry 404, 406. Output(s) of the debug circuitry 404, 406 is/are coupled to input(s) of the memory 118. In some examples, the debug interface 218 and the core interface 224 are instantiated to be in communication with the debug application 114.

In example operation, the cores 212, 214 may execute an executable binary to implement one of the ML model(s) 124 of FIG. 1. In response to an execution of the executable binary, the cores 212, 214 may request one(s) of the machine-learning input(s) 204 from the memory 118. In example operation, the debug circuitry 208, 210 may obtain the request. In some examples, the debug circuitry 208, 210 may trigger a breakpoint in response to a determination that an address (or a range of addresses) associated with the read request matches an address (or a range of addresses) of a breakpoint. In some such examples, the debug circuitry 208, 210 may halt an execution of the executable binary by preventing subsequent read and/or write operations from being completed (and thereby creating a back pressure in the accelerator pipeline). In response to a trigger of a breakpoint based on the address (or range of addresses), the debug application 114 may execute one or more debug operations, which may include obtaining the read request, the address, the range of addresses, etc., that triggered the breakpoint, executing an incremental operation, etc., and/or a combination thereof.

In some examples, the debug circuitry 208, 210 may not trigger a breakpoint in response to a determination that an address (or a range of addresses) associated with the read request do not match an address (or a range of addresses) of a breakpoint. In response to a determination that a breakpoint is not triggered based on an address (or a range of addresses) of the read request, the debug circuitry 208, 210 may obtain the machine-learning input(s) 204 from the memory 118. In some examples, the debug circuitry 208, 210 may identify that one or more breakpoints are triggered based on the machine-learning input(s) 204. In response to identification(s) that one(s) of the one or more breakpoints are triggered based on the machine-learning input(s) 204, the debug application 114 may execute one or more debug operations, which may include obtaining the machine-learning input(s) 204 that triggered the one(s) of the one or more breakpoints, executing an incremental operation, etc., and/or a combination thereof.

In example operation, the debug circuitry 208, 210 may output the machine-learning input(s) 204 to the cores 212, 214 in response to a determination that the machine-learning input(s) 204 do not trigger a breakpoint. For example, the debug circuitry 208, 210 may output the machine-learning input(s) 204 to the cores 212, 214 to implement the machine-learning model(s) 124 of FIG. 1 by generating the machine-learning output(s) 206 based on the machine-learning input(s) 204. The cores 212, 214 may output the machine-learning output(s) 206 to the debug circuitry 404, 406.

In example operation, the debug circuitry 404, 406 may determine that one or more breakpoints are triggered based on the machine-learning output(s) 206, which may include values of the machine-learning output(s) 206, address(es) of the memory 118 to which the values may be written, etc. In response to determination(s) that one(s) of the one or more breakpoints are triggered based on the machine-learning output(s) 206, the debug application 114 may execute one or more debug operations, which may include obtaining the machine-learning output(s) 206 that triggered the one(s) of the one or more breakpoints, executing an incremental operation, etc., and/or a combination thereof.

Figure 5:
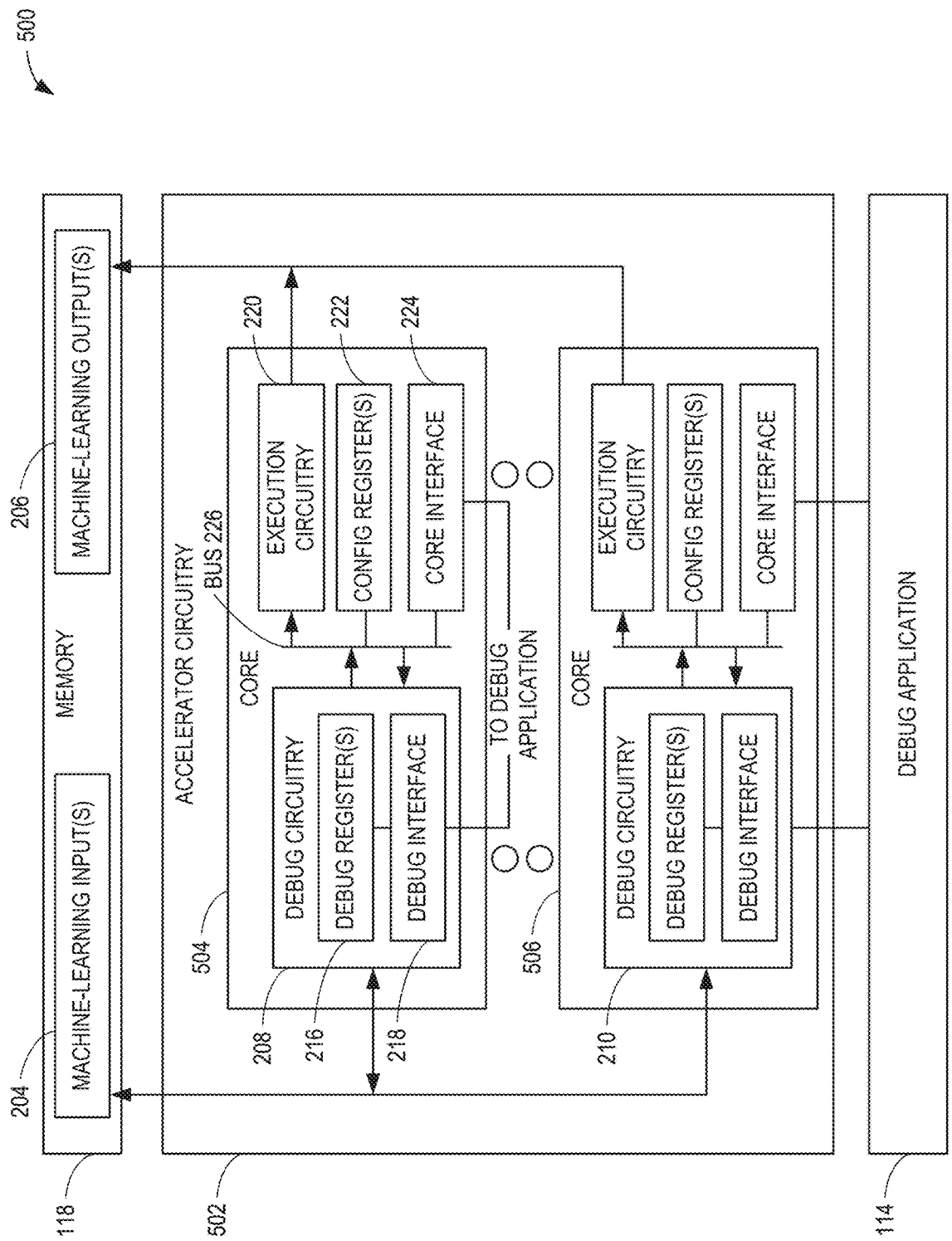
FIG. 5 is a block diagram of another example implementation of the accelerator circuitry and the debug circuitry of FIG. 1.

FIG. 5 is a block diagram of a fourth example accelerator circuitry debug system 500 including the debug application 114 of FIG. 1, the memory 118 of FIG. 1, and sixth example accelerator circuitry 502. In some examples, the sixth accelerator circuitry 502 of FIG. 5 may be an example implementation of the first accelerator circuitry 108 and/or the second accelerator circuitry 110 of FIG. 1.

In the illustrated example of FIG. 5, the sixth accelerator circuitry 502 includes example cores 504, 506 including at least a first example core 504 and a second example core 506. In the illustrated example, the cores 504, 506 include the debug circuitry 208, 210 of FIG. 2, which include the debug register(s) 216 and the debug interface 218 of FIG. 2. The cores 504, 506 of the illustrated example include the execution circuitry 220, the configuration register(s) 222, the core interface 224, and the bus 226 of FIG. 2.

The sixth accelerator circuitry 502 is implemented with the debug circuitry 208, 210 instantiated to trigger and/or otherwise invoke breakpoint(s) based on the input(s) to the cores 504, 506, and/or, more generally, the machine-learning input(s) 204. In the illustrated example, input(s) of the debug circuitry 208, 210 is/are coupled to output(s) of the memory 118. For example, input(s) of the debug register(s) 216 and/or the debug interface 218 is/are coupled to output(s) of the memory 118. Output(s) of the debug circuitry 208, 210 is/are coupled to input(s) of the execution circuitry 220, the configuration register(s) 222, the core interface 224, and/or the bus 226. Output(s) of the cores 504, 506 is/are coupled to input(s) of the memory 118. For example, the output(s) of the execution circuitry 220 is/are coupled to input(s) of the memory 118. In some examples, the debug interface 218 and the core interface 224 are instantiated to be in communication with the debug application 114.

Figure 6:
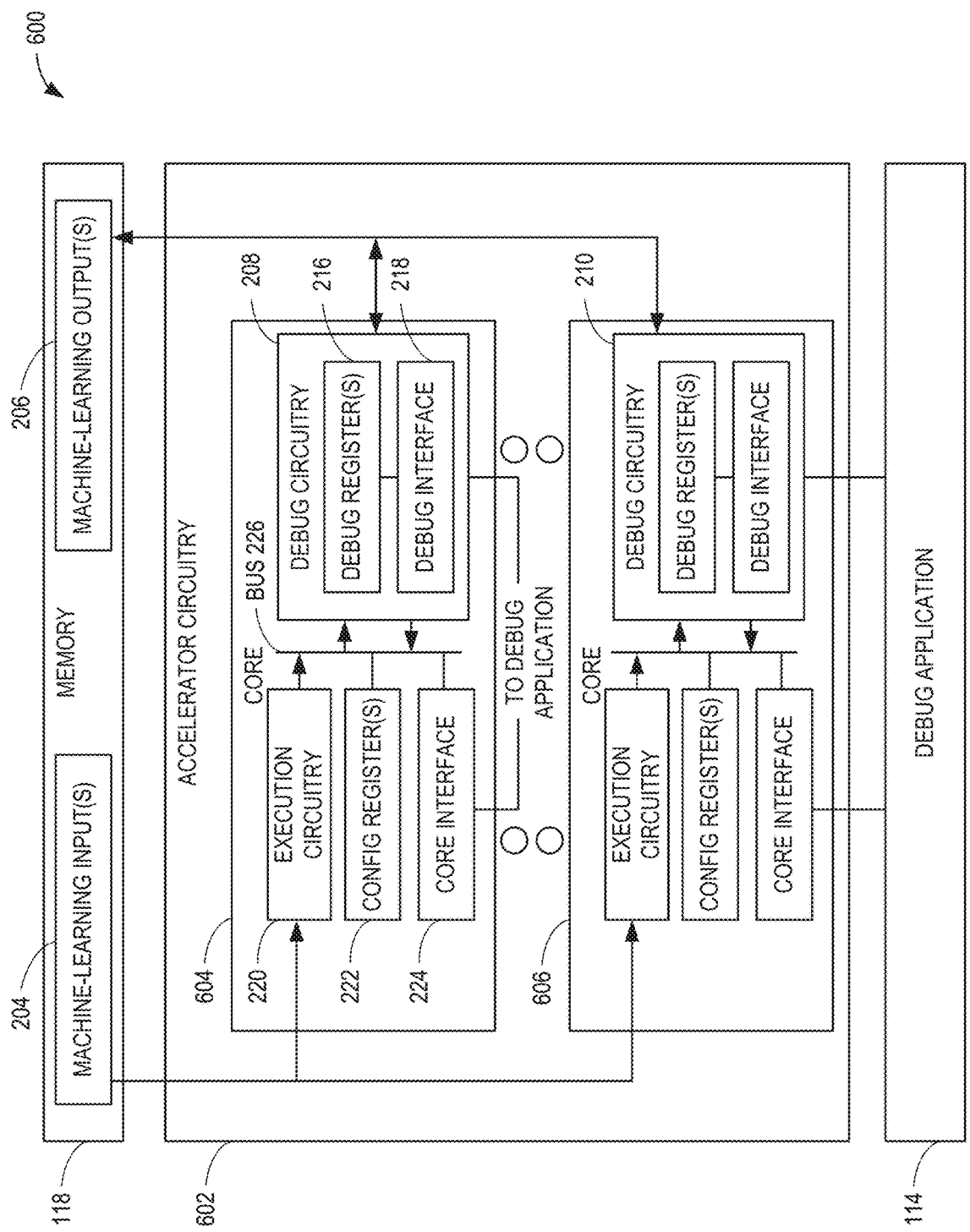
FIG. 6 is a block diagram of yet another example implementation of the accelerator circuitry and the debug circuitry of FIG. 1.

FIG. 6 is a block diagram of a fifth example accelerator circuitry debug system 600 including the debug application 114 of FIG. 1, the memory 118 of FIG. 1, and seventh example accelerator circuitry 602. In some examples, the seventh accelerator circuitry 602 of FIG. 6 may be an example implementation of the first accelerator circuitry 108 and/or the second accelerator circuitry 110 of FIG. 1.

In the illustrated example of FIG. 6, the seventh accelerator circuitry 602 includes example cores 604, 606 including at least a first example core 604 and a second example core 606. In the illustrated example, the cores 604, 606 include the debug circuitry 208, 210 of FIG. 2, which include the debug register(s) 216 and the debug interface 218 of FIG. 2. The cores 604, 606 of the illustrated example include the execution circuitry 220, the configuration register(s) 222, the core interface 224, and the bus 226 of FIG. 2.

The seventh accelerator circuitry 602 is implemented with the debug circuitry 208, 210 instantiated to trigger and/or otherwise invoke breakpoint(s) based on the output(s) from the cores 604, 606, and/or, more generally, the machine-learning output(s) 206. In the illustrated example, input(s) of the cores 604, 606 is/are coupled to output(s) of the memory 118. For example, input(s) of the execution circuitry 220 is/are coupled to output(s) of the memory 118. Output(s) of the execution circuitry 220, the configuration register(s) 222, and/or the core interface 224 is/are coupled to input(s) of the debug circuitry 208, 210 (e.g., by the bus 226). Output(s) of the debug circuitry 208, 210 is/are coupled to input(s) of the memory 118. For example, the output(s) of debug register(s) 216, the debug interface 218, and/or, more generally, the debug circuitry 208, 210, is/are coupled to input(s) of the memory 118. In some examples, the debug interface 218 and the core interface 224 are instantiated to be in communication with the debug application 114.

Figure 7:
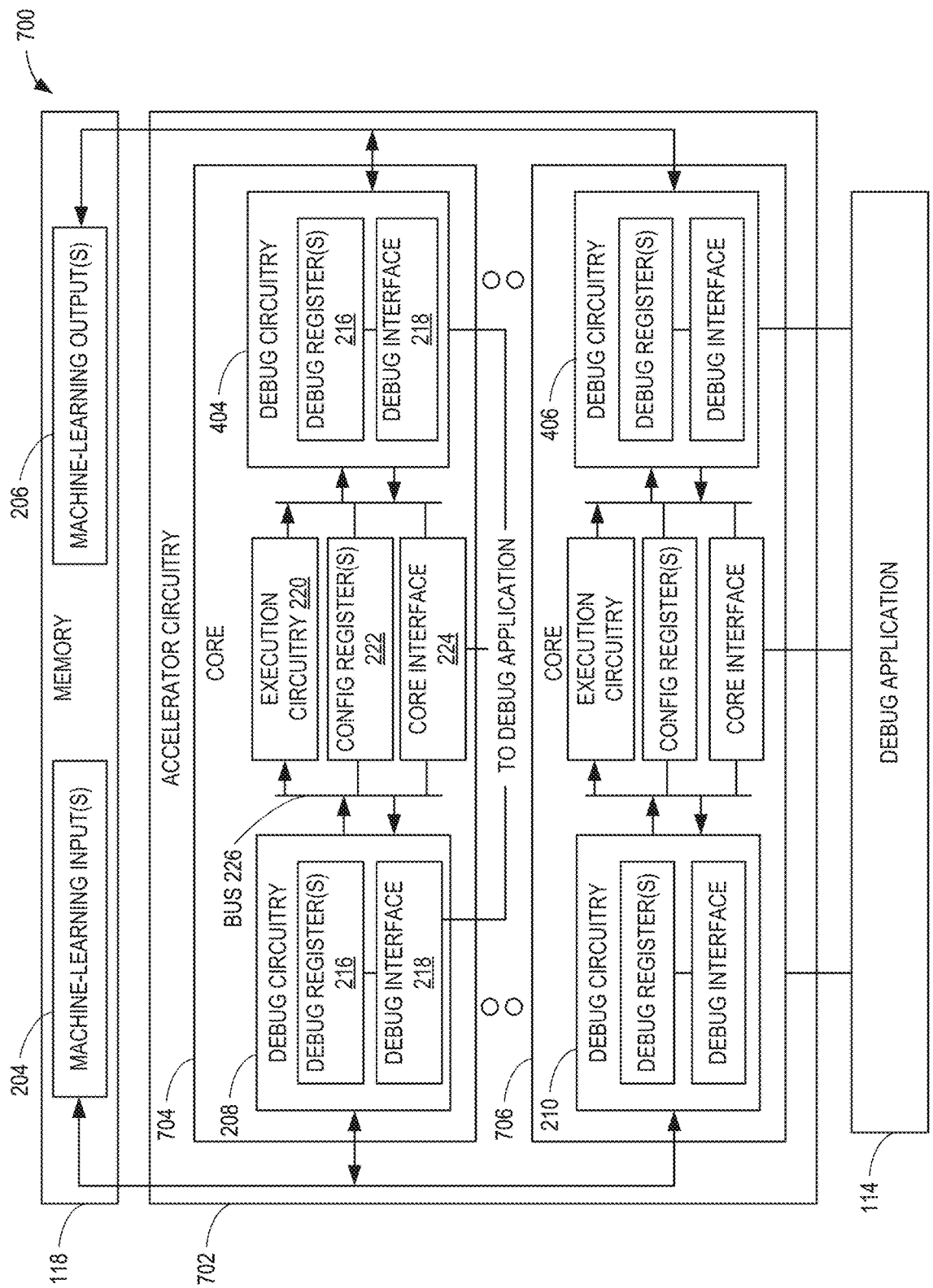
FIG. 7 is a block diagram of another example implementation of the accelerator circuitry and the debug circuitry of FIG. 1.

FIG. 7 is a block diagram of a sixth example accelerator circuitry debug system 700 including the debug application 114 of FIG. 1, the memory 118 of FIG. 1, and eighth example accelerator circuitry 702. In some examples, the eighth accelerator circuitry 702 of FIG. 7 may be an example implementation of the first accelerator circuitry 108 and/or the second accelerator circuitry 110 of FIG. 1.

The eighth accelerator circuitry 702 includes example cores 704, 706. The cores 704, 706 include the debug circuitry 208, 210 of FIG. 2, which include the debug register(s) 216 and the debug interface 218 of FIG. 2, and the debug circuitry 404, 406 of FIG. 4. The cores 704, 706 include the execution circuitry 220, the configuration register(s) 222, the core interface 224, and the bus 226 of FIG. 2. The eighth accelerator circuitry 702 is implemented with the debug circuitry 208, 210, 404, 406 instantiated to trigger and/or otherwise invoke breakpoint(s) based on at least one of (i) the input(s) to the cores 704, 706, and/or, more generally, the machine-learning input(s) 204, or (ii) output(s) from the cores 704, 706, and/or, more generally, the machine-learning output(s) 206.

In the illustrated example of FIG. 7, input(s) of the debug circuitry 208, 210 is/are coupled to output(s) of the memory 118. For example, input(s) of the debug register(s) 216 and/or the debug interface 218 is/are coupled to output(s) of the memory 118. Output(s) of the debug circuitry 208, 210 is/are coupled to input(s) of the execution circuitry 220, the configuration register(s) 222, and/or the core interface 224 (e.g., by the bus 226). Output(s) of the execution circuitry 220, the configuration register(s) 222, the core interface 224, and/or the bus 226 is/are coupled to input(s) of the debug circuitry 404, 406. For example, the output(s) of the execution circuitry 220, the configuration register(s) 222, the core interface 224, and/or the bus 226 is/are coupled to the debug register(s) 216 and/or the debug interface 218 of the debug circuitry 404, 406. Output(s) of the debug circuitry 404, 406 is/are coupled to input(s) of the memory 118. In some examples, the debug interface 218 and the core interface 224 are instantiated to be in communication with the debug application 114.

In example operation, the cores 704, 706 may execute an executable binary to implement one of the ML model(s) 124 of FIG. 1. In response to an execution of the executable binary, the cores 704, 706 may request one(s) of the machine-learning input(s) 204 from the memory 118. In example operation, the debug circuitry 208, 210 may obtain the request. In some examples, the debug circuitry 208, 210 may trigger a breakpoint in response to a determination that the request, or data associated thereof (e.g., an address or range of addresses at which the requested one(s) of the machine-learning input(s) 204 are stored in the memory 118), triggers the breakpoint.

In some examples, the debug circuitry 208, 210 may obtain the machine-learning input(s) 204 from the memory 118 in response to a determination that the request did not trigger a breakpoint. The debug circuitry 208, 210 may identify that one or more breakpoints are triggered based on the machine-learning input(s) 204. In response to identification(s) that one(s) of the one or more breakpoints are triggered based on the machine-learning input(s) 204, the debug application 114 may execute one or more debug operations, which may include obtaining the machine-learning input(s) 204 that triggered the one(s) of the one or more breakpoints, executing an incremental operation, etc., and/or a combination thereof.

In example operation, the debug circuitry 208, 210 may output the machine-learning input(s) 204 to the execution circuitry 220 to implement the machine-learning model(s) 124 of FIG. 1 by generating the machine-learning output(s) 206 based on the machine-learning input(s) 204. The execution circuitry 220 may output the machine-learning output(s) 206 to the debug circuitry 404, 406.

In example operation, the debug circuitry 404, 406 may determine that one or more breakpoints are triggered based on the machine-learning output(s) 206. In response to determination(s) that one(s) of the one or more breakpoints are triggered based on the machine-learning output(s) 206, the debug application 114 may execute one or more debug operations, which may include obtaining the machine-learning output(s) 206 that triggered the one(s) of the one or more breakpoints, executing an incremental operation, etc., and/or a combination thereof.

Figure 8A:
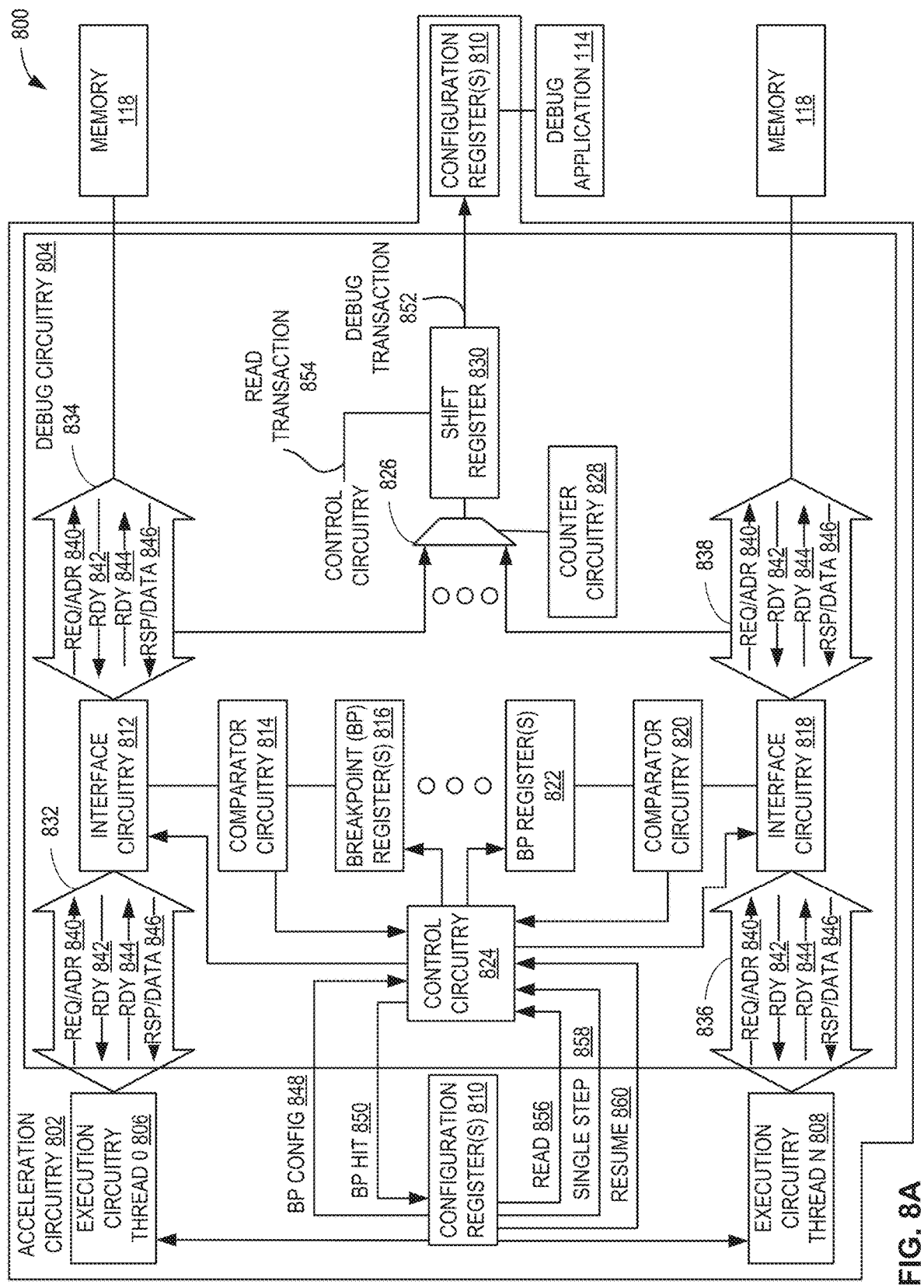
FIG. 8A is a block diagram of an example implementation of the debug circuitry of FIG. 1 to debug read operations of the example accelerator circuitry of FIG. 1.

FIG. 8A is a block diagram of a seventh example accelerator circuitry debug system 800 including the debug application 114 of FIG. 1, the memory 118 of FIG. 1, and ninth example accelerator circuitry 802. The ninth accelerator circuitry 802 includes example debug circuitry 804. In some examples, the ninth accelerator circuitry 802 of FIG. 8A may be an example implementation of the first accelerator circuitry 108 and/or the second accelerator circuitry 110 of FIG. 1. In some examples, the debug circuitry 804 may be an example implementation of the debug circuitry 112 of FIG. 1. The debug application 114, the memory 118, and/or the ninth accelerator circuitry 802 may be instantiated by processor circuitry such as a central processing unit executing instructions. Additionally or alternatively, the debug application 114, the memory 118, the ninth accelerator circuitry 802, and/or the debug circuitry 804 of FIG. 8A may be instantiated by an ASIC or an FPGA structured to perform operations corresponding to the instructions.

The ninth accelerator circuitry 802 of the illustrated example includes a first example execution circuitry thread 806 (identified by EXECUTION CIRCUITRY THREAD 0), a second example execution circuitry thread 808 (identified by EXECUTION CIRCUITRY THREAD N), and example configuration register(s) 810. In some examples, the first execution circuitry thread 806 and/or the second execution circuitry thread 808 may be an example implementation of the execution circuitry 220 of FIGS. 2-7. For example, the execution circuitry 220 may be multi-threaded execution circuitry including N+1 threads (e.g., threads 0-N), which may include the first execution circuitry thread 806 and the second execution circuitry thread 808. In the illustrated example, the debug circuitry 804 is instantiated at the beginning of an accelerator pipeline by intercepting and/or analyzing input(s) read from the memory 118 that are to be routed to the first execution circuitry thread 806 and/or the second execution circuitry thread 808 via the debug circuitry 804. In some examples, the configuration register(s) 810 may be an example implementation of the configuration register(s) 222 of FIG. 2. In some examples, the first execution circuitry thread 806, the second execution circuitry thread 808, and the configuration register(s) 810 may be an example implementation of the first core 212 and/or the second core 214 of FIGS. 2-4, the first core 504 and/or the second core 506 of FIG. 5, the first core 604 and/or the second core 606 of FIG. 6, and/or the first core 704 and/or the second core 706 of FIG. 7.

The debug circuitry 804 of the illustrated example includes first example interface circuitry 812, first example comparator circuitry 814, first example breakpoint register(s) 816, second example interface circuitry 818, second example comparator circuitry 820, second example breakpoint register(s) 822, example control circuitry 824, example multiplexer circuitry 826, example counter circuitry 828, and an example shift register 830. In the illustrated example, communication coupling(s) between the first execution circuitry thread 806 and the first interface circuitry 812 may implement a first example communication channel 832. In the illustrated example, communication coupling(s) between the first interface circuitry 812, the memory 118, and/or the multiplexer circuitry 826 may implement a second example communication channel 834. In the illustrated example, communication coupling(s) between the second execution circuitry thread 808 and the second interface circuitry 818 may implement a third example communication channel 836. In the illustrated example, communication coupling(s) between the second interface circuitry 818, the memory 118, and/or the multiplexer circuitry 826 may implement a fourth example communication channel 838.

In the illustrated example, input(s) of the first execution circuitry thread 806 and the second execution circuitry thread 808 is/are coupled to output(s) of the configuration register(s) 810. Input(s) and/or output(s) of the first execution circuitry thread 806 is/are coupled to respective output(s) and/or input(s) of the first interface circuitry 812. Input(s) and/or output(s) of the first interface circuitry 812 is/are coupled to respective output(s) and/or input(s) of the memory 118, the first comparator circuitry 814, the control circuitry 824, and/or the multiplexer circuitry 826. Input(s) and/or output(s) of the first comparator circuitry 814 is/are coupled to respective output(s) and/or input(s) of the control circuitry 824 and/or the first breakpoint register(s) 816. Input(s) and/or output(s) of the first breakpoint register(s) 816 is/are coupled to respective output(s) and/or input(s) of the control circuitry 824. Input(s) and/or output(s) of the configuration register(s) 810 is/are coupled to respective output(s) and/or input(s) of the control circuitry 824.

In the illustrated example, input(s) and/or output(s) of the second execution circuitry thread 808 is/are coupled to respective output(s) and/or input(s) of the second interface circuitry 818. Input(s) and/or output(s) of the second interface circuitry 818 is/are coupled to respective output(s) and/or input(s) of the memory 118, the second comparator circuitry 820, the control circuitry 824, and/or the multiplexer circuitry 826. Input(s) and/or output(s) of the second comparator circuitry 820 is/are coupled to respective output(s) and/or input(s) of the control circuitry 824 and/or the second breakpoint register(s) 822. Input(s) and/or output(s) of the second breakpoint register(s) 822 is/are coupled to respective output(s) and/or input(s) of the control circuitry 824. Output(s) of the counter circuitry 828 is/are coupled to input(s) (e.g., selection input(s), control input(s), etc.) of the multiplexer circuitry 826. Output(s) of the multiplexer circuitry 826 is/are coupled to input(s) of the shift register 830. Input(s) of the shift register 830 is/are coupled to output(s) of the control circuitry 824. Output(s) of the shift register 830 is/are coupled to input(s) of the configuration register(s) 810.

In the illustrated example, the configuration register(s) 810 is/are instantiated to be in communication with the debug application 114. For example, the debug application 114 may read data from and/or write data to the configuration register(s) 810. In some such examples, the debug application 114 may write an executable binary into the configuration register(s) 810 that cause the configuration register(s) 810 to configure the first execution circuitry thread 806 and/or the second execution circuitry thread 808. In some such examples, the executable binary may include one or more breakpoints that may be written into the configuration register(s) 810. In some examples, the debug application 114 may write commands, instructions, etc., such as a read instruction, a single step instruction, a resume instruction, etc., into the configuration register(s) 810. In some examples, the debug application 114 may write breakpoints into the configuration register(s) 810, which may cause the configuration register(s) 810 to provide the breakpoints via an example breakpoint configuration instruction 848 (identified by BP CONFIG) to the control circuitry 824.

In example operation, the debug application 114 may compile an executable binary (e.g., a configuration image) that, when executed and/or instantiated by the ninth accelerator circuitry 802, may implement one(s) of the machine-learning model(s) 124 of FIG. 1. The debug application 114 may transmit, deliver, and/or otherwise provide the executable binary to the configuration register(s) 810. In response to receiving the executable binary, the ninth accelerator circuitry 802 may load values based on the executable binary into the configuration register(s) 810. In response to loading the values, the configuration register(s) 810 may configure respective one(s) of the first execution circuitry thread 806 and/or the second execution circuitry thread 808 to implement the one(s) of the machine-learning model(s) 124.

In example operation, the first execution circuitry thread 806 and/or the second execution circuitry thread 808 may initiate execution of accelerator workloads in accordance with hardware arrangements, configurations, settings, etc., based on the executable binary. For example, the first execution circuitry thread 806 and/or the second execution circuitry thread 808 may obtain the machine-learning input(s) 204 of FIG. 2 and generate the machine-learning output(s) 206 of FIG. 2 based on the machine-learning input(s) 204. In some such examples, the first execution circuitry thread 806 may execute the executable binary, or portion(s) thereof, and/or the second execution circuitry thread 808 may execute the executable binary, or portion(s) thereof.

In example operation, the first execution circuitry thread 806 may request data (e.g., one(s) of the machine-learning input(s) 204) in connection with executing an executable binary. The first execution circuitry thread 806 may generate an example request signal 840 (identified by REQ/ADR), which may include an address to read from the memory 118, to the first interface circuitry 812. In response to the request signal 840 not triggering a breakpoint, the first interface circuitry 812 may provide the request signal 840 to the memory 118 via the second communication channel 834 to facilitate the memory read operation. The memory 118 may generate a first example ready signal 842 (identified by RDY) to indicate to the first execution circuitry thread 806 that the memory 118 is ready to provide the requested data. The first execution circuitry thread 806 may generate a second example ready signal 844 (identified by RDY) to indicate to the memory 118 that the first execution circuitry thread 806 is ready to receive the requested data. The memory 118 may provide the requested data via an example response signal 846 (identified by RSP/DATA).

In some examples, the debug application 114 may instantiate the debug circuitry 804 to trigger a breakpoint (e.g., a breakpoint event, a debug event, etc.) based on input(s), output(s), or associated memory address(es) of the input(s) and/or output(s) of the ninth accelerator circuitry 802. In some examples, the debug application 114 may compile the executable binary to include one or more first breakpoints that, when invoked, halt an execution of the executable binary, or portion(s) thereof. For example, the debug application 114 may compile the executable binary to trigger a first breakpoint on a per-workload basis, which may be implemented when the first breakpoint corresponds to a specific or target workload. In some such examples, the debug circuitry 114 may load the first breakpoint into one(s) of the configuration register(s) 810. In some such examples, the configuration register(s) 810 may provide the first breakpoint to the control circuitry 824 via the BP CONFIG 848 instruction. In some such examples, the control circuitry 824 may provide the first breakpoint to the first breakpoint register(s) 816 and the second breakpoint register(s) 822.

In some examples, the first comparator circuitry 814 may compare incoming data from the first interface circuitry 812 and the first communication channel 832 to the first breakpoint from the first breakpoint register(s) 816. In some such examples, the first comparator circuitry 814 may indicate to the control circuitry 824 that the first breakpoint is triggered based on the comparison (e.g., the incoming data matches data associated with the first breakpoint). In some such examples, the control circuitry 824 may determine that the first execution circuitry thread 806 executed the target workload based on the first breakpoint being triggered by the first comparator circuitry 814.

In some examples, the second comparator circuitry 820 may compare incoming data from the second interface circuitry 818 and the third communication channel 836 to the first breakpoint from the second breakpoint register(s) 822. In some such examples, the second comparator circuitry 820 may indicate to the control circuitry 824 that the first breakpoint is triggered based on the comparison (e.g., the incoming data matches data associated with the first breakpoint). In some such examples, the control circuitry 824 may determine that the second execution circuitry thread 808 executed the target workload based on the first breakpoint being triggered by the second comparator circuitry 820.

In example operation, in response to the first execution circuitry thread 806 triggering a per-workload breakpoint, the control circuitry 824 generate(s) an example breakpoint hit signal 850 (identified by BP HIT) to the configuration register(s) 810. In some examples, the BP HIT signal 850 may indicate a trigger of a workload-specific breakpoint. For example, the BP HIT signal 850 signal may implement an example BREAKPOINT_ON_START signal, which may be used to indicate that a breakpoint has been triggered on a first data item of a workload. In some examples, the BP HIT signal 850 may implement an example BREAKPOINT_ON_DATA+DATA signal, which may be used to indicate that a breakpoint has been triggered on a specific data item (+DATA) in a memory transaction. In some examples, the BP HIT signal 850 signal may implement an example BREAKPOINT_ON_ADR+ADR+MASK signal, which may be used to indicate that a breakpoint has been triggered on a specific address (+ADR) in a memory transaction. In some such examples, the mask (+MASK) can be used to indicate which bit(s) of an address is to be compared and/or analyzed. Advantageously, the BREAKPOINT_ON_ADR+ADR+MASK signal may be used to instantiate breakpoints for entire address ranges (as well as for a specific address).

In example operation, in response to generating the BP HIT signal 850, the control circuitry 824 may instruct the first interface circuitry 812 to pull down and/or otherwise disable the request signal 840 and the first ready signal 842. In response to pulling down the request signal 840 and the first ready signal 842 (e.g., by changing the request signal 840 and the first ready signal 842 to a logic low signal (e.g., a signal representative of a digital '0')), the first interface circuitry 812 halts an execution of a portion of the accelerator pipeline implemented by the first execution circuitry thread 806. For example, the first execution circuitry thread 806 may be unable to retrieve data from the memory 118 in response to a disabling of the first ready signal 842.

In some examples, the debug application 114 may compile the executable binary to trigger a second breakpoint on a per-core basis, which may be implemented when the second breakpoint corresponds to a specific or target core. In some such examples, the debug application 114 may load the second breakpoint into one(s) of the configuration register(s) 810 that, when triggered by the first execution circuitry thread 806, halts an execution of the executable binary by the first execution circuitry thread 806. In some such examples, a different thread may continue execution of the executable binary while the first execution circuitry thread 806 is halted and/or otherwise is in a paused or standby execution state. In example operation, in response to the first execution circuitry thread 806 triggering a per-core breakpoint, the first comparator circuitry may inform the control circuitry 824 that the second breakpoint has been hit. In example operation, the control circuitry 824 may generate the BP HIT signal 850 in response to receiving the indication from the first comparator circuitry 814.

In some examples, the BP HIT signal 850 may implement one or more breakpoint configuration signals generated in response to trigger(s) of core-specific breakpoint(s). For example, the BP HIT signal 850 may implement an example BREAKPOINT_ON_START signal, which may be used to indicate that a breakpoint has been triggered on a first data item of a workload on a specific core. In some examples, the BP HIT signal 850 may implement an example BREAKPOINT_ON_DATA+DATA signal, which may be used to indicate that a breakpoint has been triggered on a specific data item (+DATA) in a memory transaction by a specific core. In some examples, the BP HIT signal 850 may implement an example BREAKPOINT_ON_ADR+ADR+MASK signal, which may be used to indicate that a breakpoint has been triggered on a specific address (+ADR) in a memory transaction by a specific core. In some such examples, the mask (+MASK) can be used to indicate which bit(s) of an address is to be compared and/or analyzed. Advantageously, the BREAKPOINT_ON_ADR+ADR+MASK signal may be used to instantiate breakpoints for entire address ranges (as well as for a specific address).

In example operation, in response to the BP hit signal 850 being generated, the control circuitry 824 may direct the first interface circuitry 812 to pull down and/or otherwise disable the request signal 840 and the first ready signal 842. In response to pulling down the request signal 840 and the first ready signal 842, the first interface circuitry 812 causes a halt of an execution of the executable binary by the first execution circuitry thread 806 and/or the second execution circuitry thread 808.

In some examples, the control circuitry 824 may provide indications of what type of breakpoints are triggered. For example, the control circuitry 824 may provide the BP HIT signal 850 to the configuration register(s) 810, which may provide the debug application 114 an indication that a first workload executed by the first execution circuitry thread 806 triggered a breakpoint upon starting the first workload (e.g., a start breakpoint indication). In some examples, the control circuitry 824 may provide the BP HIT signal 850 to the configuration register(s) 810, which may provide the debug application 114 an indication that a second workload executed by the second execution circuitry thread 808 triggered a breakpoint upon a data value either read as an input or a data value generated as an output matching a value of the breakpoint (e.g., a data breakpoint indication, a data value match breakpoint indication, etc.). In some examples, the control circuitry 824 may generate the BP HIT signal 850, which may provide the debug application 114 an indication that a third workload executed by the second execution circuitry thread 808 triggered a breakpoint upon a first memory address at which a data value is read from matching a value of the breakpoint (e.g., an address breakpoint indication, a memory address breakpoint indication, etc.).

In example operation, the control circuitry 824 may store indication(s) in the configuration register(s) 810 of at least one of breakpoint(s) triggered by the first execution circuitry thread 806 or completion progress of the executable binary by the first execution circuitry thread 806. For example, the debug application 114 may query the configuration register(s) 810 for the indication(s). In example operation, the control circuitry 824 may store at least one of a machine-learning input, a machine-learning output, or associated address(es) that triggered a breakpoint by the first execution circuitry thread 806. In example operation, the debug application 114 may query the configuration register(s) 810 for the at least one of a machine-learning input, a machine-learning output, or the associated address(es). In example operation, the debug application 114 may modify one(s) of the configuration register(s) 810 to effectuate a change in the executable binary and resume execution of the executable binary for debugging purposes. In example operation, the debug application 114 may modify a machine-learning input stored in the memory 118 and/or in the first execution circuitry thread 806 and resume execution of the executable binary for debugging purposes.

In some examples, the debug application 114 may load the one or more first breakpoints and/or one or more second breakpoints in one(s) of the first breakpoint register(s) 816 and/or the second breakpoint register(s) 822. For example, the debug application 114 may store a first value in the configuration register(s) 810 representative of a machine-learning input, a memory address or range of memory addresses at which the machine-learning input is stored in the memory 118, etc. In some such examples, the control circuitry 824 may obtain the first value from the configuration register(s) 810 and provide the first value to the first breakpoint register(s) 816.

In example operation, in response to a trigger of a breakpoint by the first execution circuitry thread 806, the first interface circuitry 812 may provide data (e.g., an address, a range of addresses, a machine-learning input, etc., associated with a memory read operation) from the first execution circuitry thread 806 to the multiplexer circuitry 826. The counter circuitry 828 may increment a value of an output of the counter circuitry 828 to instruct the multiplexer circuitry 826 to cycle through inputs of the multiplexer circuitry 826, and/or, more generally, through the execution circuitry threads 806, 808 and their respective constituents, that are to be output from the multiplexer circuitry 826. For example, the counter circuitry 828 may output a first counter value of 0 to instruct the multiplexer circuitry 826 to output the read request from the first execution circuitry thread 806, a second counter value of 1 to output the read response from the first execution circuitry thread 806, a third counter value of 2*N to output the read request from the second execution circuitry thread 808, a fourth counter value of (2*N)+1 to output the read response from the second execution circuitry thread 808, etc. For example, the counter circuitry 828 may cause the multiplexer circuitry 826 to output data in a round-robin distribution or schema. Alternatively, the counter circuitry 828 may output values in any other sequence, distribution, or schema. In some examples, the counter circuitry 828 may skip over inputs to the multiplexer circuitry 826 that do not have data to be output from the multiplexer circuitry 826.

In example operation, the multiplexer circuitry 826 may output data associated with the machine-learning input and/or associated address(es) as an example transaction 852 (identified by DEBUG TRANSACTION) to the debug application 114 via the configuration register(s) 810. For example, the transaction 852 may implement a debug transaction (e.g., a debug data transaction) that includes at least one of a first value of a machine-learning input that triggered a breakpoint, an address at which the machine-learning input is stored in the memory 118, etc. In some examples, the debug transaction 852 is generated in response to an example read transaction 854 from the control circuitry 824 via the debug application 114 and the configuration register(s) 810. For example, the debug application 114 may write an example read transaction command 856 (identified by READ) into the configuration register(s) 810. The control circuitry 824 may obtain the read transaction command 856 from the configuration register(s) 810. The control circuitry 824 may issue the read transaction 854 in response to obtaining the read transaction command 856. For example, the read transaction 854 may implement a command, a direction, an instruction, etc., generated by the debug application 114 that, when received by the shift register 830, causes the shift register 830 to generate and/or otherwise output the debug transaction 852.

In some examples, the shift register 830 may read out data on a single-bit basis to save on resources. For example, to advance the shift register 830 by a bit, the debug application 114 may pulse and/or otherwise generate the read transaction 854. For example, the debug application 114 may write an example single step command 858 into the configuration register(s) 810. The control circuitry 824 may obtain the single step command 858 and generate the read transaction 854 in response to obtaining the single step command 858. Alternatively, the shift register 830 may read out data on any other bit basis (e.g., a two-bit basis, a four-bit basis, a sixteen-bit basis, etc.). In some examples, a bit (e.g., a valid bit) in the shift register 830 may indicate whether a valid one of the debug transaction 852 has been captured. In some such examples, to reduce the number of read-out clock cycles, the valid bit may be the first bit that is shifted out of the shift register 830. In some such examples, in response to a determination by the debug application 114 that no valid one of the debug transaction 852 has been captured, the debug application 114 may terminate the read out of the shift register 830 and proceed with another debug operation. In some examples, the debug application 114 may instruct the shift register 830 to read out a debug transaction 852 of interest rather than every debug transaction 852.

In example operation, the debug application 114 may instruct the debug circuitry 804, and/or, more generally, the ninth accelerator circuitry 802, to execute one or more single step operations. For example, the first interface circuitry 812 may pull down the request signal 840 and the first ready signal 842 in response to an invocation of a breakpoint. In some such examples, the debug application 114 may instruct the first interface circuitry 812 via the single step command 858 to release the pull down on the request signal 840 and the first ready signal 842 for a first clock cycle (or more if instructed by the debug application 114) to allow a potential output from the first execution circuitry thread 806 to be transmitted to the memory 118. After the conclusion of the first clock cycle, the request signal 840 and the first ready signal 842 are pulled down to halt an execution of the executable binary by the first execution circuitry thread 806. The output is provided to the multiplexer circuitry 826, which may be provided to the shift register 830. The debug transaction 852 may accordingly be generated. Advantageously, the debug application 114 may cause the debug circuitry 804 to execute in discrete, individual accelerator operations to identify erroneous configurations, calculations, or memory read/write operations with improved granularity, visibility, and accuracy compared to prior implementations.

In example operation, the debug application 114 may instruct the debug circuitry 804 to resume operation of an executable binary by the first execution circuitry thread 806 and the second execution circuitry thread 808 in response to breakpoint(s) being triggered by generating an example resume command 860. For example, the debug application 114 may write the resume command 860 into the configuration register(s) 810. The control circuitry 824 may instruct the first interface circuitry 812 in response to obtaining the resume command 860 to release the pull down forces on the request signal 840 and the first ready signal 842 to resume data transfers between the first execution circuitry thread 806 and the debug circuitry 804.

In some examples, the debug application 114 may instruct the debug circuitry 804 to either be enabled or disabled. For example, the debug application 114 may enable the debug circuitry 804 and thereby cause the debug circuitry 804 to determine whether any breakpoints have been triggered. In some examples, the debug application 114 may disable the debug circuitry 804 and thereby cause the debug circuitry 804 to enter into a bypass mode where the debug circuitry 804 does not halt an execution of an executable binary by the first execution circuitry thread 806 and/or the second execution circuitry thread 808.

In some examples, the debug application 114 writes breakpoint(s) into one(s) of the configuration register(s) 810 to halt execution of workload(s) based on comparison(s) of the breakpoint(s) and at least one of input(s) or associated address(es) to the ninth accelerator circuitry 802. For example, the debug application 114 may write a first breakpoint, which may be based on a first machine-learning input of the machine-learning input(s) 204, into configuration register(s) 810. The control circuitry 824 may obtain the first breakpoint from the configuration register(s) 810 and write the first breakpoint into one(s) of the first breakpoint register(s) 816. In some such examples, the first comparator circuitry 814 may compare the first machine-learning input from the memory 118 and the first breakpoint. In some such examples, in response to a match based on the comparison, the first comparator circuitry 814 may generate an indication and transmit the indication to the control circuitry 824. The control circuitry 824 may cause the first interface circuitry 812 to pull down the request signal 840 and the first ready signal 842 to halt a flow of data from the memory 118 and thereby halt an execution of an executable binary by the first execution circuitry thread 806.

While an example manner of implementing the first accelerator circuitry 108, the second accelerator circuitry 110, and/or the debug circuitry 112 of FIG. 1 is illustrated in FIG. 8A, one or more of the elements, processes, and/or devices illustrated in FIG. 8A may be combined, divided, re-arranged, omitted, eliminated, and/or implemented in any other way. Further, the debug circuitry 804, the first execution circuitry thread 806, the second execution circuitry thread 808, the configuration register(s) 810, the first interface circuitry 812, the first comparator circuitry 814, the first breakpoint register(s) 816, the second interface circuitry 818, the second comparator circuitry 820, the second breakpoint register(s) 822, the control circuitry 824, the multiplexer circuitry 826, the counter circuitry 828, the example shift register 830, the communication channels 832, 834, 836, 838, and/or, more generally, the first accelerator circuitry 108, the second accelerator circuitry 110, and/or the debug circuitry 112 of FIG. 1, may be implemented by hardware, software, firmware, and/or any combination of hardware, software, and/or firmware. Thus, for example, any of the debug circuitry 804, the first execution circuitry thread 806, the second execution circuitry thread 808, the configuration register(s) 810, the first interface circuitry 812, the first comparator circuitry 814, the first breakpoint register(s) 816, the second interface circuitry 818, the second comparator circuitry 820, the second breakpoint register(s) 822, the control circuitry 824, the multiplexer circuitry 826, the counter circuitry 828, the example shift register 830, the communication channels 832, 834, 836, 838, and/or, more generally, the first accelerator circuitry 108, the second accelerator circuitry 110, and/or the debug circuitry 112, could be implemented by processor circuitry, analog circuit(s), digital circuit(s), logic circuit(s), programmable processor(s), programmable microcontroller(s), GPU(s), DSP(s), ASIC(s), PLD(s), and/or FPLD(s) such as FPGAs. When reading any of the apparatus or system claims of this patent to cover a purely software and/or firmware implementation, at least one of the debug circuitry 804, the first execution circuitry thread 806, the second execution circuitry thread 808, the configuration register(s) 810, the first interface circuitry 812, the first comparator circuitry 814, the first breakpoint register(s) 816, the second interface circuitry 818, the second comparator circuitry 820, the second breakpoint register(s) 822, the control circuitry 824, the multiplexer circuitry 826, the counter circuitry 828, the example shift register 830, and/or the communication channels 832, 834, 836, 838 is/are hereby expressly defined to include a non-transitory computer readable storage device or storage disk such as a memory, a digital versatile disk (DVD), a compact disk (CD), a Blu-ray disk, etc., including the software and/or firmware. Further still, the first accelerator circuitry 108, the second accelerator circuitry 110, and/or the debug circuitry 112 of FIG. 1 may include one or more elements, processes, and/or devices in addition to, or instead of, those illustrated in FIG. 8A, and/or may include more than one of any or all of the illustrated elements, processes and devices.

Figure 8B:
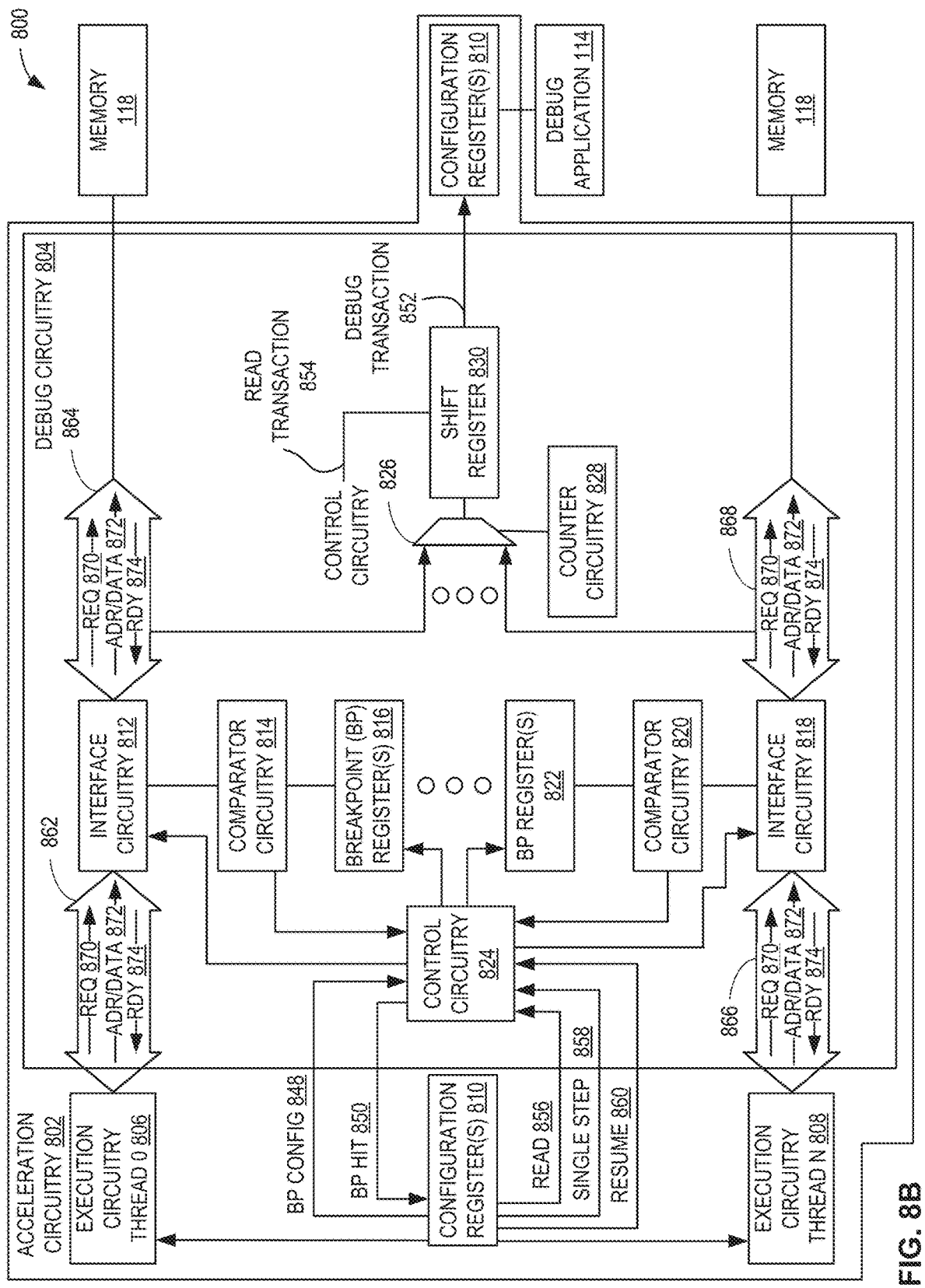
FIG. 8B is a block diagram of an example implementation of the debug circuitry of FIG. 1 to debug write operations of the accelerator circuitry of FIG. 1.

FIG. 8B is a block diagram of the debug circuitry 804 of FIG. 8A to debug write operations of the accelerator circuitry 802 of FIG. 8A. In the illustrated example, the debug circuitry 804 is instantiated at the end of an accelerator pipeline by intercepting and/or analyzing output(s) from the first execution circuitry thread 806 and/or the second execution circuitry thread 808. The illustrated example includes the debug circuitry 804, the first execution circuitry thread 806, the second execution circuitry thread 808, the configuration register(s) 810, the first interface circuitry 812, the first comparator circuitry 814, the first breakpoint register(s) 816, the second interface circuitry 818, the second comparator circuitry 820, the second breakpoint register(s) 822, the control circuitry 824, the multiplexer circuitry 826, the counter circuitry 828, the example shift register 830, the BP CONFIG signal 848, the BP HIT signal 850, the debug transaction 852, the read transaction 854, the read transaction command 856, the single step command 858, and the resume command 860 of FIG. 8A.

In the illustrated example of FIG. 8B, communication coupling(s) between the first execution circuitry thread 806 and the first interface circuitry 812 may implement a fifth example communication channel 862. In the illustrated example, communication coupling(s) between the first interface circuitry 812, the memory 118, and/or the multiplexer circuitry 826 may implement a sixth example communication channel 864. In the illustrated example, communication coupling(s) between the second execution circuitry thread 808 and the second interface circuitry 818 may implement a seventh example communication channel 866. In the illustrated example, communication coupling(s) between the second interface circuitry 818, the memory 118, and/or the multiplexer circuitry 826 may implement an eighth example communication channel 868.

In example operation, the communication channels 862, 864, 866, 868 facilitate the debug circuitry 804 in debugging write operations. For example, in response to an execution of an executable binary, the first execution circuitry thread 806 may generate first machine-learning output(s) of the machine-learning output(s) 206 of FIG. 2 based on first machine-learning input(s) of the machine-learning input(s) 204 of FIG. 2. In response to generating the first machine-learning output(s), the first execution circuitry thread 806 generates an example request signal 870 (identified by REQ) to write the first machine-learning output(s) to the memory 118. The first execution circuitry thread 806 may generate an example address/data signal 872 (identified by ADR/DATA), which may include an address at which to write the first machine-learning output(s) in the memory 118, the first machine-learning output(s), etc., and/or a combination thereof. The memory 118 may generate an example ready signal 874 (identified by RDY) when the memory 118 is ready to receive the data to be written.

In example operation, in response to a breakpoint not being triggered by the first execution circuitry thread 806, the first interface circuitry 812 may provide the machine-learning output from the first execution circuitry thread 806 to the memory 118. In example operation, the first interface circuitry 812 may receive a first value representative of one of the first machine-learning output(s) generated by the first execution circuitry thread 806 in response to an execution of the executable binary. In example operation, the first comparator circuitry 814 may compare the first value and a second value based on a breakpoint in the first breakpoint register(s) 816. In response to a match, the first comparator circuitry 814 may signal a match to the control circuitry 824, which may instruct the first interface circuitry 812 and the second interface circuitry 818 to halt execution of the executable binary by pulling down at least one of the request signal 870 or the ready signal 874. For example, the first comparator circuitry 814 may pause execution of the executable binary in response to a machine-learning output, associated address(es), etc., from the first execution circuitry thread 806 matching a machine-learning output, associated address(es), etc., of a breakpoint.

In example operation, the multiplexer circuitry 826 may output data associated with the machine-learning output, associated address(es), etc., as the debug transaction 852. For example, the debug transaction 852 may include at least one of a machine-learning output that triggered a breakpoint or an address at which the machine-learning output is to be written in the memory 118.

Figure 8C:
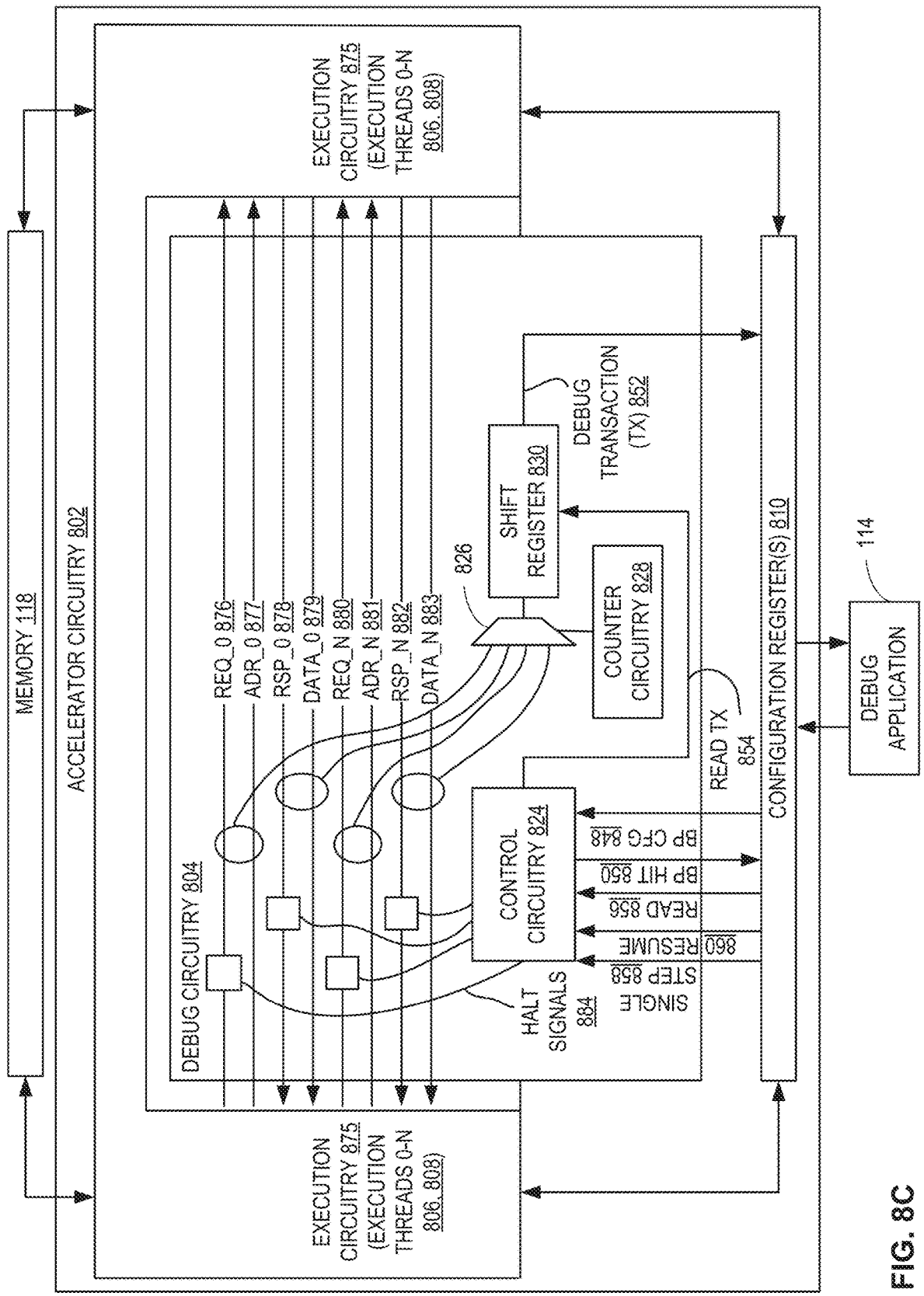
FIG. 8C is a block diagram of another example implementation of the debug circuitry of FIG. 1 to debug read operations of the accelerator circuitry of FIG. 1.

FIG. 8C is a block diagram of another example implementation of the debug circuitry 804 of FIGS. 8A and/or 8B to debug read operations of the accelerator circuitry 802 of FIGS. 8A and/or 8B. The accelerator circuitry 802 of the illustrated example includes the first execution circuitry thread 806, the configuration register(s) 810, and the debug circuitry 804, which includes the control circuitry 824, the multiplexer circuitry 826, the counter circuitry 828, and the shift register 830 of FIGS. 8A and/or 8B. Further depicted in FIG. 8C are the debug application 114 and the memory 118 of FIG. 1. Also depicted in FIG. 8C are the BP CONFIG signal 848, the BP HIT signal 850, the debug transaction 852, the read transaction 854, the read transaction command 856, the single step command 858, and the resume command 860 of FIGS. 8A and 8B.

The debug circuitry 804 of the illustrated example is included in example execution circuitry 875. In some examples, the execution circuitry 875 may implement the first execution circuitry 220 of the first core 212 of FIGS. 2-5, the execution circuitry 220 of the first core 604 of FIG. 6, etc. For example, the debug circuitry 804 may be adapted to intercept signals internal to the execution circuitry 875. In the illustrated example, the execution circuitry 875 includes and/or otherwise implements the first execution circuitry thread 806 and the second execution circuitry thread 808 of FIGS. 8A and 8B.

In the illustrated example, first example signals 876, 877, 878, 879 correspond to a first thread of the execution circuitry 875, such as the first execution circuitry thread 806. For example, the first signals 876, 877, 878, 879 include a first example request signal 876 (identified by REQ_0), a first example address signal 877 (identified by ADR_0), a first example response signal 878 (identified by RSP_0), and a first example data signal 879 (identified by DATA_0) corresponding to the first execution circuitry thread 806.

In the illustrated example, second example signals 880, 881, 882, 883 correspond to a second thread of the execution circuitry 875, such as the second execution circuitry thread 808. For example, the second signals 880, 881, 882, 883 include a second example request signal 880 (identified by REQ_N), a second example address signal 881 (identified by ADR_N), a second example response signal 882 (identified by RSP_N), and a second example data signal 883 (identified by DATA_N) corresponding to the second execution circuitry thread 808.

In example operation, in response to a determination by the first execution circuitry thread 806 to read data from the memory 118, the first execution circuitry thread 806 generates the first request signal 876 to retrieve data from another part of the first execution circuitry thread 806. The first execution circuitry thread 806 generates the first address signal 877 indicative of an address of data stored within the first execution circuitry thread 806 at which to read the data. The execution circuitry 875 generates the first response signal 878 indicative of the data is ready to be read from another portion of the first execution circuitry thread 806. The execution circuitry 875 generates the first data signal 879, which includes the requested data.

In example operation, data associated with at least one of the first request signal 876, the first address signal 877, the first response signal 878, or the first data signal 879 are provided to the multiplexer circuitry 826. The counter circuitry 828 may select the inputs of the multiplexer circuitry 826 that correspond to the at least one of the first request signal 876, the first address signal 877, or the first data signal 879. The multiplexer circuitry 826 outputs the selected data to the shift register 830. The shift register 830 outputs the selected data as the debug transaction 852 to the configuration register(s) 810. The debug application 114 may obtain the selected data from the configuration register(s) 810.

In example operation, in response to a breakpoint being triggered based on at least one of an address, an address range, or a value of data retrieved from another portion of the execution circuitry 875, the control circuitry 824 may halt an execution of an executable binary by the execution circuitry 875 by generating example halt signals 884. The halt signals 884 may pull down the first request signal 876, the first response signal 878, and an accompanying ready signal (e.g., the ready signal 844 of FIG. 8A) from a logic high signal to a logic low signal. For example, in response to a determination that a breakpoint has been triggered based on a requested memory address, the control circuitry 824 may generate respective one(s) of the halt signals 884 to pull down at least one of the first request signal 876, the first response signal 878, the second request signal 880, the second response signal 882, and accompanying ready signals to halt the flow of information through the execution circuitry 875.

In example operation, the control circuitry 824 may single step execution of the executable binary in response to the single step command 858. For example, the control circuitry 824 may instruct the respective one(s) of the halt signals 884 to release the pull down force on at least one of the first request signal 876, the first response signal 878, the second request signal 880, the second response signal 882, and accompanying ready signals for a single clock cycle, two or more clock cycles, etc. In example operation, the control circuitry 824 may unhalt the execution of the executable binary by generating the respective one(s) of the halt signals 884 to release the pull down forces on at least one of the first request signal 876, the first response signal 878, the second request signal 880, the second response signal 882, and accompanying ready signals.

Figure 8D:
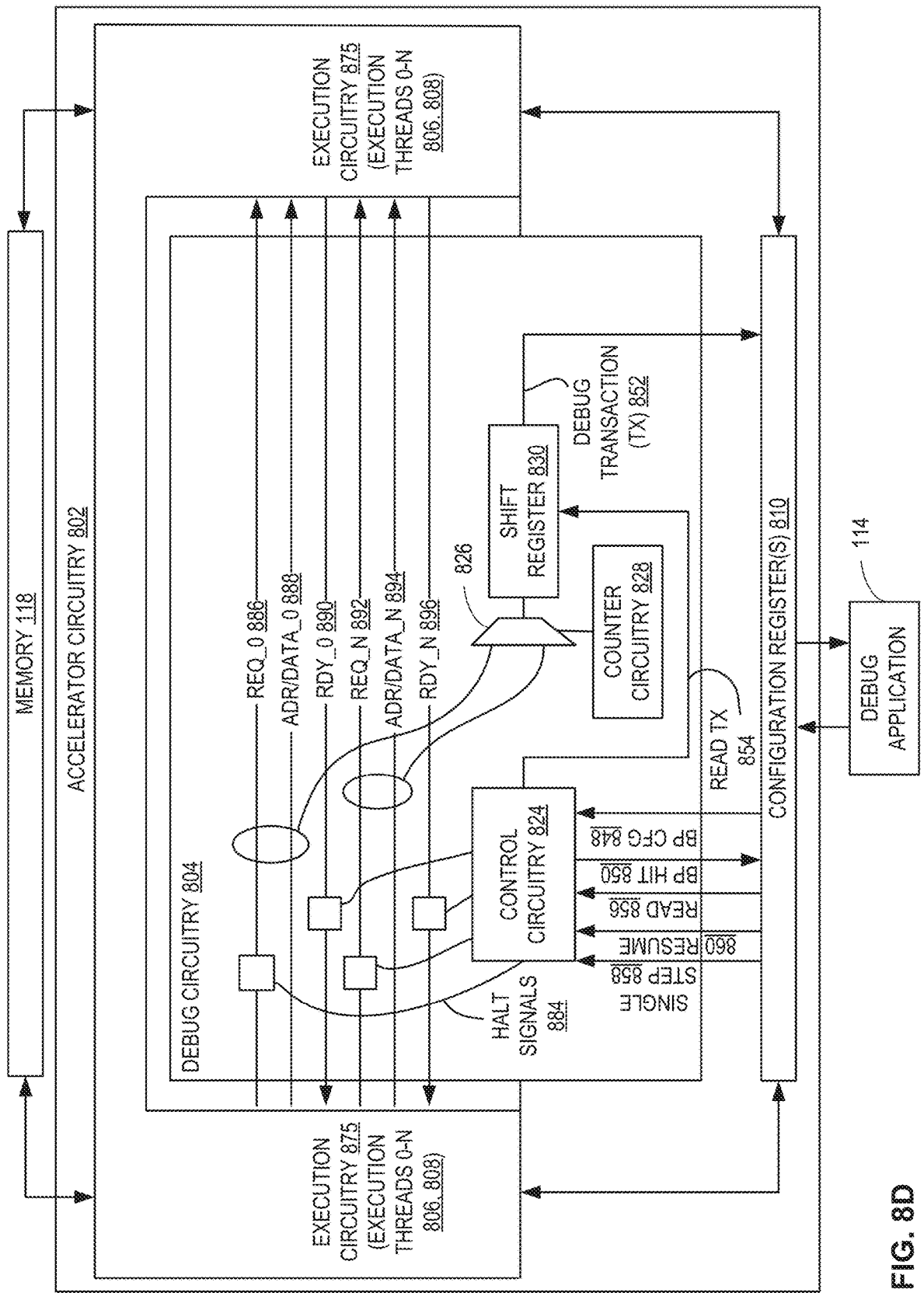
FIG. 8D is a block diagram of another example implementation of the debug circuitry of FIG. 1 to debug write operations of the accelerator circuitry of FIG. 1.

FIG. 8D is a block diagram of another example implementation of the debug circuitry 804 of FIGS. 8A and/or 8B to debug write operations of the accelerator circuitry 802 of FIGS. 8A and/or 8B. The accelerator circuitry 802 of the illustrated example includes the first execution circuitry thread 806, the configuration register(s) 810, and the debug circuitry 804, which includes the control circuitry 824, the multiplexer circuitry 826, the counter circuitry 828, and the shift register 830 of FIGS. 8A and/or 8B. Further depicted in FIG. 8D are the debug application 114 and the memory 118 of FIG. 1. Also depicted in FIG. 8D are the BP CONFIG signal 848, the BP HIT signal 850, the debug transaction 852, the read transaction 854, the read transaction command 856, the single step command 858, and the resume command 860 of FIGS. 8A and 8B. Further depicted in FIG. 8D are the execution circuitry 875 and the halt signals 884 of FIG. 8C.

The debug circuitry 804 of the illustrated example is included in the execution circuitry 875 of FIG. 8C. In the illustrated example, first example signals 886, 888, 890 correspond to a first thread of the execution circuitry 875, such as the first execution circuitry thread 806. For example, the first signals 886, 888, 890 include a first example request signal 886 (identified by REQ_0), a first example address/data signal 888 (identified by ADR/DATA_0), and a first example ready signal 890 (identified by RDY_0) corresponding to the first execution circuitry thread 806.

In the illustrated example, second example signals 892, 894, 896 correspond to a second thread of the execution circuitry 875, such as the second execution circuitry thread 808. For example, the second signals 892, 894, 896 include a second example request signal 892 (identified by REQ_N), a second example address/data signal 894 (identified by ADR/DATA_N), and a second example ready signal 896 (identified by RDY_N) corresponding to the second execution circuitry thread 808.

In example operation, in response to a determination by the first execution circuitry thread 806 to write data to the memory 118, the first execution circuitry thread 806 generates the first request signal 886 to write data to the memory 118. The first execution circuitry thread 806 generates the first address/data signal 888 indicative of address(es) and/or data to write to the memory 118. The memory 118 generates the first ready signal 890 indicative of the data is ready to be written to the memory 118.

In example operation, data associated with at least one of the first request signal 886 or the first address/data signal 888 are provided to the multiplexer circuitry 826. The counter circuitry 828 may select the inputs of the multiplexer circuitry 826 that correspond to the at least one of the first request signal 886 or the first address/data signal 888. The multiplexer circuitry 826 outputs the selected data to the shift register 830. The shift register 830 outputs the selected data as the debug transaction 852 to the configuration register(s) 810. The debug application 114 may obtain the selected data from the configuration register(s) 810.

In example operation, in response to a breakpoint being triggered based on at least one of an address, an address range, or a value of data to be written to the memory 118, the control circuitry 824 may halt an execution of an executable binary by the execution circuitry 875 by generating the halt signals 884. The halt signals 884 may pull down the first request signal 886, the first ready signal 890, the second request signal 892, and the second ready signal 896 from a logic high signal to a logic low signal. For example, in response to a determination that a breakpoint has been triggered based on a requested memory address, the control circuitry 824 may generate respective one(s) of the halt signals 884 to pull down the first request signal 886, the first ready signal 890, the second request signal 892, and the second ready signal 896.

In example operation, the control circuitry 824 may single step execution of the executable binary in response to the single step command 858. For example, the control circuitry 824 may instruct the respective one(s) of the halt signals 884 to release the pull down on at least one of the first request signal 886, the first ready signal 890, the second request signal 892, and the second ready signal 896 for a single clock cycle, two or more clock cycles, etc. In example operation, the control circuitry 824 may unhalt the execution of the executable binary by instructing the respective one(s) of the halt signals 884 to release the pull down forces on at least one of the first request signal 886, the first ready signal 890, the second request signal 892, and the second ready signal 896.

Figure 9:
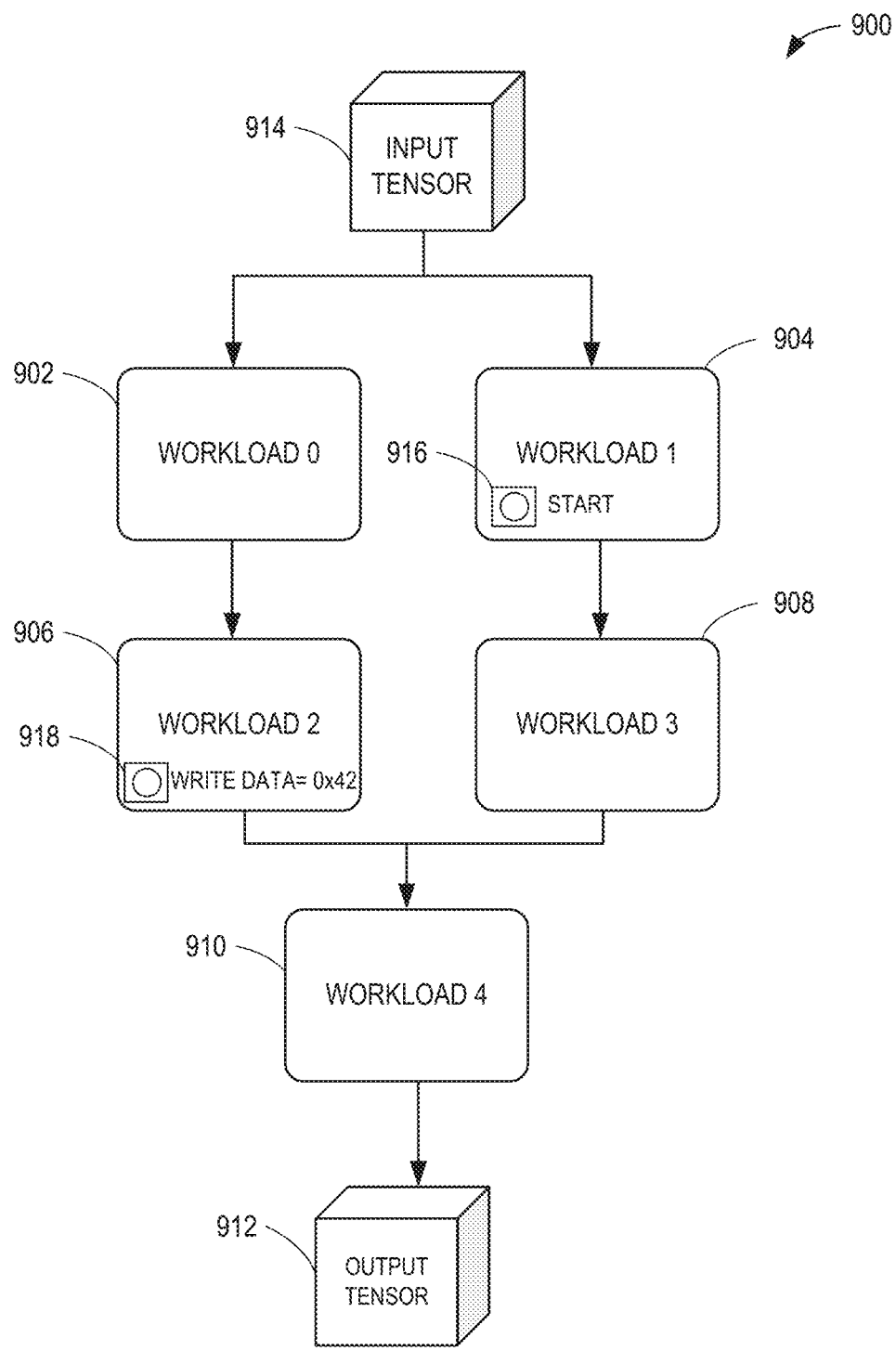
FIG. 9 is a first example workflow corresponding to example operation of the example accelerator circuitry of FIGS. 1, 2, 3, 4, 5, 6, 7, 8A, 8B, 8C, and/or 8D.

FIG. 9 is a first example workflow 900 corresponding to example operation of the first accelerator circuitry 108 of FIG. 1, the second accelerator circuitry 110 of FIG. 1, the third accelerator circuitry 202 of FIG. 2, the fourth accelerator circuitry 302 of FIG. 3, the fifth accelerator circuitry 402 of FIG. 4, the sixth accelerator circuitry 502 of FIG. 5, the seventh accelerator circuitry 602 of FIG. 6, the eighth accelerator circuitry 702 of FIG. 7, and/or the ninth accelerator circuitry 802 of FIGS. 8A-8D.

The first workflow 900 of the illustrated example may implement a sequence of example workloads 902, 904, 906, 908, 910 to generate an example output tensor 912 based on an example input tensor 914. For example, the workloads 902, 904, 906, 908, 910 may implement neural network computational workloads based on one(s) of the machine-learning model(s) 124 of FIG. 1. The workloads 902, 904, 906, 908, 910 include a first example workload 902 (identified by WORKLOAD 0), a second example workload 904 (identified by WORKLOAD 1), a third example workload 906 (identified by WORKLOAD 2), a fourth example workload 908 (identified by WORKLOAD 3), and a fifth example workload 910 (identified by WORKLOAD 4).

In the illustrated example, the workloads 902, 904, 906, 908, 910 may be implemented by two cores of a hardware accelerator, such as the first core 212 of FIG. 2 and the second core 214 of FIG. 2. In example operation, the first core 212 may execute the first workload 902 on the input tensor 914 followed by the third workload 906. In example operation, the second core 214 may execute the second workload 904 on the input tensor 914 in parallel with the first workload 902. In response to completing the second workload 904, the second core 214 may execute the fourth workload 908. In response to completions of the third workload 906 and the fourth workload 908, the first core 212 and/or the second core 214 may execute the fifth workload 910 to generate the output tensor 912.

The first workflow 900 of the illustrated example may implement example accelerator circuitry operation that includes example breakpoints 916, 918 generated on a per-workload basis. For example, the breakpoints 916, 918 of the illustrated example include a first example breakpoint 916 corresponding to an execution of the second workload 904 and a second example breakpoint 918 corresponding to an execution of the third workload 906. In some such examples, the breakpoints 916, 918 are specific to the second workload 904 and the third workload 906 and thereby may be activated on the core (e.g., the first core 212 or the second core 214) that executes the respective second workload 904 and the third workload 906 for the duration of the second workload 904 and the third workload 906.

In some examples, the second core 214 may trigger the first breakpoint 916 in response to starting the second workload 904. In response to satisfying the condition(s) associated with the first breakpoint 916, the second debug circuitry 210 may stop the data flow at the input or the output of the second core 214 to halt execution of the second workload 904. In this example, the first core 212 is not affected and may continue executing the first workload 902. In this example, the first core 212 may complete the first workload 902 and the third workload 906 while the second workload 904 is halted by the second debug circuitry 210. Advantageously, initial state(s) of the second core 214 may be read out in in response to a query by the debug application 114 to identify erroneous configurations, memory read/write operations, etc., prior to execution of the second workload 904. For example, the initial state(s) of the second core 214 may include values stored in the configuration register(s) 222, values of the machine-learning inputs 204 stored in the execution circuitry 220, etc.

In some examples, the first core 212 may trigger the second breakpoint 918 in response to an occurrence of a write operation of a machine-learning output generated by the first core 212 matching a value of 0x42. Advantageously, state(s) of the first core 212 may be read out in in response to a query by the debug application 114 to identify erroneous configurations, calculations, memory read/write operations, etc., in response to an execution of the third workload 906. For example, the state(s) of the first core 214 may include values stored in the configuration register(s) 222, value(s) of the machine-learning input(s) 204 stored in the execution circuitry 220, value(s) of the machine-learning input(s) 204 stored in the memory 118, value(s) of the machine-learning output(s) 206 stored in the execution circuitry 220, etc.

Figure 10:
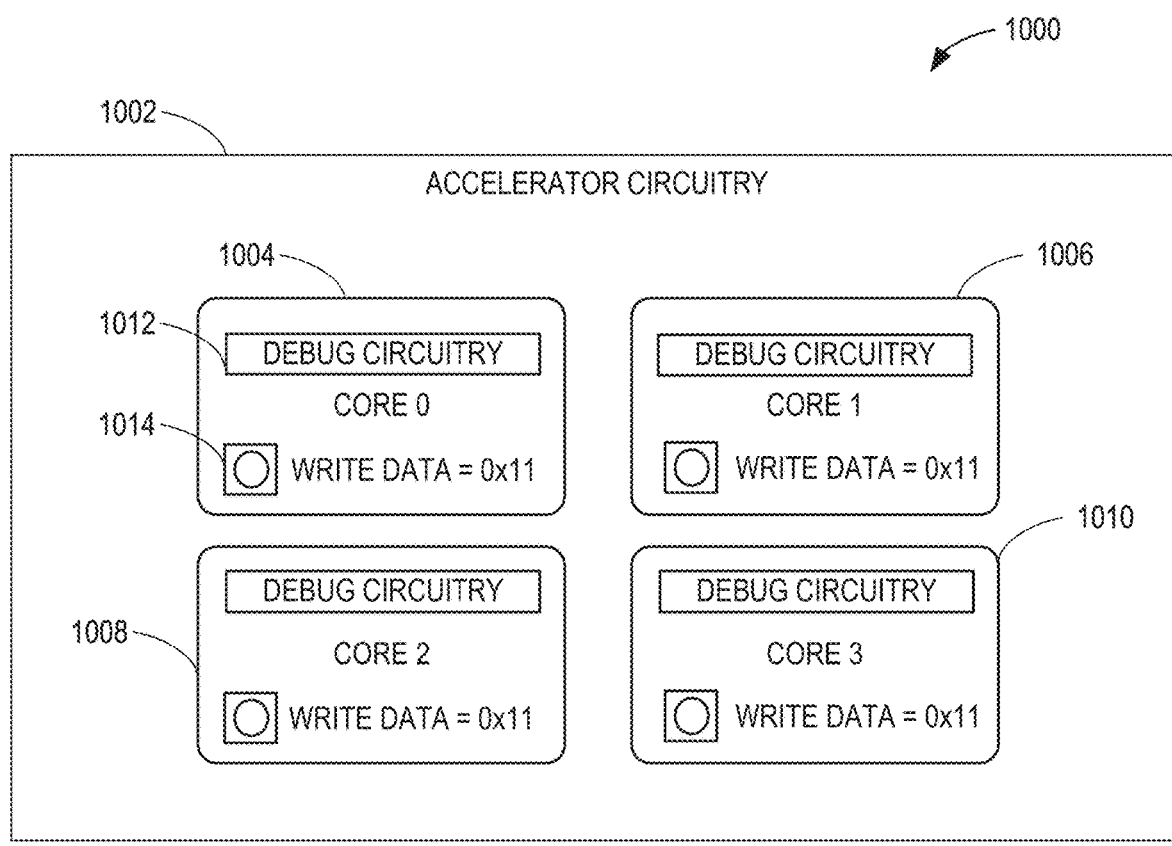
FIG. 10 is a second example workflow corresponding to example operation of another example implementation of the accelerator circuitry of FIG. 1.

FIG. 10 is a second example workflow 1000 corresponding to example operation of eleventh example accelerator circuitry 1002. In some examples, the eleventh accelerator circuitry 1002 may be implemented by the first accelerator circuitry 108 of FIG. 1, the second accelerator circuitry 110 of FIG. 1, the third accelerator circuitry 202 of FIG. 2, the fourth accelerator circuitry 302 of FIG. 3, the fifth accelerator circuitry 402 of FIG. 4, the sixth accelerator circuitry 502 of FIG. 5, the seventh accelerator circuitry 602 of FIG. 6, the eighth accelerator circuitry 702 of FIG. 7, and/or the ninth accelerator circuitry 802 of FIGS. 8A-8D.

In the illustrated example, the eleventh accelerator circuitry 1002 includes a first example core 1004 (identified by CORE 0), a second example core 1006 (identified by CORE 1), a third example core 1008 (identified by CORE 2), and a fourth example core 1010 (identified by CORE 3). For example, the first core 1004 may be implemented by the first core 212 of FIG. 2 and/or the second core 1006 may be implemented by the second core 214 of FIG. 2. In the second workflow 1000, the eleventh accelerator circuitry 1002 reads inputs from memory (e.g., the memory 118 of FIG. 1), generates outputs, and writes the outputs back to the memory. The eleventh accelerator circuitry 1002 may execute the second workflow 1000 in a loop over many iterations on one(s) of the cores 1004, 1006, 1008, 1010 in parallel using a number of smaller workloads of a machine-learning model (e.g., the machine-learning model(s) 124 of FIG. 1), until the execution finishes and a desired output of the machine-learning model is achieved. In this example, each of the cores 1004, 1006, 1008, 1010 includes example debug circuitry 1012, which may be implemented by the debug circuitry 112 of FIG. 1, the debug circuitry 208, 210 of FIGS. 2-7, the debug circuitry 404, 406 of FIGS. 4 and 7, and/or the debug circuitry 804 of FIGS. 8A-8D.

In some examples, if one(s) of the cores 1004, 1006, 1008, 1010, and/or, more generally, the eleventh accelerator circuitry 1002, is misconfigured, the execution of the machine-learning model might never finish, or if it finishes, the output may not be as expected. In some such examples, the debug circuitry 1012 may be invoked to perform a debugging operation to understand the cause for the unexpected output, and subsequently, execute corrective action on the one(s) of the cores 1004, 1006, 1008, 1010, and/or, more generally, the eleventh accelerator circuitry 1002 to correct the unexpected output.

In the illustrated example, the debug circuitry 1012 may intercept and analyze transactions obtained from memory and/or transmitted to memory to determine whether an example breakpoint 1014 is to be triggered. The breakpoint 1014 of the illustrated example is triggered in response to a write operation by one(s) of the cores 1004, 1006, 1008, 1010 of a data value of 0x11 to memory. Alternatively, the breakpoint 1014 may be triggered in response to a read operation by one(s) of the cores 1004, 1006, 1008, 1010 of the data value of 0x11 from memory.

The second workflow 1000 may implement an example where all of the cores 1004, 1006, 1008, 1010 have been configured with the same data-driven breakpoint. In response to one(s) of the cores 1004, 1006, 1008, 1010 executing a workload that is to write data value 0x11 to memory, the breakpoint 1014 is to be triggered. When the breakpoint 1014 is hit by the debug circuitry 1012, the debug circuitry 1012 halts a pipeline of the core that intends to write the data value of 0x11. For example, after one or more clock cycles, the entire core that triggered the breakpoint 1014 halts due to back pressure from the debug circuitry 1012.

Advantageously, the debug circuitry 1012 may halt the core to achieve analysis and extraction of transactions sent to memory and/or trigger different breakpoints based on specific transactions. Advantageously, the debug circuitry 1012 achieves improved visibility of actual transaction information to determine whether inputs from memory or outputs to memory are expected. For example, if a transaction is not expected, the debug circuitry 1012 may obtain visibility into an indication of a possible misconfiguration of the eleventh accelerator circuitry 1002. In some such examples, an expected output from the machine-learning model(s) 124 may be compared with an actual output from the eleventh accelerator circuitry 1002, which is instantiated with the same machine-learning model(s) 124. Advantageously, the debug circuitry 1012 may identify a mismatch based on the comparison.

In some examples, the first accelerator circuitry 108, the second accelerator circuitry 110, the third accelerator circuitry 202, the fourth accelerator circuitry 302, the fifth accelerator circuitry 402, the sixth accelerator circuitry 502, the seventh accelerator circuitry 602, the eighth accelerator circuitry 702, the ninth accelerator circuitry 802, and/or the tenth accelerator circuitry 1002 includes means for executing an executable to generate a data output based on a data input, and the executable based on a machine-learning model such as one of the machine-learning model(s) 124 of FIG. 1. For example, the means for executing may be implemented by the execution circuitry 220, the first execution circuitry thread 806, the second execution circuitry thread 808, the execution circuitry 875, and/or, more generally, the first core 212 and/or the second core 214 of FIG. 2. In some examples, the execution circuitry 220, the first execution circuitry thread 806, the second execution circuitry thread 808, the execution circuitry 875, and/or, more generally, the first core 212 and/or the second core 214, may be instantiated by processor circuitry such as the example processor circuitry 1412 of FIG. 14. For instance, the execution circuitry 220, the first execution circuitry thread 806, the second execution circuitry thread 808, the execution circuitry 875, and/or, more generally, the first core 212 and/or the second core, may be instantiated by the example general purpose processor circuitry 1500 of FIG. 15 executing machine executable instructions such as that implemented by at least blocks 1108, 1110, 1112, 1114, 1116, 1118, 1120 of FIG. 11. In some examples, the execution circuitry 220, the first execution circuitry thread 806, the second execution circuitry thread 808, the execution circuitry 875, and/or, more generally, the first core 212 and/or the second core 214, may be instantiated by hardware logic circuitry, which may be implemented by an ASIC or the FPGA circuitry 1600 of FIG. 16 structured to perform operations corresponding to the machine readable instructions. Additionally or alternatively, the execution circuitry 220, the first execution circuitry thread 806, the second execution circuitry thread 808, the execution circuitry 875, and/or, more generally, the first core 212 and/or the second core 214, may be instantiated by any other combination of hardware, software, and/or firmware. For example, the execution circuitry 220, the first execution circuitry thread 806, the second execution circuitry thread 808, the execution circuitry 875, and/or, more generally, the first core 212 and/or the second core 214, may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the first accelerator circuitry 108, the second accelerator circuitry 110, the third accelerator circuitry 202, the fourth accelerator circuitry 302, the fifth accelerator circuitry 402, the sixth accelerator circuitry 502, the seventh accelerator circuitry 602, the eighth accelerator circuitry 702, the ninth accelerator circuitry 802, and/or the tenth accelerator circuitry 1002 includes means for debugging a hardware accelerator. For example, the means for debugging may be implemented by the debug circuitry 112, the first debug circuitry 208, the second debug circuitry 210, the debug circuitry 404, the debug circuitry 406, the debug circuitry 804, and/or the debug circuitry 1012. In some examples, the debug circuitry 112, the first debug circuitry 208, the second debug circuitry 210, the debug circuitry 404, the debug circuitry 406, the debug circuitry 804, and/or the debug circuitry 1012 may be instantiated by processor circuitry such as the example processor circuitry 1412 of FIG. 14. For instance, the debug circuitry 112, the first debug circuitry 208, the second debug circuitry 210, the debug circuitry 404, the debug circuitry 406, the debug circuitry 804, and/or the debug circuitry 1012 may be instantiated by the example general purpose processor circuitry 1500 of FIG. 15 executing machine executable instructions such as that implemented by at least blocks 1110, 1112, 1114, 1116, 1118 of FIG. 11 and/or blocks 1302, 1304, 1306, 1308, 1310, 1312, 1314, 1316, 1318 of FIG. 13. In some examples, the debug circuitry 112, the first debug circuitry 208, the second debug circuitry 210, the debug circuitry 404, the debug circuitry 406, the debug circuitry 804, and/or the debug circuitry 1012 may be instantiated by hardware logic circuitry, which may be implemented by an ASIC or the FPGA circuitry 1600 of FIG. 16 structured to perform operations corresponding to the machine readable instructions. Additionally or alternatively, the debug circuitry 112, the first debug circuitry 208, the second debug circuitry 210, the debug circuitry 404, the debug circuitry 406, the debug circuitry 804, and/or the debug circuitry 1012 may be instantiated by any other combination of hardware, software, and/or firmware. For example, the debug circuitry 112, the first debug circuitry 208, the second debug circuitry 210, the debug circuitry 404, the debug circuitry 406, the debug circuitry 804, and/or the debug circuitry 1012 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for debugging includes means for receiving at least one of a data input or a data output. In some such examples, the means for receiving has at least one of an input coupled to an output of the means for executing or an output coupled to an input of the means for executing. For example, the means for receiving may be implemented by the first interface circuitry 812 and/or the second interface circuitry 818. In some such examples, first means for receiving may be implemented by the first interface circuitry 812 and second means for receiving may be implemented by the second interface circuitry 818.

In some examples, the input of the means for receiving is coupled to means for storing, the output of the means for receiving is coupled to the input of the means for executing, and the means for receiving is to receive the data input from the means for storing, and provide the data input to the input of the means for executing in response to the breakpoint not being triggered. In some such examples, the means for executing is to provide the data output from the output of the means for executing to the means for storing. In some examples, the first means for receiving may be implemented by the first interface circuitry 812 and the second means for receiving may be implemented by the second interface circuitry 818. In some examples, the first means for receiving may be implemented by the second interface circuitry 818 and the second means for receiving may be implemented by the first interface circuitry 812. In some examples, the first means for storing may be implemented by the memory 118. In some examples, the means for executing may be implemented by the first core 212, the execution circuitry 220 of the first core 212, the second core 214, the execution circuitry 220 of the second core 214, the first execution circuitry thread 806, the second execution circuitry thread 808, the execution circuitry 875, etc.

In some examples, the input of the means for executing is coupled to means for storing, the input of the means for receiving is coupled to the output of the means for executing, the output of the means for receiving is coupled to the means for storing, and the means for executing is to receive the data input from the means for storing, and provide the data output from the output of the means for executing to the input of the means for receiving. In some such examples, the means for receiving is to provide the data output to the means for storing in response to the breakpoint not being triggered. In some examples, the first means for receiving may be implemented by the first interface circuitry 812 and the second means for receiving may be implemented by the second interface circuitry 818. In some examples, the first means for receiving may be implemented by the second interface circuitry 818 and the second means for receiving may be implemented by the first interface circuitry 812. In some examples, the first means for storing may be implemented by the memory 118. In some examples, the means for executing may be implemented by the first core 212, the execution circuitry 220 of the first core 212, the second core 214, the execution circuitry 220 of the second core 214, the first execution circuitry thread 806, the second execution circuitry thread 808, the execution circuitry 875, etc.

In some examples, the means for debugging is first means for debugging, the means for receiving is first means for receiving, the input of the first means for receiving is coupled to means for storing, and the first means for receiving is to receive the data input from the means for storing. In some such examples, the first means for receiving is to provide the data input to the means for executing in response to the breakpoint not being triggered. In some examples, second means for debugging the hardware accelerator includes second means for receiving. In some such examples, an input of the second means for receiving coupled to the output of the means for executing, an output of the second means for receiving coupled to the means for storing, and the second means for debugging is to at least one of receive the data output from the means for executing, output the at least one of the data input or the data output in response to the trigger of the breakpoint, or output the data output to the means for storing in response to the breakpoint not being triggered.

In some examples, the means for debugging includes means for selecting the means for receiving. In some such examples, the means for selecting has an input coupled to an output of the means for receiving. For example, the means for selecting may be implemented by the multiplexer circuitry 826.

In some examples, the means for debugging includes means for outputting the at least one of the data input or the data output in response to a trigger of a breakpoint associated with an execution of the executable. In some such examples, the means for outputting has an input coupled to an output of the means for selecting. For example, the means for outputting may be implemented by the shift register 830.

In some examples in which at least one of the data input or the data output includes a first value, and the means for debugging includes means for controlling the means for debugging, the means for controlling to obtain a second value corresponding to the breakpoint from a first means for storing. In some such examples, second means for storing the second value is coupled to the means for controlling. In some such examples, means for comparing to compare the first value and the second value is coupled to the output of the means for receiving. For example, a first input of the means for comparing is coupled to the output of the means for receiving, and a second input of the means for comparing coupled to the second means for storing and the means for controlling. In some examples, the means for controlling is to control the means for receiving to provide the at least one of the data input or the data output to the means for selecting in response to a match of the first value and the second value based on the comparison, the triggering of the breakpoint in response to the match, the means for controlling to control the means for receiving to receive an indication of the match from the means for comparing. In some such examples, the first means for debugging may be implemented by the first debug circuitry 208, the debug circuitry 404, the debug circuitry 804, and/or the debug circuitry 1012. In some such examples, the second means for debugging may be implemented by the second debug circuitry 210 and/or the debug circuitry 406. In some such examples, the first means for storing may be implemented by the configuration register(s) 810. In some such examples, the second means for storing may be implemented by the first breakpoint register(s) 816 and/or the second breakpoint register(s) 822. In some examples, the first means for receiving may be implemented by the first interface circuitry 812 and the second means for receiving may be implemented by the second interface circuitry 818. In some examples, the first means for receiving may be implemented by the second interface circuitry 818 and the second means for receiving may be implemented by the first interface circuitry 812. In some examples, at least one of the first means for debugging or the second means for debugging is included in the means for executing.

In some examples in which the data input is a first data input, the data output is a first data output, the means for receiving is first means for receiving, the means for executing is a first means for executing, second means for receiving is to receive at least one of a second data input or a second data output, an input of the second means for receiving coupled to second means for executing. In some such examples, means for incrementing is to increment a counter, an output of the means for incrementing coupled to a selection input of the means for selecting, and the means for incrementing is to output a first value of the counter to instruct the means for selecting to select the output of the first means for receiving circuitry, and output a second value of the counter to instruct the means for selecting circuitry to select an output of the second means for receiving. In some such examples, the first means for executing may be implemented by the execution circuitry 220, the first execution circuitry thread 806, the second execution circuitry thread 808, the execution circuitry 875, and/or, more generally, the first core 212 and/or the second core 214 of FIG. 2. In some such examples, the second means for executing may be implemented by the execution circuitry 220, the first execution circuitry thread 806, the second execution circuitry thread 808, the execution circuitry 875, and/or, more generally, the first core 212 and/or the second core 214 of FIG. 2. In some examples, the first means for receiving may be implemented by the first interface circuitry 812 and the second means for receiving may be implemented by the second interface circuitry 818. In some examples, the first means for receiving may be implemented by the second interface circuitry 818 and the second means for receiving may be implemented by the first interface circuitry 812. In some examples, the means for incrementing may be implemented by the counter circuitry 828.

Figure 11:
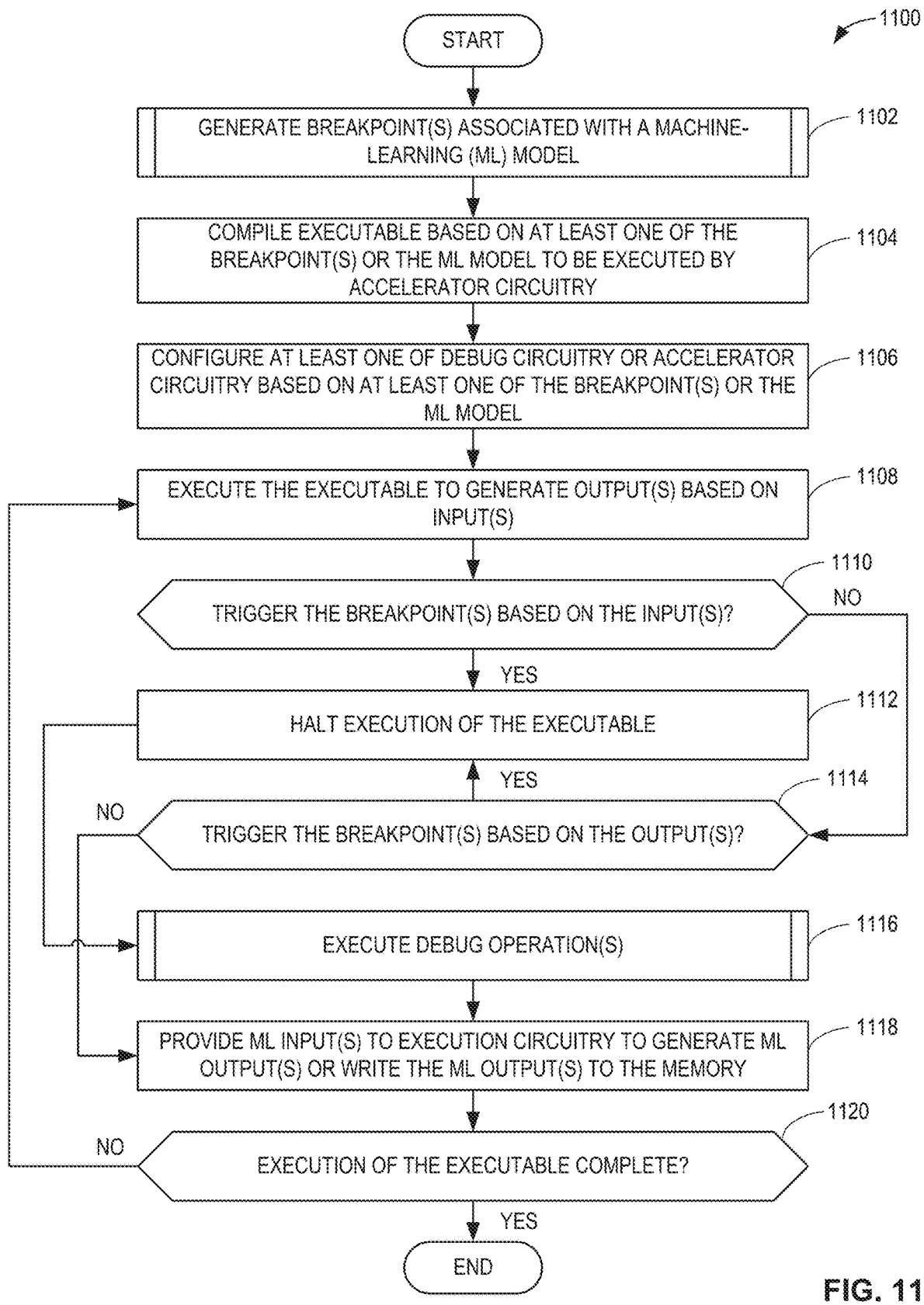
FIG. 11 is a flowchart representative of example machine readable instructions and/or example operations executed by example processor circuitry to implement the example computing system of FIG. 1.
Figure 12:
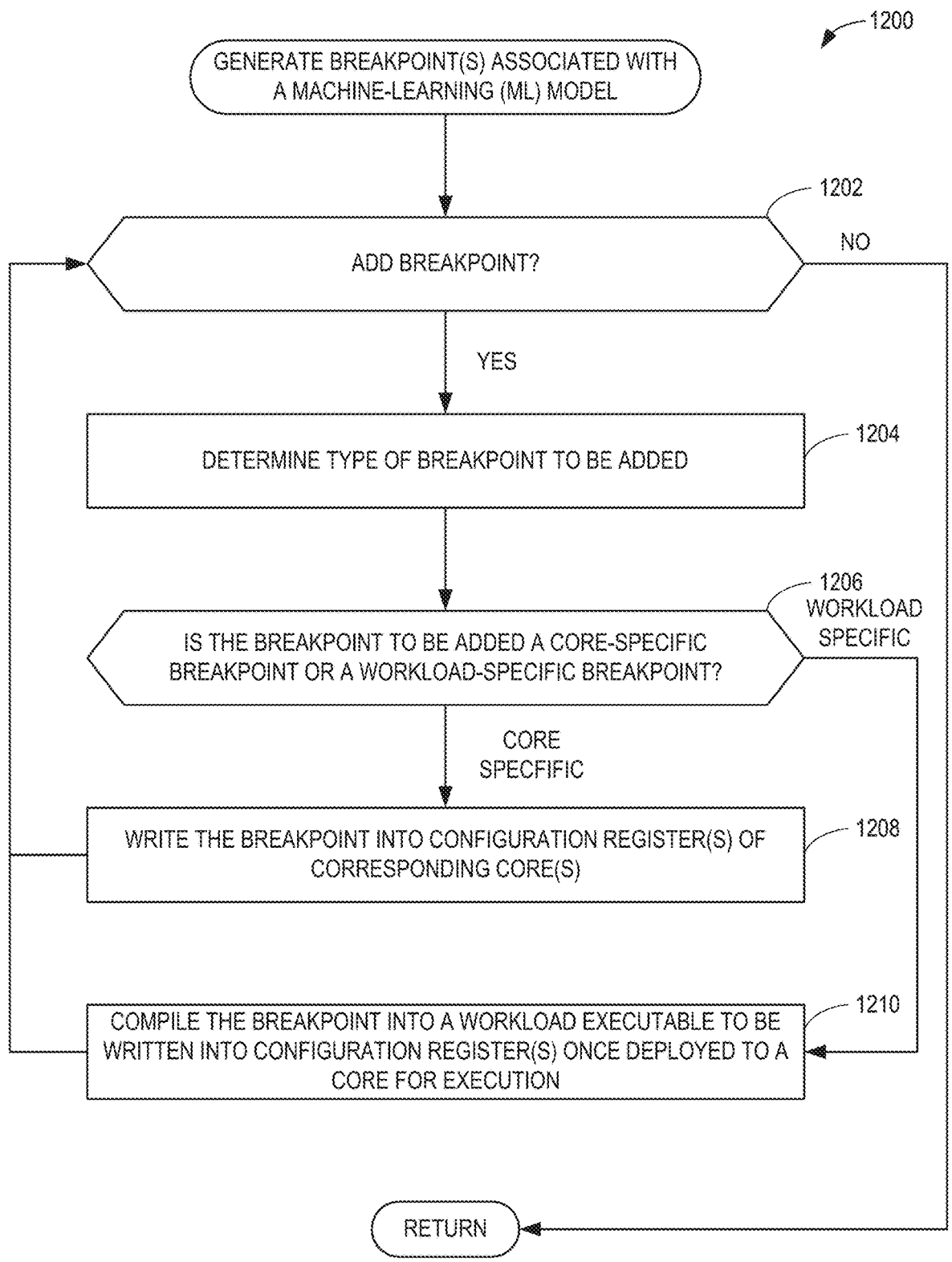
FIG. 12 is another flowchart representative of example machine readable instructions and/or example operations executed by example processor circuitry to implement the example computing system of FIG. 1.
Figure 13:
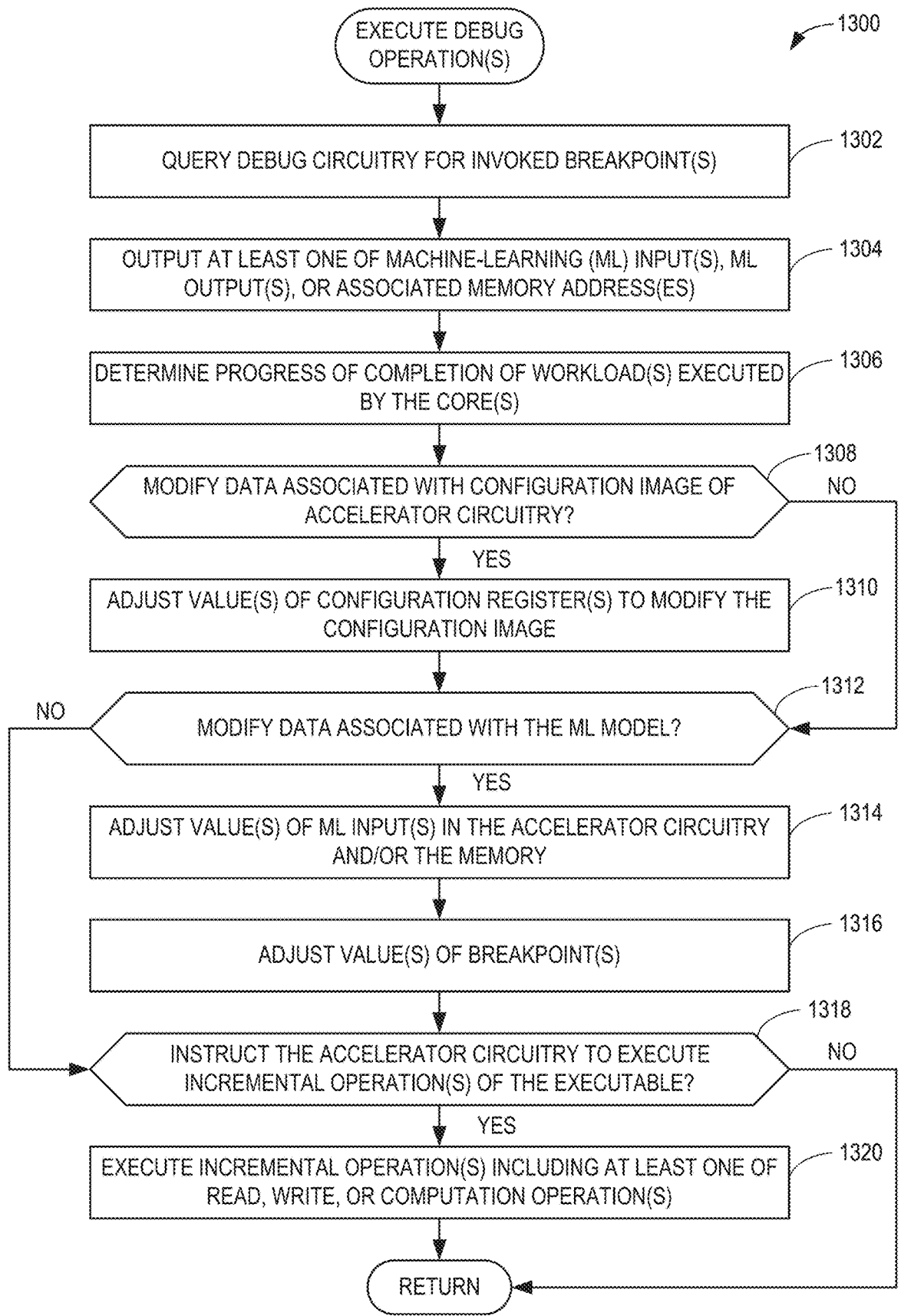
FIG. 13 is a flowchart representative of example machine readable instructions and/or example operations executed by example processor circuitry to implement the example debug circuitry and/or the example accelerator circuitry of FIGS. 1, 2, 3, 4, 5, 6, 7, 8A, 8B, 8C, 8D, and/or 10.

Flowcharts representative of example hardware logic circuitry, machine readable instructions, hardware implemented state machines, and/or any combination thereof for implementing the accelerator circuitry 108, 110 of FIG. 1 (or any other accelerator circuitry described herein such as the accelerator circuitry 802 of FIGS. 8A-8D) and/or the debug circuitry 112 of FIG. 1 (or any other debug circuitry described herein such as the debug circuitry 804 of FIGS. 8A-8D) are shown in FIGS. 11-13. The machine readable instructions may be one or more executable programs or portion(s) of an executable program for execution by processor circuitry, such as the processor circuitry 1412 shown in the example processor platform 1400 discussed below in connection with FIG. 14 and/or the example processor circuitry discussed below in connection with FIGS. 15 and/or 16. The program may be embodied in software stored on one or more non-transitory computer readable storage media such as a CD, a floppy disk, a hard disk drive (HDD), a solid-state drive (SSD), a DVD, a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 11-13, many other methods of implementing the example accelerator circuitry 108, 110 and/or the example debug circuitry 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 11-13 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 11 is a flowchart representative of example machine readable instructions and/or example operations 1100 that may be executed and/or instantiated by processor circuitry to execute debug operation(s) on accelerator circuitry. The machine readable instructions and/or the operations 1100 of FIG. 11 begin at block 1102, at which the debug application 114 of FIG. 1 generates breakpoint(s) associated with a machine-learning (ML) model. For example, the debug application 114 may generate a breakpoint to be triggered in response to a first value of the machine-learning input(s) 204, a second value of an address at which the first value is to be read from the memory 118, a third value of the machine-learning output(s) 206, a fourth value of an address at which the third value is to be written to the memory 118, etc., and/or a combination thereof. Example machine readable instructions and/or example operations that may be executed and/or instantiated by processor circuitry to implement block 1102 is described below in connection with FIG. 12.

At block 1104, the debug application 114 compiles an executable based on at least one of the breakpoint(s) or the ML model to be executed by accelerator circuitry. For example, the debug application 114 may compile an executable binary based on the machine-learning model(s) 124, and the executable binary may include the breakpoint.

At block 1106, the debug circuitry 112 configures at least one of debug circuitry or accelerator circuitry based on at least one of the breakpoint(s) or the ML model. For example, the debug circuitry 208 may store the breakpoint in the debug register(s) 216 to configure the debug circuitry 208 to halt an execution of the executable binary in response to the breakpoint being hit or triggered. In some examples, in response to an execution of the executable binary, the first core 212 may store value(s) in the configuration register(s) 222 that may be utilized to configure the execution circuitry 220 based on the machine-learning model(s) 124. In some such examples, in response to an execution of the executable binary, the first core 212 may store the breakpoint in the configuration register(s) 222.

At block 1108, the accelerator circuitry 108, 110 executes the executable to generate output(s) based on input(s). For example, the first execution circuitry thread 806 may obtain a first machine-learning input of the machine-learning input(s) 204 from the memory 118 and generate a first machine-learning output of the machine-learning output(s) 206 based on the first machine-learning input.

At block 1110, the debug circuitry 112 determines whether to trigger the breakpoint(s) based on the input(s). For example, the debug circuitry 208 may determine to trigger the breakpoint in response to a first value of an address at which the first machine-learning input is read from the memory 118 matches a second value of the breakpoint. In some examples, the debug circuitry 208 may determine to trigger the breakpoint in response to a third value of the first machine-learning input matching a fourth value of the breakpoint.

If, at block 1110, the debug circuitry 112 determines to trigger the breakpoint(s) based on the input(s), then, at block 1112, the debug circuitry 112 halts an execution of the executable. For example, the first comparator circuitry 814 may generate an output to the control circuitry 824 that indicates that a breakpoint has been triggered in connection with the first execution circuitry thread 806. In some such examples, the control circuitry 824 may generate the BP HIT signal 850 and instruct the first interface circuitry 812 to pull down the request signal 840, the first ready signal 842, the response signal 846, etc., of the first execution circuitry thread 806 and the second execution circuitry thread 808 to halt a flow of data from the memory 118.

In response to halting an execution of the executable at block 1112, control proceeds to block 1116 to execute debug operation(s). For example, the shift register 830 may output the debug transaction 852 that corresponds to the triggering of the breakpoint based on the first machine-learning input. Example machine readable instructions and/or example operations that may be executed and/or instantiated by processor circuitry to implement block 1116 is described below in connection with FIG. 13.

If, at block 1110, the debug circuitry 112 determines not to trigger the breakpoint(s) based on the input(s), control proceeds to block 1114 to determine whether to trigger the breakpoint(s) based on the output(s). For example, the debug circuitry 208 may determine to trigger the breakpoint in response to a fifth value of an address at which the first machine-learning output is to be written to the memory 118 or a different portion of execution circuitry (e.g., a different portion of the execution circuitry 875 of FIG. 8D) matching a sixth value of the breakpoint. In some examples, the debug circuitry 208 may determine to trigger the breakpoint in response to a seventh value of the first machine-learning output matching an eighth value of the breakpoint.

If, at block 1114, the debug circuitry 112 determines to trigger the breakpoint(s) based on the output(s), then, at block 1112, the debug circuitry 112 halts an execution of the executable. For example, the first comparator circuitry 814 may determine that the first machine-learning output (or data associated thereof) triggered a breakpoint. In some such examples, the first comparator circuitry 814 may generate an output to the control circuitry 824 to inform the control circuitry 824 that the breakpoint has been triggered. In some such examples, the control circuitry 824 generates the BP HIT signal 850 and commands the first interface circuitry 812 to pull down the request signal 840, the first ready signal 842, and the response signal 846 to halt a flow of data from the first execution circuitry thread 806.

In response to halting an execution of the executable at block 1112, control proceeds to block 1116 to execute debug operation(s). For example, the shift register 830 may output the debug transaction 852 that corresponds to the triggering of the breakpoint based on the first machine-learning output. In some examples, the shift register 830 may output the debug transaction 852 that corresponds to any other type of breakpoint. In some examples, after the breakpoint is hit, one or more subsequent ones of the debug transactions 852 may be read out to the configuration register(s) 810. In response to executing the debug operation(s) at block 1116, control proceeds to block 1118 provide ML input(s) to execution circuitry to generate ML output(s) or write the ML output(s) to the memory.

If, at block 1114, the debug circuitry 112 determines not to trigger the breakpoint(s) based on the output(s), control proceeds to block 1118 to provide ML input(s) to execution circuitry to generate ML output(s) or write the ML output(s) to the memory. For example, the first interface circuitry 812 may provide first machine-learning input read from the memory 118 to the first execution circuitry thread 806 to cause the first execution circuitry thread 806 to generate the first machine-learning output. In some examples, the first interface circuitry 812 may provide the first machine-learning output from the first execution circuitry thread 806 to the memory 118. In response to providing the ML input(s) to execution circuitry to generate ML output(s) or writing the ML output(s) to the memory at block 1118, control proceeds to block 1120 to determine whether the execution of the executable is complete.

If, at block 1120, the first accelerator circuitry 108 and/or the second accelerator circuitry 110 determine(s) that the execution of the executable is not complete, control returns to block 1108 to execute the executable to generate output(s) based on the input(s). If, at block 1120, the accelerator circuitry 108, 110 determines that the execution of the executable is complete, the machine readable instructions and/or the operations 1100 of FIG. 11 conclude.

FIG. 12 is a flowchart representative of example machine readable instructions and/or example operations 1200 that may be executed and/or instantiated by processor circuitry to generate breakpoint(s) associated with a machine-learning (ML) model. In some examples, the machine readable instructions and/or the operations 1200 may implement block 1102 of FIG. 11. The machine readable instructions and/or the operations 1200 of FIG. 12 begin at block 1202, at which the debug application 114 determines whether to add a breakpoint. For example, the debug application 114 may determine whether to add one or more core-specific breakpoints (e.g., breakpoints to be triggered on a per-core basis), one or more workload-specific breakpoints (e.g., breakpoints to be triggered on a per-workload basis), etc., and/or combination(s) thereof.

If, at block 1202, the debug application 114 does not determine to add a breakpoint, the machine readable instructions and/or operations 1200 of FIG. 12 conclude. For example, the machine readable instructions and/or operations 1200 of FIG. 12 may return to block 1104 of the machine readable instructions and/or operations 1100 of FIG. 11 to compile an executable based on at least one of the breakpoint(s) or the ML model to be executed by accelerator circuitry.

If, at block 1202, the debug application 114 determines to add a breakpoint, then, at block 1204, the debug application 114 determines a type of breakpoint to be added. For example, the debug application 114 may determine to add an immediate breakpoint (e.g., a breakpoint to be triggered upon a start of a workload, the first breakpoint 916 of FIG. 9, etc.), an address breakpoint (e.g., a breakpoint to be triggered based on an address or a range of addresses), a data breakpoint (e.g., a breakpoint to be triggered based on a value of data, the second breakpoint 918 of FIG. 9, etc.), etc.

At block 1206, the debug application 114 determines whether the breakpoint to be added is a core-specific breakpoint or a workload-specific breakpoint. For example, the debug application 114 may determine that the breakpoint to be added is a core-specific breakpoint, which may be implemented by the first breakpoint 916 or the second breakpoint 918 of FIG. 9. In some examples, the debug application 114 may determine that the breakpoint to be added is a workload-specific breakpoint, which may be implemented by the breakpoint 1014 of FIG. 10.

If, at block 1206, the debug application 114 determines that the breakpoint to be added is a core-specific breakpoint, control proceeds to block 1208 to write the breakpoint into configuration register(s) of corresponding core(s). For example, the debug application 114 may write the core-specific breakpoint into the configuration register(s) 810 of FIGS. 8A-8D that correspond to a specific core. In response to writing the breakpoint into configuration register(s) of corresponding core(s) at block 1208, control returns to block 1202 to determine whether to add another breakpoint.

If, at block 1206, the debug application 114 determines that the breakpoint to be added is a workload-specific breakpoint, control proceeds to block 1210 to compile the breakpoint into a workload executable to be written into configuration register(s) once deployed to a core for execution. For example, the debug application 114 may write the workload-specific breakpoint into an executable binary (e.g., a workload executable binary, a workload executable binary file, etc.) to be written to the configuration register(s) 810 of FIGS. 8A-8D when the executable binary is deployed to a core for execution. In response to compiling the breakpoint into a workload executable to be written into configuration register(s) once deployed to a core for execution at block 1210, control returns to block 1202 to determine whether to add another breakpoint.

FIG. 13 is a flowchart representative of example machine readable instructions and/or example operations 1300 that may be executed and/or instantiated by processor circuitry to execute debug operation(s). In some examples, the machine readable instructions and/or the operations 1300 may implement block 1116 of FIG. 11. The machine readable instructions and/or the operations 1300 of FIG. 13 begin at block 1302, at which the debug application 114 queries debug circuitry for invoked breakpoint(s). For example, the debug application 114 may retrieve the invoked breakpoint(s) from the configuration register(s) 810.

At block 1304, the debug circuitry 112 outputs at least one of machine-learning (ML) input(s), ML output(s), or associated memory address(es). For example, the debug application 114 may write the read transaction command 856 into the configuration register(s) 810. In some such examples, the control circuitry 824 may retrieve the read transaction command 856 from the configuration register(s) 810 and generate the read transaction 854. In response to the read transaction 854, the shift register 830 may output a first machine-learning input of the first machine-learning input(s) 204, a first machine-learning output of the machine-learning output(s) 206, a memory address associated with the first machine-learning input, a memory address associated with the first machine-learning output, etc., to the configuration register(s) 810 as part of the debug transaction 852. In some such examples, the debug application 114 may retrieve the first machine-learning input of the first machine-learning input(s) 204, the first machine-learning output of the machine-learning output(s) 206, the memory address associated with the first machine-learning input, the memory address associated with the first machine-learning output, etc., from the configuration register(s) 810.

At block 1306, the debug circuitry 112 and/or the debug application 114 determine(s) a progress of completion of workload(s) executed by the core(s). For example, the debug application 114 may request a status or progress of completion of an executable binary, workload(s) to be executed by the first execution circuitry thread 806, etc., from the configuration register(s) 810.

At block 1308, the debug circuitry 112 and/or the debug application 114 determine whether to modify data associated with a configuration image of acceleration circuitry. For example, the debug application 114 may determine whether to modify, adjust, etc., portion(s) of a configuration image to be implemented by the accelerator circuitry 802 of FIGS. 8A-8D by writing different value(s) into one(s) of the configuration register(s) 810.

If, at block 1308, the debug circuitry 112 and/or the debug application 114 determine not to modify data associated with a configuration image of acceleration circuitry, control proceeds to block 1312 to determine whether to modify data associated with the ML model. If, at block 1308, the debug circuitry 112 and/or the debug application 114 determine to modify data associated with a configuration image of acceleration circuitry, then, at block 1310, the debug application 114 adjusts value(s) of configuration register(s) to modify the configuration image. For example, the debug application 114 may modify, adjust, etc., portion(s) of a configuration image to be implemented by the accelerator circuitry 802 of FIGS. 8A-8D by writing different value(s) into one(s) of the configuration register(s) 810.

In response to adjusting the value(s) of the configuration register(s) to modify the configuration image at block 1310, the debug circuitry 112 and/or the debug application 114 determine whether to modify data associated with the ML model at block 1312. For example, the debug application 114 may determine whether to adjust value(s) of the machine-learning input(s) 204 in the memory 118, value(s) of the machine-learning input(s) 204 in the first execution circuitry thread 806, etc., and/or a combination thereof.

If, at block 1312, the debug circuitry 112 and/or the debug application 114 determine not to modify data associated with the ML model, control proceeds to block 1318. If, at block 1312, the debug circuitry 112 and/or the debug application 114 determine to modify data associated with the ML model, then, at block 1314, the debug circuitry 112 and/or the debug application 114 adjust value(s) of ML input(s) in the accelerator circuitry and/or the memory. For example, the debug application 114 may change, modify, etc., adjust value(s) of the machine-learning input(s) 204 in the memory 118, value(s) of the machine-learning input(s) 204 in the first execution circuitry thread 806, etc., and/or a combination thereof.

At block 1316, the debug circuitry 112 and/or the debug application 114 adjust value(s) of breakpoint(s). For example, the debug application 114 may write different value(s) of breakpoint(s) stored in the configuration register(s) 810, the first breakpoint register(s) 816, the second breakpoint register(s) 822, etc., and/or a combination thereof.

At block 1318, the debug circuitry 112 and/or the debug application 114 determine whether to instruct the accelerator circuitry to execute incremental operation(s) of the executable. For example, the debug application 114 may instruct the debug circuitry 112 to execute one or more read, write, or computation operations. In some such examples, the debug application 114 may write the single step command 858 into the configuration register(s) 810, which may cause the control circuitry 824 to effectuate a single step operation.

If, at block 1318, the debug circuitry 112 and/or the debug application 114 determine not to instruct the accelerator circuitry to execute incremental operation(s) of the executable, the machine readable instructions and/or the operations 1300 of FIG. 13 conclude. For example, the machine readable instructions and/or the operations 1300 of FIG. 13 may return to block 1118 of the machine readable instructions and/or the operations 1100 of FIG. 11 to provide ML input(s) to execution circuitry to generate ML output(s) or write the ML output(s) to the memory.

If, at block 1318, the debug circuitry 112 and/or the debug application 114 determine to instruct the accelerator circuitry to execute incremental operation(s) of the executable, then, at block 1320, the debug circuitry 112 and/or the debug application 114 execute incremental operation(s) including at least one of read, write, or computation operation(s). For example, the debug application 114, by way of the single step command 858 and the control circuitry 824, may instruct the first interface circuitry 812 of FIG. 8A to facilitate a read operation by releasing the forces on the request signal 840, the first ready signal 842, and the response signal 846 for a first clock cycle, and then pull down the request signal 840, the first ready signal 842, and the response signal 846 after the first clock cycle. In some examples, the debug application 114, by way of the single step command 858 and the control circuitry 824, may instruct the first interface circuitry 812 of FIG. 8B to facilitate a write operation by pulling up the request signal 840, the first ready signal 842, and the response signal 846, for a first clock cycle, and then pull down the request signal 840, the first ready signal 842, and the response signal 846 after the first clock cycle. In some examples, the debug application 114, by way of the read transaction command 856 and the control circuitry 824, may instruct the shift register 830 to output the debug transaction 852 in response to the read transaction 854.

In response to executing the incremental operation(s) including at least one of read, write, or computation operation(s) at block 1318, the machine readable instructions and/or the operations 1300 of FIG. 13 conclude. For example, the machine readable instructions and/or the operations 1300 of FIG. 13 may return to block 1120 of the machine readable instructions and/or the operations 1100 of FIG. 11 to determine whether an execution of the executable is complete.

Figure 14:
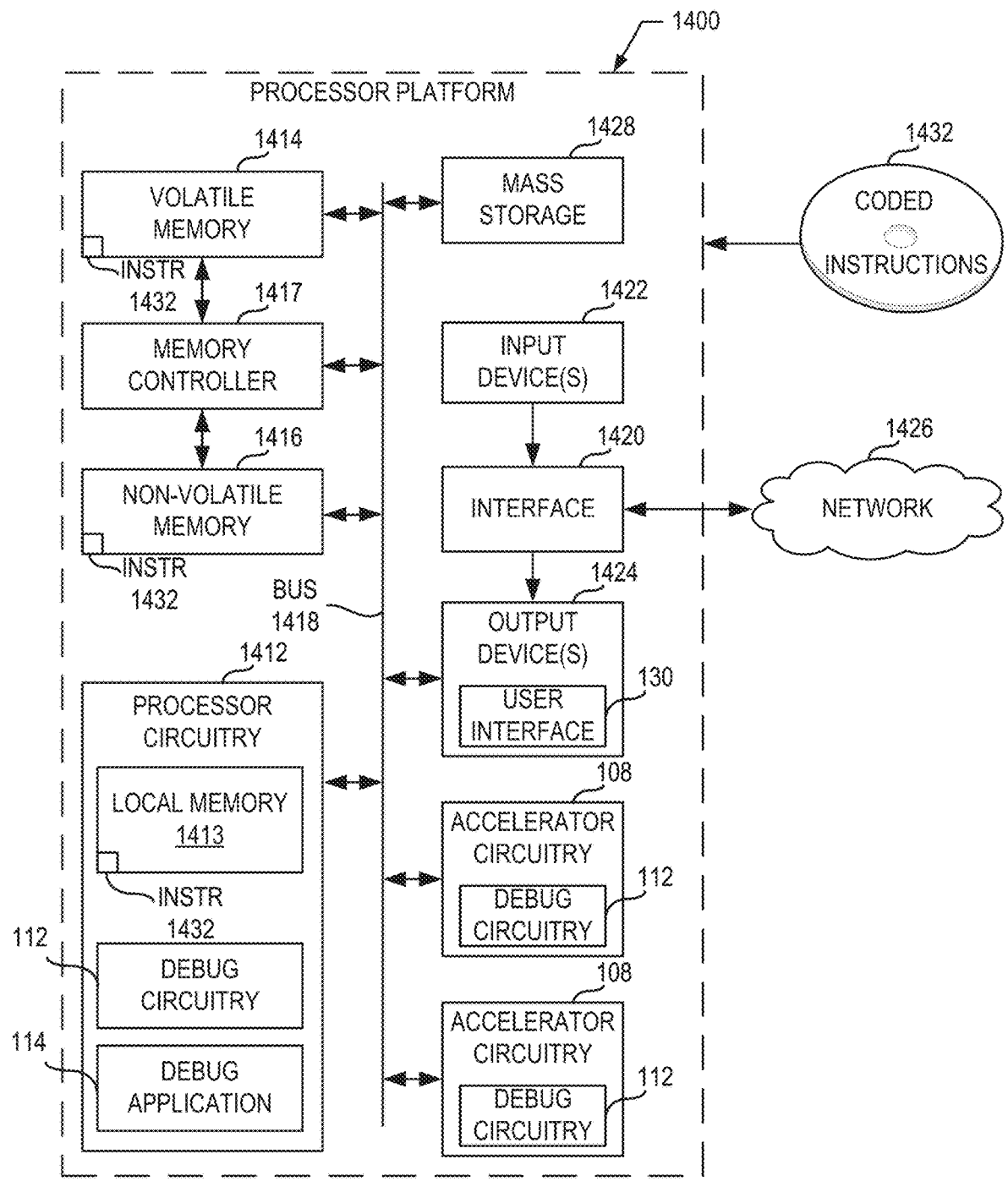
FIG. 14 is a block diagram of an example processing platform including processor circuitry structured to execute the example machine readable instructions and/or the example operations of FIGS. 11-13 to implement the example debug circuitry and/or the example accelerator circuitry of FIGS. 1, 2, 3, 4, 5, 6, 7, 8A, 8B, 8C, 8D, and/or 10.

FIG. 14 is a block diagram of an example processor platform 1400 structured to execute and/or instantiate the machine readable instructions and/or the operations of FIGS. 11-13 to implement the first accelerator circuitry 108, the second accelerator circuitry 110, the debug circuitry 112, and the debug application 114 of FIG. 1. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs microprocessors, CPUs, GPUs, DSPs, and/or microcontrollers from any desired family or manufacturer. The processor circuitry 1412 may be implemented by one or more semiconductor based (e.g., silicon based) devices. In this example, the processor circuitry 1412 implements the debug circuitry 112 and the debug application 114 of FIG. 1. For example, the processor circuitry 1412 may implement the debug circuitry 804 of FIGS. 8A-8D and/or the debug circuitry 1012 of FIG. 10.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 by a bus 1418. In some examples, the bus 1418 implements the bus 128 of FIG. 1. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417.

The processor platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1422 are connected to the interface circuitry 1420. The input device(s) 1422 permit(s) a user to enter data and/or commands into the processor circuitry 1412. The input device(s) 1422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuitry 1420 of the illustrated example. The output device(s) 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU. In this example, the output device(s) 1424 implement the user interface 130 of FIG. 1.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1400 of the illustrated example also includes one or more mass storage devices 1428 to store software and/or data. Examples of such mass storage devices 1428 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1432, which may be implemented by the machine readable instructions of FIGS. 11-13, may be stored in the mass storage device 1428, in the volatile memory 1414, in the non-volatile memory 1416, and/or on a removable non-transitory computer readable storage medium such as a CD or DVD.

The processor platform 1400 of the illustrated example of FIG. 14 includes the first accelerator circuitry 108 and the second accelerator circuitry 110 of FIG. 1. In this example, the first accelerator circuitry 108 and the second accelerator circuitry 110 are in communication with different hardware of the processor platform 1400, such as the volatile memory 1414, the non-volatile memory 1416, etc., by the bus 1418.

Figure 15:
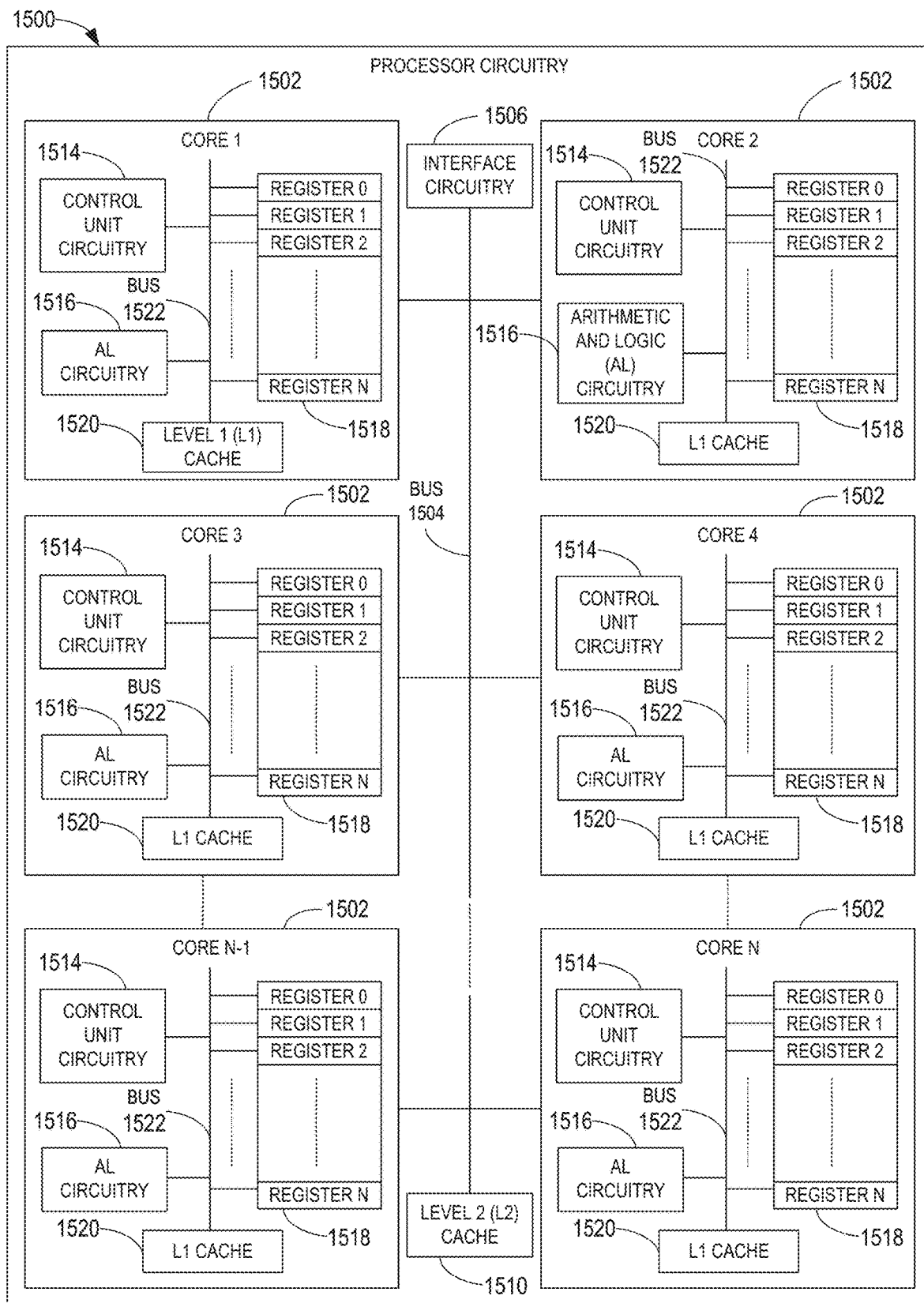
FIG. 15 is a block diagram of an example implementation of the processor circuitry of FIG. 14.

FIG. 15 is a block diagram of an example implementation of the processor circuitry 1412 of FIG. 14. In this example, the processor circuitry 1412 of FIG. 14 is implemented by a general purpose microprocessor 1500. The general purpose microprocessor circuitry 1500 execute some or all of the machine readable instructions of the flowcharts of FIGS. 11-13 to effectively instantiate the first accelerator circuitry 108, the second accelerator circuitry 110, and/or the debug circuitry 112 of FIG. 1 as logic circuits to perform the operations corresponding to those machine readable instructions. For example, the microprocessor 1500 may implement multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine readable instructions and/or the operations represented by the flowcharts of FIGS. 11-13.

The cores 1502 may communicate by a first example bus 1504. In some examples, the first bus 1504 may implement a communication bus to effectuate communication associated with one(s) of the cores 1502. For example, the first bus 1504 may implement at least one of an Inter-Integrated Circuit (I2C) bus, a Serial Peripheral Interface (SPI) bus, a PCI bus, or a PCIe bus. Additionally or alternatively, the first bus 1504 may implement any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2 cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1414, 1416 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the L1 cache 1520, and a second example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer based operations. In other examples, the AL circuitry 1516 also performs floating point operations. In yet other examples, the AL circuitry 1516 may include first AL circuitry that performs integer based operations and second AL circuitry that performs floating point operations. In some examples, the AL circuitry 1516 may be referred to as an Arithmetic Logic Unit (ALU). The registers 1518 are semiconductor-based structures to store data and/or instructions such as results of one or more of the operations performed by the AL circuitry 1516 of the corresponding core 1502. For example, the registers 1518 may include vector register(s), SIMD register(s), general purpose register(s), flag register(s), segment register(s), machine specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure including distributed throughout the core 1502 to shorten access time. The second bus 1522 may implement at least one of an I2C bus, a SPI bus, a PCI bus, or a PCIe bus Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 16:
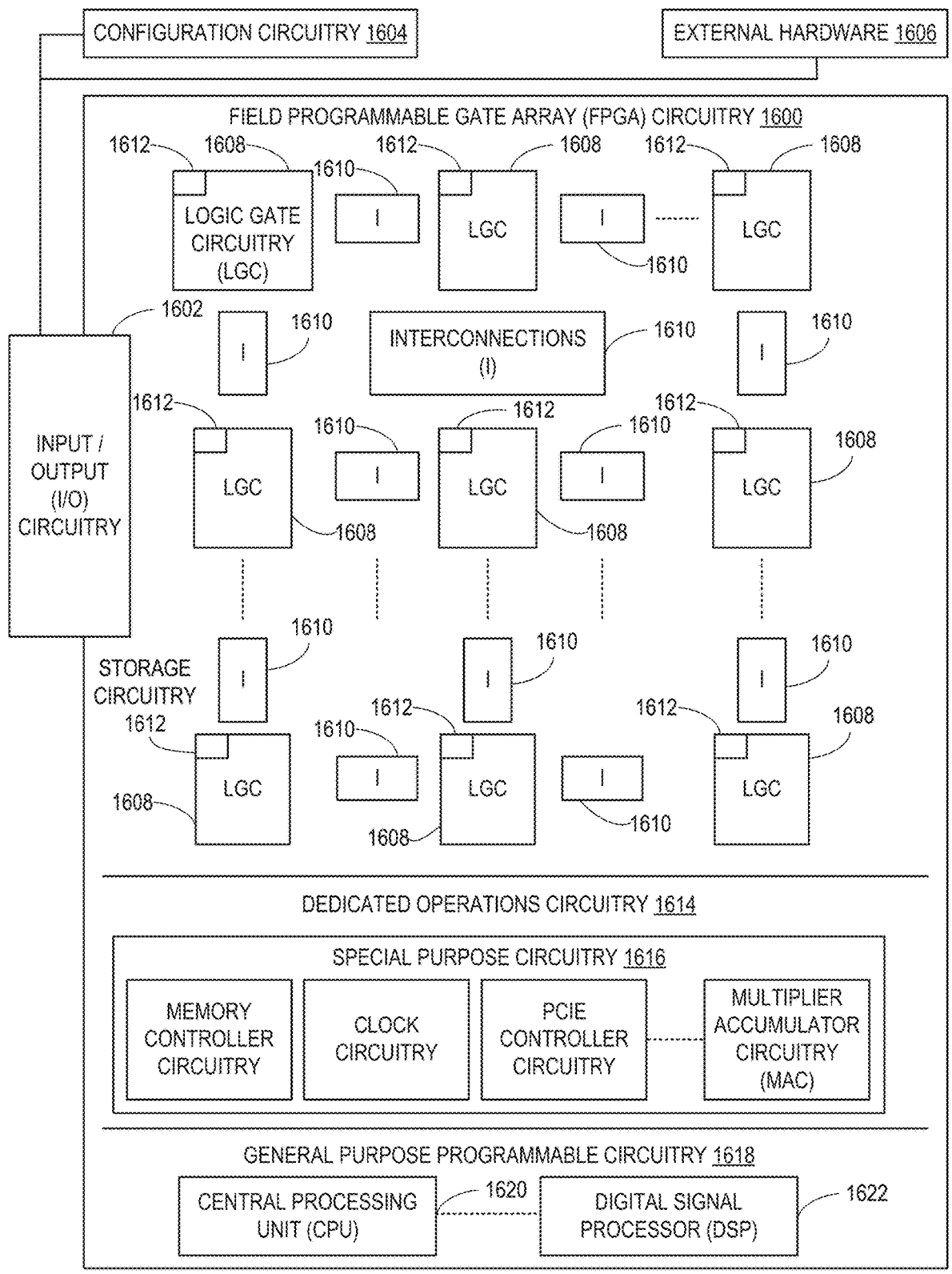
FIG. 16 is a block diagram of another example implementation of the processor circuitry of FIG. 14.

FIG. 16 is a block diagram of another example implementation of the processor circuitry 1412 of FIG. 14. In this example, the processor circuitry 1412 is implemented by FPGA circuitry 1600. The FPGA circuitry 1600 can be used, for example, to perform operations that could otherwise be performed by the example microprocessor 1500 of FIG. 15 executing corresponding machine readable instructions. However, once configured, the FPGA circuitry 1600 instantiates the machine readable instructions in hardware and, thus, can often execute the operations faster than they could be performed by a general purpose microprocessor executing the corresponding software.

More specifically, in contrast to the microprocessor 1500 of FIG. 15 described above (which is a general purpose device that may be programmed to execute some or all of the machine readable instructions represented by the flowcharts of FIGS. 11-13 but whose interconnections and logic circuitry are fixed once fabricated), the FPGA circuitry 1600 of the example of FIG. 16 includes interconnections and logic circuitry that may be configured and/or interconnected in different ways after fabrication to instantiate, for example, some or all of the machine readable instructions represented by the flowcharts of FIG. 11-13. In particular, the FPGA circuitry 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the software represented by the flowcharts of FIGS. 11-13. As such, the FPGA circuitry 1600 may be structured to effectively instantiate some or all of the machine readable instructions of the flowcharts of FIGS. 11-13 as dedicated logic circuits to perform the operations corresponding to those software instructions in a dedicated manner analogous to an ASIC. Therefore, the FPGA circuitry 1600 may perform the operations corresponding to the some or all of the machine readable instructions of FIGS. 11-13 faster than the general purpose microprocessor can execute the same.

In the example of FIG. 16, the FPGA circuitry 1600 is structured to be programmed (and/or reprogrammed one or more times) by an end user by a hardware description language (HDL) such as Verilog. The FPGA circuitry 1600 of FIG. 16, includes example input/output (I/O) circuitry 1602 to obtain and/or output data to/from example configuration circuitry 1604 and/or external hardware (e.g., external hardware circuitry) 1606. For example, the configuration circuitry 1604 may implement interface circuitry that may obtain machine readable instructions to configure the FPGA circuitry 1600, or portion(s) thereof. In some such examples, the configuration circuitry 1604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1606 may implement the microprocessor 1500 of FIG. 15. The FPGA circuitry 1600 also includes an array of example logic gate circuitry 1608, a plurality of example configurable interconnections 1610, and example storage circuitry 1612. The logic gate circuitry 1608 and interconnections 1610 are configurable to instantiate one or more operations that may correspond to at least some of the machine readable instructions of FIGS. 11-13 and/or other desired operations. The logic gate circuitry 1608 shown in FIG. 16 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations. The logic gate circuitry 1608 may include other electrical structures such as look-up tables (LUTs), registers (e.g., flip-flops or latches), multiplexers, etc.

The interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example Dedicated Operations Circuitry 1614. In this example, the Dedicated Operations Circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the processor circuitry 1412 of FIG. 14, many other approaches are contemplated. For example, as mentioned above, modern FPGA circuitry may include an onboard CPU, such as one or more of the example CPU 1620 of FIG. 16. Therefore, the processor circuitry 1412 of FIG. 14 may additionally be implemented by combining the example microprocessor 1500 of FIG. 15 and the example FPGA circuitry 1600 of FIG. 16. In some such hybrid examples, a first portion of the machine readable instructions represented by the flowcharts of FIGS. 11-13 may be executed by one or more of the cores 1502 of FIG. 15 and a second portion of the machine readable instructions represented by the flowcharts of FIGS. 11-13 may be executed by the FPGA circuitry 1600 of FIG. 16.

In some examples, the processor circuitry 1412 of FIG. 14 may be in one or more packages. For example, the processor circuitry 1500 of FIG. 15 and/or the FPGA circuitry 1600 of FIG. 16 may be in one or more packages. In some examples, an XPU may be implemented by the processor circuitry 1412 of FIG. 14, which may be in one or more packages. For example, the XPU may include a CPU in one package, a DSP in another package, a GPU in yet another package, and an FPGA in still yet another package.

Figure 17:
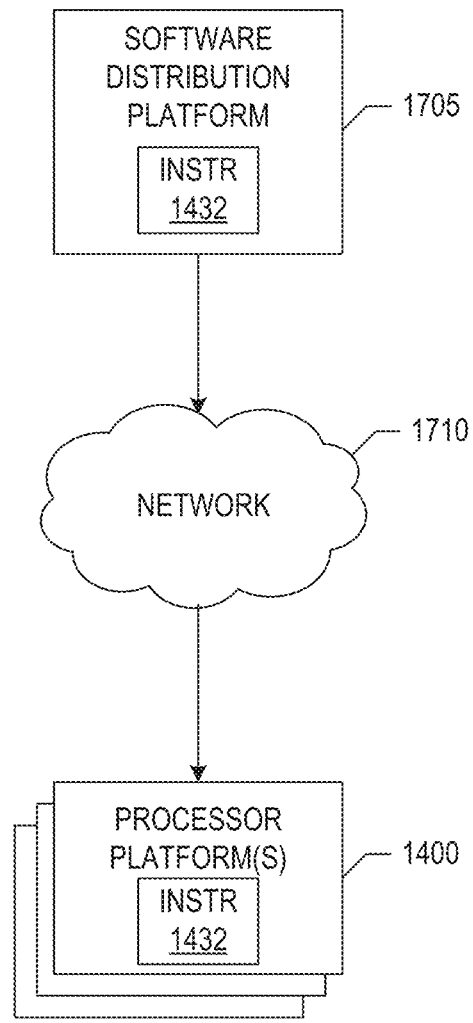
FIG. 17 is a block diagram of an example software distribution platform to distribute software to client devices associated with end users and/or consumers, retailers, and/or original equipment manufacturers (OEMs).

FIG. 17 is a block diagram illustrating an example software distribution platform 1705 to distribute software such as the example machine readable instructions 1432 of FIG. 14 to hardware devices owned and/or operated by third parties. The example software distribution platform 1705 may be implemented by any computer server, data facility, cloud service, etc., capable of storing and transmitting software to other computing devices. Examples of third parties may include client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers). In some examples, the third parties may be customers of the entity owning and/or operating the software distribution platform 1705. For example, the entity that owns and/or operates the software distribution platform 1705 may be a developer, a seller, and/or a licensor of software such as the example machine readable instructions 1432 of FIG. 14. The third parties may be consumers, users, retailers, OEMs, etc., who purchase and/or license the software for use and/or re-sale and/or sub-licensing. In the illustrated example, the software distribution platform 1705 includes one or more servers and one or more storage devices. The storage devices store the machine readable instructions 1432, which may correspond to the example machine readable instructions and/or the operations 1100, 1200, 1300 of FIGS. 11-13, as described above. The one or more servers of the example software distribution platform 1705 are in communication with a network 1710, which may correspond to any one or more of the Internet and/or any of the example networks 132, 1426 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1432 from the software distribution platform 1705. For example, the software, which may correspond to the example machine readable instructions and/or the operations 1100, 1200, 1300 of FIGS. 11-13, may be downloaded to the example processor platform 1400, which is to execute the machine readable instructions 1432 to implement the first accelerator circuitry 108, the second accelerator circuitry 110, the debug circuitry 112, and/or the debug application 114 of FIG. 1. In some examples, one or more servers of the software distribution platform 1705 periodically offer, transmit, and/or force updates to the software (e.g., the example machine readable instructions 1432 of FIG. 14) to ensure improvements, patches, updates, etc., are distributed and applied to the software at the end user devices.

From the foregoing, it will be appreciated that example systems, methods, apparatus, and articles of manufacture have been disclosed that debug accelerator hardware. Disclosed systems, methods, apparatus, and articles of manufacture allows for a unified software approach during debugging by having dedicated debug circuitry for debugging. For example, any accelerator core may be halted at a given time and incrementally executed (e.g., single-stepped) through using existing hardware with breakpoints (e.g., breakpoint instructions) disclosed herein. Disclosed systems, methods, apparatus, and articles of manufacture may allow any execution binary (e.g., the output of a compiler that is dispatched onto a hardware accelerator) to be used and debugged. Disclosed systems, methods, apparatus, and articles of manufacture achieve halting an execution of a core to incrementally execute a workload with the core with read and debug transactions to detect transaction(s) that fall outside of expected behavior (e.g., expected values, expected addresses, etc.). Disclosed systems, methods, apparatus, and articles of manufacture achieve the output of debug transactions with a controlled technique that allows detection of memory write operations that erroneously overwrite each other to improve visibility throughout the hardware accelerator pipeline.

Disclosed systems, methods, apparatus, and articles of manufacture implement automatic detection of pre-programmed datums in generated streams of data to identify at what point in execution an unexpected occurrence of a piece of data is generated, and also which workload on which core is responsible for the unexpected occurrence. Disclosed systems, methods, apparatus, and articles of manufacture implement capabilities to set breakpoints on specific memory transaction addresses or ranges of addresses to achieve improved identification of unexpected operations.

Disclosed systems, methods, apparatus, and articles of manufacture improve the efficiency of using a computing device by improving and/or otherwise optimizing execution of hardware accelerators in response to identifications and corrections of erroneous accelerator configurations. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to debug accelerator hardware are disclosed herein. Further examples and combinations thereof include the following:

Example 1 includes an apparatus to debug a hardware accelerator, the apparatus comprising a core with a core input and a core output, the core to execute executable code to generate a data output based on a data input, the executable code based on a machine-learning model, and debug circuitry coupled to at least one of the core input or the core output, the debug circuitry including interface circuitry with at least one of an interface input coupled to the core output or an interface output coupled to the core input, the interface circuitry to receive at least one of the data input or the data output, multiplexer circuitry with a multiplexer input and a multiplexer output, the multiplexer input coupled to the interface output, and a shift register with a shift register input coupled to the multiplexer output, the shift register to output the at least one of the data input or the data output in response to a trigger of a breakpoint associated with an execution of the executable code.

Example 2 includes the apparatus of example 1, wherein the interface input is coupled to memory, the interface output is coupled to the core input, and wherein the interface circuitry is to receive the data input from the memory, and provide the data input to the core input in response to the breakpoint not being triggered, and the core is to provide the data output from the core output to the memory.

Example 3 includes the apparatus of example 1, wherein the core input is coupled to memory, the interface input is coupled to the core output, the interface output is coupled to the memory, and wherein the core is to receive the data input from the memory, and provide the data output from the core output to the interface input, and the interface circuitry is to provide the data output to the memory in response to the breakpoint not being triggered.

Example 4 includes the apparatus of example 1, wherein the debug circuitry is first debug circuitry, the interface circuitry is first interface circuitry, the interface input is a first interface input, the interface output is a first interface output, the first interface input is coupled to memory, the first interface circuitry to receive the data input from the memory, and further including the first interface circuitry is to provide the data input to the core in response to the breakpoint not being triggered, second debug circuitry including second interface circuitry with a second interface input and a second interface output, the second interface input coupled to the core output, the second interface output coupled to the memory, the second debug circuitry to at least one of receive the data output from the core, output the at least one of the data input or the data output in response to the trigger of the breakpoint, or output the data output to the memory in response to the breakpoint not being triggered.

Example 5 includes the apparatus of example 1, wherein the debug circuitry is included in the core, the hardware accelerator is a neural network accelerator, the machine-learning model is a neural network, and wherein the core is to execute executable code to generate a data output based on a data input, the executable code including a breakpoint, the executable code based on at least one of the neural network or the breakpoint, and the debug circuitry is to trigger the breakpoint to stop the execution of the executable code, and output at least one of the data input, the data output, or the breakpoint.

Example 6 includes the apparatus of example 1, wherein the at least one of the data input or the data output includes a first value, and the debug circuitry includes control circuitry to obtain a second value corresponding to the breakpoint from a configuration register of the core, a breakpoint register coupled to the control circuitry, the breakpoint register to store the second value, comparator circuitry with a first comparator input and a second comparator input, the first comparator input coupled to the interface output, the second comparator input coupled to the breakpoint register and the control circuitry, the comparator circuitry to compare the first value and the second value, and the control circuitry to instruct the interface circuitry to provide the at least one of the data input or the data output to the multiplexer circuitry in response to a match of the first value and the second value based on the comparison, the triggering of the breakpoint in response to the match, the control circuitry to instruct the interface circuitry to receive an indication of the match from the comparator circuitry.

Example 7 includes the apparatus of example 1, wherein the interface circuitry is first interface circuitry, the interface input is a first interface input, the interface output is a first interface output, the core includes a first thread and a second thread, the first thread coupled to the first interface input, and further including second interface circuitry with a second interface input and a second interface output, the second interface input coupled to the second thread, and counter circuitry with a counter output coupled to a selection input of the multiplexer circuitry, the counter circuitry to output a first value to instruct the multiplexer circuitry to select the output of the first interface circuitry, and output a second value to instruct the multiplexer circuitry to select the output of the second interface circuitry.

Example 8 includes an apparatus to debug a hardware accelerator, the apparatus comprising means for executing executable code to generate a data output based on a data input, the executable code based on a machine-learning model, and means for debugging the hardware accelerator, the means for debugging coupled to the means for executing, the means for debugging including means for receiving at least one of the data input or the data output, the means for receiving with at least one of an input coupled to an output of the means for executing or an output coupled to an input of the means for executing, means for selecting the means for receiving, the means for selecting with an input coupled to an output of the means for receiving, and means for outputting the at least one of the data input or the data output in response to a trigger of a breakpoint associated with an execution of the executable code, the means for outputting with an input coupled to an output of the means for selecting.

Example 9 includes the apparatus of example 8, wherein the input of the means for receiving is coupled to means for storing, the output of the means for receiving is coupled to the input of the means for executing, and wherein the means for receiving is to receive the data input from the means for storing, and provide the data input to the input of the means for executing in response to the breakpoint not being triggered, and the means for executing is to provide the data output from the output of the means for executing to the means for storing.

Example 10 includes the apparatus of example 8, wherein the input of the means for executing is coupled to means for storing, the input of the means for receiving is coupled to the output of the means for executing, the output of the means for receiving is coupled to the means for storing, and wherein the means for executing is to receive the data input from the means for storing, and provide the data output from the output of the means for executing to the input of the means for receiving, and the means for receiving is to provide the data output to the means for storing in response to the breakpoint not being triggered.

Example 11 includes the apparatus of example 8, wherein the means for debugging is first means for debugging, the means for receiving is first means for receiving, the input of the first means for receiving is coupled to means for storing, the first means for receiving is to receive the data input from the means for storing, and further including the first means for receiving is to provide the data input to the means for executing in response to the breakpoint not being triggered, second means for debugging the hardware accelerator, the second means for debugging including second means for receiving, an input of the second means for receiving coupled to the output of the means for executing, an output of the second means for receiving coupled to the means for storing, the second means for debugging to at least one of receive the data output from the means for executing, output the at least one of the data input or the data output in response to the trigger of the breakpoint, or output the data output to the means for storing in response to the breakpoint not being triggered.

Example 12 includes the apparatus of example 8, wherein the means for debugging is included in the means for executing, the hardware accelerator is a neural network accelerator, the machine-learning model is a neural network, and wherein the means for executing is to execute executable code to generate a data output based on a data input, the executable code including a breakpoint, the executable code based on at least one of the neural network or the breakpoint, and the means for debugging is to trigger the breakpoint to stop the execution of the executable code, and output at least one of the data input, the data output, or the breakpoint.

Example 13 includes the apparatus of example 8, wherein the at least one of the data input or the data output includes a first value, and the means for debugging includes means for controlling the means for debugging, the means for controlling to obtain a second value corresponding to the breakpoint from a first means for storing, second means for storing the second value, the second means for storing coupled to the means for controlling, means for comparing to compare the first value and the second value, a first input of the means for comparing coupled to the output of the means for receiving, a second input of the means for comparing coupled to the second means for storing and the means for controlling, and the means for controlling to control the means for receiving to provide the at least one of the data input or the data output to the means for selecting in response to a match of the first value and the second value based on the comparison, the triggering of the breakpoint in response to the match, the means for controlling to control the means for receiving to receive an indication of the match from the means for comparing.

Example 14 includes the apparatus of example 8, wherein the data input is a first data input, the data output is a first data output, the means for receiving is first means for receiving, the means for executing is a first means for executing, and further including second means for receiving at least one of a second data input or a second data output, an input of the second means for receiving coupled to second means for executing, and means for incrementing a counter, an output of the means for incrementing coupled to a selection input of the means for selecting, the means for incrementing to output a first value of the counter to instruct the means for selecting to select the output of the first means for receiving, and output a second value of the counter to instruct the means for selecting to select an output of the second means for receiving.

Example 15 includes an apparatus to debug a hardware accelerator, the apparatus comprising at least one memory, instructions in the apparatus, and processor circuitry to at least one of execute or instantiate the instructions to generate a breakpoint associated with a machine-learning model, compile executable code based on at least one of the machine-learning model or the breakpoint, the executable code to be executed by the processor circuitry to generate a data output based on a data input, in response to an execution of the executable code trigger the breakpoint to stop the execution of the executable code, and output, with debug circuitry included in the processor circuitry, at least one of the data input, the data output, or the breakpoint.

Example 16 includes the apparatus of example 15, wherein the processor circuitry is to identify the breakpoint to be triggered on a per-workload basis, insert the breakpoint into the executable code to be invoked on the per-workload basis, in response to the execution of the executable code by a first core of the processor circuitry, halt execution of the executable code by the first core when the breakpoint is triggered by the first core, and in response to the execution of the executable code by a second core of the processor circuitry, halt execution of the executable code by the second core when the breakpoint is triggered by the second core.

Example 17 includes the apparatus of example 15, wherein the processor circuitry is to identify the breakpoint to be triggered on a per-core basis, identify the breakpoint to be written into a first configuration register of a first core of the processor circuitry and not a second configuration register of a second core of the processor circuitry, and write the breakpoint into the first configuration register, the triggering of the breakpoint to halt execution of the executable code by the first core while the second core is to continue execution of the executable code.

Example 18 includes the apparatus of example 15, wherein the data input includes first data, the data output includes second data, and the processor circuitry is to identify the breakpoint to be triggered based on third data, write the third data into a configuration register of a core of the processor circuitry, execute a first comparison of the first data and the third data, the triggering of the breakpoint in response to a first match of the first data and the third data based on the first comparison, and execute a second comparison of the second data and the third data, the triggering of the breakpoint in response to a second match of the second data and the third data based on the second comparison.

Example 19 includes the apparatus of example 15, wherein the processor circuitry is to identify the breakpoint to be triggered based on a first address in memory associated with the data output, write the first address into a configuration register of a core of the processor circuitry, in response to executing the executable code, identify a second address in the memory at which to write the data output, and execute a comparison of the first address and the second address, the triggering of the breakpoint in response to a match of the first address and the second address.

Example 20 includes the apparatus of example 15, wherein the data input is a first data input, and the processor circuitry is to in response to the triggering of the breakpoint, obtain a control signal indicative of executing an incremental operation of the executable code, the incremental operation including at least one of a read operation to read a first value, a write operation to write a second value, or a computation operation to determine a third value based on a second data input, and output at least one of the first value, the second value, or the third value.

Example 21 includes the apparatus of example 15, wherein the processor circuitry is to in response to the triggering of the breakpoint, at least one of adjust a first value of the data input, adjust a second value of a first register of a core of the processor circuitry, or adjust a third value of a second register of the debug circuitry, and resume the execution of the executable code based on at least one of the first value, the second value, or the third value.

Example 22 includes at least one non-transitory computer readable medium comprising instructions that, when executed, cause first processor circuitry to at least generate a breakpoint associated with a machine-learning model, compile executable code based on at least one of the machine-learning model or the breakpoint, the executable code to be executed by the first processor circuitry or second processor circuitry to generate a data output based on a data input, in response to an execution of the executable code trigger the breakpoint to stop the execution of the executable code, and output, with debug circuitry included in the first processor circuitry or the second processor circuitry, at least one of the data input, the data output, or the breakpoint.

Example 23 includes the at least one non-transitory computer readable medium of example 22, wherein the instructions, when executed, cause the first processor circuitry to identify the breakpoint to be triggered on a per-workload basis, insert the breakpoint into the executable code to be invoked on the per-workload basis, in response to the execution of the executable code by a first core of the first processor circuitry or the second processor circuitry, halt execution of the executable code by the first core when the breakpoint is triggered by the first core, and in response to the execution of the executable code by a second core of the first processor circuitry or the second processor circuitry, halt execution of the executable code by the second core when the breakpoint is triggered by the second core.

Example 24 includes the at least one non-transitory computer readable medium of example 22, wherein the instructions, when executed, cause the first processor circuitry to identify the breakpoint to be triggered on a per-core basis, identify the breakpoint to be written into a first configuration register of a first core of the first processor circuitry or the second processor circuitry and not a second configuration register of a second core of the first processor circuitry or the second processor circuitry, and write the breakpoint into the first configuration register, the triggering of the breakpoint to halt execution of the executable code by the first core while the second core is to continue execution of the executable code.

Example 25 includes the at least one non-transitory computer readable medium of example 22, wherein the data input includes first data, the data output includes second data, and the instructions, when executed, cause the first processor circuitry to identify the breakpoint to be triggered based on third data, write the third data into a configuration register of a core of the first processor circuitry or the second processor circuitry, execute a first comparison of the first data and the third data, the triggering of the breakpoint in response to a first match of the first data and the third data based on the first comparison, and execute a second comparison of the second data and the third data, the triggering of the breakpoint in response to a second match of the second data and the third data based on the second comparison.

Example 26 includes the at least one non-transitory computer readable medium of example 22, wherein the instructions, when executed, cause the first processor circuitry to identify the breakpoint to be triggered based on a first address in memory associated with the data output, write the first address into a configuration register of a core of the first processor circuitry or the second processor circuitry, in response to executing the executable code, identify a second address in the memory at which to write the data output, and execute a comparison of the first address and the second address, the triggering of the breakpoint in response to a match of the first address and the second address.

Example 27 includes the at least one non-transitory computer readable medium of example 22, wherein the data input is a first data input, and the instructions, when executed, cause the first processor circuitry to in response to the triggering of the breakpoint, obtain a control signal indicative of executing an incremental operation of the executable code, the incremental operation including at least one of a read operation to read a first value, a write operation to write a second value, or a computation operation to determine a third value based on a second data input, and output at least one of the first value, the second value, or the third value.

Example 28 includes the at least one non-transitory computer readable medium of example 22, wherein the instructions, when executed, cause the first processor circuitry to in response to the triggering of the breakpoint, at least one of adjust a first value of the data input, adjust a second value of a first register of a core of the first processor circuitry or the second processor circuitry, or adjust a third value of a second register of the debug circuitry, and resume the execution of the executable code based on at least one of the first value, the second value, or the third value.

Example 29 includes an apparatus to debug a hardware accelerator, the apparatus comprising first interface circuitry to obtain a machine-learning model, and processor circuitry including one or more of at least one of a central processing unit, a graphics processing unit, or a digital signal processor, the at least one of the central processing unit, the graphics processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate core circuitry to execute executable code to generate a data output based on a data input, the executable code based on the machine-learning model, second interface circuitry to receive at least one of the data input or the data output, multiplexer circuitry to select the second interface circuitry, and a shift register to output the at least one of the data input or the data output in response to a trigger of a breakpoint associated with an execution of the executable code.

Example 30 includes the apparatus of example 29, wherein the second interface circuitry is to receive the data input from memory, and the processor circuitry is to perform at least one of the first operations, the second operations, or the third operations to instantiate a buffer to, in response to the breakpoint not being triggered receive the data input from the second interface circuitry, and output the data input to the core circuitry.

Example 31 includes the apparatus of example 29, wherein the second interface circuitry is to receive the data output from the core circuitry, and the processor circuitry is to perform at least one of the first operations, the second operations, or the third operations to instantiate a buffer to, in response to the breakpoint not being triggered receive the data output from the second interface circuitry, and output the data output to memory.

Example 32 includes the apparatus of example 29, wherein the second interface circuitry is to receive the data input from memory, and the processor circuitry is to perform at least one of the first operations, the second operations, or the third operations to instantiate a buffer to, in response to the breakpoint not being triggered receive the data input from the second interface circuitry, and output the data input to the core circuitry, and debug circuitry to output the at least one of the data input or the data output in response to the trigger of the breakpoint, or output the data output to the memory in response to the breakpoint not being triggered.

Example 33 includes the apparatus of example 32, wherein the debug circuitry is included in the core circuitry.

Example 34 includes the apparatus of example 29, wherein the at least one of the data input or the data output includes a first value, and the processor circuitry is to perform at least one of the first operations, the second operations, or the third operations to instantiate a configuration register to store a second value corresponding to the breakpoint, and comparator circuitry to compare the first value and the second value, and instruct the second interface circuitry to provide the at least one of the data input or the data output to the multiplexer circuitry in response to a match of the first value and the second value based on the comparison, the triggering of the breakpoint in response to the match.

Example 35 includes the apparatus of example 29, wherein the core circuitry is first core circuitry, and the processor circuitry is to perform at least one of the first operations, the second operations, or the third operations to instantiate counter circuitry to output a first value to instruct the multiplexer circuitry to select the output of the second interface circuitry, and output a second value to instruct the multiplexer circuitry to select an output of third interface circuitry associated with second core circuitry.

Example 36 includes a method to debug a hardware accelerator, the method comprising generating a breakpoint associated with a machine-learning model, compiling executable code based on at least one of the machine-learning model or the breakpoint, the executable code to be executed by accelerator circuitry to generate a data output based on a data input, in response to an execution of the executable code triggering the breakpoint to stop the execution of the executable code, and outputting, with debug circuitry included in the accelerator circuitry, at least one of the data input, the data output, or the breakpoint.

Example 37 includes the method of example 36, further including identifying the breakpoint to be triggered on a per-workload basis, inserting the breakpoint into the executable code to be invoked on the per-workload basis, in response to the execution of the executable code by a first core of the accelerator circuitry, halting execution of the executable code by the first core when the breakpoint is triggered by the first core, and in response to the execution of the executable code by a second core of the accelerator circuitry, halting execution of the executable code by the second core when the breakpoint is triggered by the second core.

Example 38 includes the method of example 36, further including identifying the breakpoint to be triggered on a per-core basis, identifying the breakpoint to be written into a first configuration register of a first core of the accelerator circuitry and not a second configuration register of a second core of the accelerator circuitry, and writing the breakpoint into the first configuration register, the triggering of the breakpoint to halt execution of the executable code by the first core while the second core continues execution of the executable code.

Example 39 includes the method of example 36, wherein the data input includes first data, the data output includes second data, and further including identifying the breakpoint to be triggered based on third data, writing the third data into a configuration register of a core of the accelerator circuitry, executing a first comparison of the first data and the third data, the triggering of the breakpoint in response to a first match of the first data and the third data based on the first comparison, and executing a second comparison of the second data and the third data, the triggering of the breakpoint in response to a second match of the second data and the third data based on the second comparison.

Example 40 includes the method of example 36, further including identifying the breakpoint to be triggered based on a first address in memory associated with the data output, writing the first address into a configuration register of a core of the accelerator circuitry, in response to executing the executable code, identifying a second address in the memory at which to write the data output, and executing a comparison of the first address and the second address, the triggering of the breakpoint in response to a match of the first address and the second address.

Example 41 includes the method of example 36, wherein the data input is a first data input, and further including in response to the triggering of the breakpoint, obtaining a control signal indicative of executing an incremental operation of the executable code, the incremental operation including at least one of a read operation to read a first value, a write operation to write a second value, or a computation operation to determine a third value based on a second data input, and outputting at least one of the first value, the second value, or the third value.

Example 42 includes the method of example 36, further including in response to the triggering of the breakpoint, at least one of adjusting a first value of the data input, adjusting a second value of a first register of a core of the accelerator circuitry, or adjusting a third value of a second register of the debug circuitry, and resuming the execution of the executable code based on at least one of the first value, the second value, or the third value.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to debug a hardware accelerator, the apparatus comprising:
    a core with a core input and a core output, the core to execute executable code to generate a data output based on a data input, the executable code based on a machine-learning model; and
    debug circuitry coupled to at least one of the core input or the core output, the debug circuitry including:
        interface circuitry with at least one of an interface input coupled to the core output or an interface output coupled to the core input, the interface circuitry to receive at least one of the data input or the data output;
        multiplexer circuitry with a multiplexer input and a multiplexer output, the multiplexer input coupled to the interface output; and
        a shift register with a shift register input coupled to the multiplexer output, the shift register to output the at least one of the data input or the data output in response to a trigger of a breakpoint associated with an execution of the executable code.

2. The apparatus of claim 1, wherein the interface input is coupled to memory, the interface output is coupled to the core input, and wherein:
    the interface circuitry is to:
        receive the data input from the memory; and
        provide the data input to the core input in response to the breakpoint not being triggered; and
    the core is to provide the data output from the core output to the memory.

3. The apparatus of claim 1, wherein the core input is coupled to memory, the interface input is coupled to the core output, the interface output is coupled to the memory, and wherein:
    the core is to:
        receive the data input from the memory; and
        provide the data output from the core output to the interface input; and
    the interface circuitry is to provide the data output to the memory in response to the breakpoint not being triggered.

4. The apparatus of claim 1, wherein the debug circuitry is first debug circuitry, the interface circuitry is first interface circuitry, the interface input is a first interface input, the interface output is a first interface output, the first interface input is coupled to memory, the first interface circuitry to receive the data input from the memory, and further including:
    the first interface circuitry is to provide the data input to the core in response to the breakpoint not being triggered;
    second debug circuitry including second interface circuitry with a second interface input and a second interface output, the second interface input coupled to the core output, the second interface output coupled to the memory, the second debug circuitry to at least one of:
        receive the data output from the core;
        output the at least one of the data input or the data output in response to the trigger of the breakpoint; or
        output the data output to the memory in response to the breakpoint not being triggered.

5. The apparatus of claim 1, wherein the debug circuitry is included in the core, the hardware accelerator is a neural network accelerator, the machine-learning model is a neural network, and wherein:
    the core is to execute executable code to generate a data output based on a data input, the executable code including a breakpoint, the executable code based on at least one of the neural network or the breakpoint; and
    the debug circuitry is to:
        trigger the breakpoint to stop the execution of the executable code; and
        output at least one of the data input, the data output, or the breakpoint.

6. The apparatus of claim 1, wherein the at least one of the data input or the data output includes a first value, and the debug circuitry includes:
    control circuitry to obtain a second value corresponding to the breakpoint from a configuration register of the core;
    a breakpoint register coupled to the control circuitry, the breakpoint register to store the second value;
    comparator circuitry with a first comparator input and a second comparator input, the first comparator input coupled to the interface output, the second comparator input coupled to the breakpoint register and the control circuitry, the comparator circuitry to compare the first value and the second value; and the control circuitry to instruct the interface circuitry to provide the at least one of the data input or the data output to the multiplexer circuitry in response to a match of the first value and the second value based on the comparison, the triggering of the breakpoint in response to the match, the control circuitry to instruct the interface circuitry to receive an indication of the match from the comparator circuitry.

7. The apparatus of claim 1, wherein the interface circuitry is first interface circuitry, the interface input is a first interface input, the interface output is a first interface output, the core includes a first thread and a second thread, the first thread coupled to the first interface input, and further including:
  second interface circuitry with a second interface input and a second interface output, the second interface input coupled to the second thread; and
  counter circuitry with a counter output coupled to a selection input of the multiplexer circuitry, the counter circuitry to:
    output a first value to instruct the multiplexer circuitry to select the output of the first interface circuitry; and
    output a second value to instruct the multiplexer circuitry to select the output of the second interface circuitry.

8. An apparatus to debug a hardware accelerator, the apparatus comprising:
  at least one memory;
  instructions in the apparatus; and
  processor circuitry to at least one of execute or instantiate the instructions to:
    generate a breakpoint associated with a machine-learning model, the breakpoint to be triggered on a per-core basis, the breakpoint to be written into a first configuration register of a first core of the processor circuitry and not a second configuration register of a second core of the processor circuitry;
    write the breakpoint into the first configuration register;
    compile executable code based on at least one of the machine-learning model or the breakpoint, the executable code to be executed by the processor circuitry to generate a data output based on a data input, the triggering of the breakpoint to halt execution of the executable code by the first core while the second core is to continue execution of the executable code;
    in response to execution of the executable code:
      trigger the breakpoint to stop the execution of the executable code; and
      output at least one of the data input, the data output, or the breakpoint.

9. The apparatus of claim 8, wherein the processor circuitry is to:
  identify the breakpoint to be triggered on a per-workload basis; and
  insert the breakpoint into the executable code to be invoked on the per-workload basis.

10. The apparatus of claim 8, wherein the data input is a first data input, and the processor circuitry is to:
  in response to the triggering of the breakpoint, obtain a control signal indicative of executing an incremental operation of the executable code, the incremental operation including at least one of a read operation to read a first value, a write operation to write a second value, or a computation operation to determine a third value based on a second data input; and
  output at least one of the first value, the second value, or the third value.

11. The apparatus of claim 8, wherein the processor circuitry is to:
  in response to the triggering of the breakpoint, at least one of:
    adjust a first value of the data input;
    adjust a second value of the first configuration register of the first core of the processor circuitry; or
    adjust a third value of the second configuration register of the second core; and
  resume the execution of the executable code based on at least one of the first value, the second value, or the third value.

12. An apparatus to debug a hardware accelerator, the apparatus comprising:
  at least one memory;
  instructions; and
  processor circuitry to at least one of execute or instantiate the instructions to:
  generate a breakpoint associated with a machine-learning model;
  compile executable code based on at least one of the machine-learning model or the breakpoint, the executable code to be executed by the processor circuitry to generate a data output based on a data input;
  in response to an execution of the executable code:
    trigger the breakpoint to stop the execution of the executable code; and
    output at least one of the data input, the data output, or the breakpoint, wherein the data input includes first data, the data output includes second data, and the processor circuitry is to:
  identify the breakpoint to be triggered based on third data;
  write the third data into a configuration register of a core of the processor circuitry;
  execute a first comparison of the first data and the third data, the triggering of the breakpoint in response to a first match of the first data and the third data based on the first comparison; and
  execute a second comparison of the second data and the third data, the triggering of the breakpoint in response to a second match of the second data and the third data based on the second comparison.

13. An apparatus to debug a hardware accelerator, the apparatus comprising:
  at least one memory;
  instructions in the apparatus; and
  processor circuitry to at least one of execute or instantiate the instructions to:
    generate a breakpoint associated with a machine-learning model based on a first address in memory associated with a data output;
    write the first address into a configuration register of a core of the processor circuitry;
    compile executable code based on at least one of the machine-learning model or the breakpoint, the executable code to be executed by the processor circuitry to generate the data output based on a data input; and
    in response to an execution of the executable code:
      identify a second address in the memory at which to write the data output;
      execute a comparison of the first address and the second address; trigger the breakpoint to stop the execution of the executable code in response to a match of the first address and the second address;

and
output at least one of the data input, the data output, or the breakpoint.

14. At least one non-transitory computer readable medium comprising instructions that, when executed, cause first processor circuitry to at least:
generate a breakpoint associated with a machine-learning model, the breakpoint to be triggered on a per-core basis;
write the breakpoint into a first configuration register of a first core of the first processor circuitry or second processor circuitry and not into a second configuration register of a second core of the first processor circuitry or the second processor circuitry;
compile executable code based on at least one of the machine-learning model or the breakpoint, the executable code to be executed by the first processor circuitry or the second processor circuitry to generate a data output based on a data input;
trigger the breakpoint to stop the execution of the executable code by the first core while the second core is to continue execution of the executable code; and
output at least one of the data input, the data output, or the breakpoint.

15. The at least one non-transitory computer readable medium of claim 14, wherein the instructions, when executed, cause the first processor circuitry to insert the breakpoint into the executable code to be invoked on a per-workload basis.

16. The at least one non-transitory computer readable medium of claim 14, wherein the data input includes first data, the data output includes second data, and the instructions, when executed, cause the first processor circuitry to:
write third data into the first configuration register of the first core of the first processor circuitry or the second processor circuitry; and at least one of:
(a) execute a first comparison of the first data and the third data, the triggering of the breakpoint in response to a first match of the first data and the third data based on the first comparison;
(b) execute a second comparison of the second data and the third data, the triggering of the breakpoint in response to a second match of the second data and the third data based on the second comparison.

17. The at least one non-transitory computer readable medium of claim 14, wherein the instructions, when executed, cause the first processor circuitry to:
identify the breakpoint to be triggered based on a first address in memory associated with the data output;
write the first address into the first configuration register of the first core of the first processor circuitry;
identify a second address in the memory at which to write the data output; and
execute a comparison of the first address and the second address, the triggering of the breakpoint in response to a match of the first address and the second address.

18. The at least one non-transitory computer readable medium of claim 14, wherein the data input is a first data input, and the instructions, when executed, cause the first processor circuitry to:
obtain a control signal indicative of executing an incremental operation of the executable code, the incremental operation including at least one of a read operation to read a first value, a write operation to write a second value, or a computation operation to determine a third value based on a second data input; and
output at least one of the first value, the second value, or the third value.

19. The at least one non-transitory computer readable medium of claim 14, wherein the instructions, when executed, cause the first processor circuitry to:
in response to the triggering of the breakpoint, at least one of:
adjust a first value of the data input;
adjust a second value of a first register of a core of the first processor circuitry or the second processor circuitry; or
adjust a third value of a second register; and
resume the execution of the executable code based on at least one of the first value, the second value, or the third value.

20. An apparatus to debug a hardware accelerator, the apparatus comprising:
first interface circuitry to obtain a machine-learning model;
core circuitry to execute executable code to generate a data output based on a data input, the executable code based on the machine-learning model;
second interface circuitry to receive at least one of the data input or the data output;
multiplexer circuitry to select the second interface circuitry; and
a shift register to output the at least one of the data input or the data output in response to a trigger of a breakpoint associated with an execution of the executable code.

21. The apparatus of claim 20, wherein the second interface circuitry is to receive the data input from memory, and further including:
a buffer to, in response to the breakpoint not being triggered:
receive the data input from the second interface circuitry; and
output the data input to the core circuitry.

22. The apparatus of claim 20, wherein the second interface circuitry is to receive the data output from the core circuitry, and further including:
a buffer to, in response to the breakpoint not being triggered:
receive the data output from the second interface circuitry; and
output the data output to memory.

23. The apparatus of claim 20, wherein the second interface circuitry is to receive the data input from memory, and further including:
a buffer to, in response to the breakpoint not being triggered:
receive the data input from the second interface circuitry; and
output the data input to the core circuitry; and
debug circuitry to:
output the at least one of the data input or the data output in response to the trigger of the breakpoint; or
output the data output to the memory in response to the breakpoint not being triggered.

24. The apparatus of claim 23, wherein the debug circuitry is included in the core circuitry.

25. The apparatus of claim 20, wherein the at least one of the data input or the data output includes a first value, and further including:
a configuration register to store a second value corresponding to the breakpoint; and comparator circuitry to:

compare the first value and the second value; and instruct the second interface circuitry to provide the at least one of the data input or the data output to the multiplexer circuitry in response to a match of the first value and the second value based on the comparison, the triggering of the breakpoint in response to the match.

26. The apparatus of claim 20, wherein the core circuitry is first core circuitry, and further including:

counter circuitry to:

output a first value to instruct the multiplexer circuitry to select the output of the second interface circuitry; and output a second value to instruct the multiplexer circuitry to select an output of third interface circuitry associated with second core circuitry.

27. A method comprising:

generating a breakpoint associated with a machine-learning model, the breakpoint to be triggered on a per-core basis;

writing the breakpoint into a first configuration register of a first core of first processor circuitry or second processor circuitry and not into a second configuration register of a second core of the first processor circuitry or the second processor circuitry;

compiling executable code based on at least one of the machine-learning model or the breakpoint, the executable code to be executed by the first processor circuitry or the second processor circuitry to generate a data output based on a data input;

triggering the breakpoint to stop the execution of the executable code by the first core while the second core is to continue execution of the executable code; and outputting at least one of the data input, the data output, or the breakpoint.

* * * * *